US009368077B2

(12) United States Patent
Ge et al.

(10) Patent No.: US 9,368,077 B2
(45) Date of Patent: Jun. 14, 2016

(54) SYSTEMS AND METHODS FOR ADJUSTING LIQUID CRYSTAL DISPLAY WHITE POINT USING COLUMN INVERSION

(75) Inventors: Zhibing Ge, Sunnyvale, CA (US); Shih Chang Chang, Cupertino, CA (US); Cheng Chen, Cupertino, CA (US); Hopil Bae, Sunnyvale, CA (US); Ming Xu, Sunnyvale, CA (US); Shawn Robert Gettemy, San Jose, CA (US); Wei H. Yao, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 702 days.

(21) Appl. No.: 13/420,197

(22) Filed: Mar. 14, 2012

(65) Prior Publication Data

US 2013/0241900 A1 Sep. 19, 2013

(51) Int. Cl.

| | |
|---|---|
| ***G06F 3/038*** | (2013.01) |
| ***G09G 3/36*** | (2006.01) |
| ***G09G 3/00*** | (2006.01) |

(52) U.S. Cl.

CPC .............. *G09G 3/3614* (2013.01); *G09G 3/006* (2013.01); *G09G 3/3688* (2013.01); *G09G 2310/0297* (2013.01); *G09G 2320/0666* (2013.01); *Y10T 29/49004* (2015.01)

(58) Field of Classification Search

CPC .................................................... G09G 3/3614
USPC .......................................................... 345/204
See application file for complete search history.

(56) References Cited

U.S. PATENT DOCUMENTS

| | | | | |
|---|---|---|---|---|
| 5,424,774 | A * | 6/1995 | Takayama et al. | 348/222.1 |
| 6,151,006 | A * | 11/2000 | Yanagi et al. | 345/94 |
| 6,518,708 | B2 | 2/2003 | Aso | |
| 6,801,220 | B2 * | 10/2004 | Greier et al. | 345/694 |
| 6,917,407 | B2 | 7/2005 | Jeong | |
| 7,081,877 | B2 | 7/2006 | Bu | |
| 7,369,124 | B2 | 5/2008 | Nakano et al. | |
| 7,518,583 | B2 * | 4/2009 | Lee et al. | 345/87 |
| 7,561,239 | B2 | 7/2009 | Fujita | |
| 7,728,939 | B2 | 6/2010 | Tsai | |
| 7,750,988 | B2 | 7/2010 | Kim | |
| 7,760,178 | B2 | 7/2010 | Takada | |
| 7,782,277 | B2 | 8/2010 | Shin | |
| 7,839,381 | B2 | 11/2010 | Zhou | |

(Continued)

FOREIGN PATENT DOCUMENTS

| | | | |
|---|---|---|---|
| EP | 1752957 | A2 | 2/2007 |
| KR | 10-2001-0036308 | A | 5/2001 |

(Continued)

OTHER PUBLICATIONS

PCT International Search Report for PCT Application No. PCT/US2013/029178, dated May 27, 2013, pp. 5.

(Continued)

*Primary Examiner* — Jason Olson
(74) *Attorney, Agent, or Firm* — Fletcher Yoder PC

(57) ABSTRACT

Systems, methods, and devices for adjusting a white point of a liquid crystal display (LCD) using column inversion are provided. In one example, a method includes measuring white points of an electronic display that occur when the display employs different column inversion schemes. The display may be programmed to perform the column inversion scheme that produces a white point closest to a desired white point.

10 Claims, 49 Drawing Sheets

(56) References Cited

U.S. PATENT DOCUMENTS

| | | | | |
|---|---|---|---|---|
| 7,903,072 | B2 | 3/2011 | Yamazaki | |
| 7,920,116 | B2 | 4/2011 | Woo et al. | |
| 7,956,942 | B2 | 6/2011 | Lee | |
| 2001/0015716 | A1 | 8/2001 | Kim | |
| 2001/0038370 | A1 | 11/2001 | Yeung | |
| 2004/0114088 | A1 | 6/2004 | Murade | |
| 2004/0169807 | A1* | 9/2004 | Rho et al. | 349/139 |
| 2005/0104835 | A1* | 5/2005 | Misonou et al. | 345/96 |
| 2005/0122441 | A1 | 6/2005 | Shimoshikiryoh | |
| 2005/0134778 | A1 | 6/2005 | Tsuboi et al. | |
| 2005/0259067 | A1 | 11/2005 | Cheng | |
| 2006/0176256 | A1 | 8/2006 | Yen et al. | |
| 2007/0030227 | A1 | 2/2007 | Lee | |
| 2007/0057892 | A1 | 3/2007 | Shin | |
| 2007/0132684 | A1 | 6/2007 | Baek | |
| 2008/0007509 | A1* | 1/2008 | Lankhorst et al. | 345/102 |
| 2008/0007662 | A1* | 1/2008 | Toyooka et al. | 349/8 |
| 2008/0074568 | A1 | 3/2008 | Tanaka et al. | |
| 2008/0150852 | A1 | 6/2008 | Edwards | |
| 2008/0303836 | A1 | 12/2008 | Ludden | |
| 2009/0015574 | A1 | 1/2009 | Kim | |
| 2009/0040243 | A1* | 2/2009 | Hisada et al. | 345/690 |
| 2009/0146934 | A1* | 6/2009 | Hong et al. | 345/87 |
| 2009/0267932 | A1* | 10/2009 | Lin et al. | 345/212 |
| 2010/0091046 | A1 | 4/2010 | Matsuura | |
| 2010/0156948 | A1 | 6/2010 | Kim | |
| 2010/0188437 | A1* | 7/2010 | Itoh et al. | 345/690 |
| 2010/0220089 | A1* | 9/2010 | Peng et al. | 345/211 |
| 2010/0225570 | A1* | 9/2010 | Liu et al. | 345/92 |
| 2010/0245227 | A1* | 9/2010 | Chen et al. | 345/102 |
| 2012/0113154 | A1 | 5/2012 | Ge et al. | |

FOREIGN PATENT DOCUMENTS

| | | | |
|---|---|---|---|
| KR | 2004-0077482 | A | 9/2004 |
| KR | 2007-0121865 | A | 12/2007 |

OTHER PUBLICATIONS

PCT International Search Report for PCT Application No. PCT/US2013/029174, dated Jun. 5, 2013, pp. 6.

H.S. Huang, et al.; "Optical MOdeling of Small Pixels in Reflective Mixed-Mode Twisted Nematic Cells," ISSN0099-0966X/99/3001-0180-$1.00 + .00 (c) 1999 SID; 4 pgs.

M. Ogier; "Optimizing VCOM to Maximize TFT-LCD Applications Performance"; Intersil Corporation, dated Sep. 21, 2009; 5 pgs.; http://www.en-genius.net.

U.S. Appl. No. 12/941,751, filed Nov. 8, 2010, Ge, et al.

Korean Search Report for Korean Application No. 10-2014-7028761 dated Oct. 23, 2014; 11 pgs.

* cited by examiner

630

| | R1 | G1 | B1 | R2 | G2 | B2 |
|---|---|---|---|---|---|---|
| FRAME 1 | + | − | ⊖ | − | + | ⊕ |
| FRAME 2 | − | + | ⊕ | + | − | ⊖ |
| FRAME 3 | + | − | ⊖ | − | + | ⊕ |
| FRAME 4 | − | + | ⊕ | + | − | ⊖ |
| FRAME 5 | + | − | + | − | + | − |
| FRAME 6 | − | + | − | + | − | + |
| FRAME 7 | + | − | ⊖ | − | + | ⊕ |
| FRAME 8 | − | + | ⊕ | + | − | ⊖ |
| FRAME 9 | + | − | ⊖ | − | + | ⊕ |
| FRAME 10 | − | + | ⊕ | + | − | ⊖ |

670

| | R1 | G1 | B1 | R2 | G2 | B2 |
|---|---|---|---|---|---|---|
| FRAME 1 | + | ⊕ | + | − | ⊖ | − |
| FRAME 2 | − | ⊖ | − | + | ⊕ | + |
| FRAME 3 | ⊕ | + | − | ⊖ | − | + |
| FRAME 4 | ⊖ | − | + | ⊕ | + | − |
| FRAME 5 | + | ⊕ | + | − | ⊖ | − |
| FRAME 6 | − | ⊖ | − | + | ⊕ | + |
| FRAME 7 | ⊕ | + | − | ⊖ | − | + |
| FRAME 8 | ⊖ | − | + | ⊕ | + | − |
| FRAME 9 | + | ⊕ | + | − | ⊖ | − |
| FRAME 10 | − | ⊖ | − | + | ⊕ | + |

720

| | R1 | G1 | B1 | R2 | G2 | B2 |
|---|---|---|---|---|---|---|
| FRAME 1 | + | ⊖ | ⊖ | + | ⊖ | ⊖ |
| FRAME 2 | − | ⊕ | ⊕ | − | ⊕ | ⊕ |
| FRAME 3 | + | ⊖ | ⊖ | + | ⊖ | ⊖ |
| FRAME 4 | − | ⊕ | ⊕ | − | ⊕ | ⊕ |
| FRAME 5 | ⊖ | + | ⊖ | ⊖ | + | ⊖ |
| FRAME 6 | ⊕ | − | ⊕ | ⊕ | − | ⊕ |
| FRAME 7 | + | ⊖ | ⊖ | + | ⊖ | ⊖ |
| FRAME 8 | − | ⊕ | ⊕ | − | ⊕ | ⊕ |
| FRAME 9 | + | ⊖ | ⊖ | + | ⊖ | ⊖ |
| FRAME 10 | − | ⊕ | ⊕ | − | ⊕ | ⊕ |

SYSTEMS AND METHODS FOR ADJUSTING LIQUID CRYSTAL DISPLAY WHITE POINT USING COLUMN INVERSION

BACKGROUND

The present disclosure relates generally to liquid crystal displays (LCDs) and, more particularly, to LCDs that employ column inversion.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic displays appear in many different electronic devices. One type of electronic display, a liquid crystal display (LCD), displays images by varying the amount of light passing through colored pixels (typically red, green, and blue pixels) using a layer of liquid crystal material. Pixels may be driven with particular voltages, causing the liquid crystal material to change orientation, thereby varying the amount of light passing through the pixel. The liquid crystal layer could become biased, however, if the voltages applied to a pixel are consistently of a single polarity (i.e., + or −). Biasing could disadvantageously alter the light transmission characteristics of an LCD.

Periodically inverting the driving voltages may prevent liquid crystal biasing. Whole-frame inversion, however, could introduce other artifacts. Accordingly, inversion schemes such as “dot inversion” or “column inversion” have been developed that may prevent biasing while avoiding artifacts caused by whole-frame inversion. Dot inversion typically involves driving all adjacent pixels of an LCD at opposite polarities and inverting these polarities on a frame-by-frame basis. Although dot inversion may prevent liquid crystal biasing, dot inversion may significantly increase the complexity of the driving circuitry. Column inversion is less complex and generally prevents biasing in a similar way as dot inversion. Unlike dot inversion, column inversion typically involves driving whole columns of pixels at the same polarity and inverting these polarities occasionally (e.g., on a frame-by-frame basis). Both dot inversion and column inversion generally may reduce the appearance of visual artifacts on the LCD caused by biasing. Performing these techniques, however, may consume a substantial amount of power. Moreover, LCD inversion schemes can produce crosstalk between neighboring pixels, reducing light transmittance in those pixels.

Aside from liquid crystal biasing, other potential problems may affect LCDs. Color reproduction, for instance, may vary from LCD to LCD. Such differences in color reproduction may arise from color variations in backlight elements (e.g., light emitting diodes (LEDs)), the light-diffusing components of backlight assemblies, and/or differences individual display panels. Ideally, the white point—the color emitted by the LCD when the LCD is programmed to display the color white—should be the same for all LCDs used in a type of electronic device. Under some circumstances, the white point may be adjusted through software processing before image data is sent to the LCD. Although effective, adjusting the white point in software may cause a loss of image data information.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems, methods, and devices for adjusting a white point of a liquid crystal display (LCD) column inversion. For example, a method may include measuring white points of an electronic display that occur when the display employs different column inversion schemes. The display may be programmed to perform the column inversion scheme that produces a white point closest to a desired white point. In another example, an electronic display may perform a duty ratio of column inversion schemes to cause the white point of the display to approach a desired white point.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
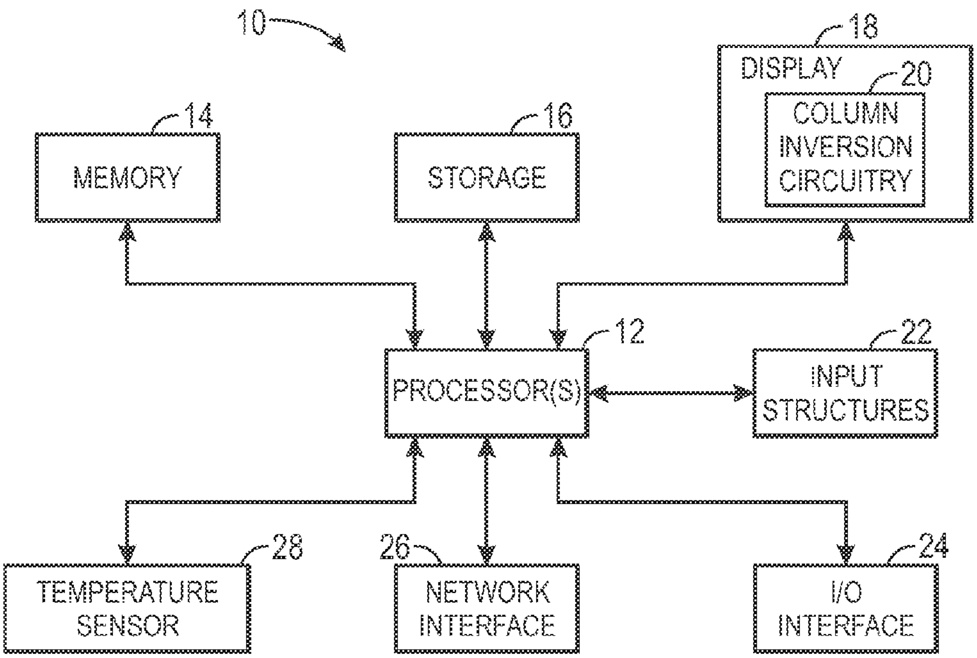
FIG. 1 is a schematic block diagram of an electronic device with a display having column inversion circuitry, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, a liquid crystal display (LCD) modulates the amount of light passing through each pixel using an electric field through a liquid crystal layer. If voltage of a single polarity is consistently applied to the liquid crystal layer, a biasing of the liquid crystal layer may occur. This biasing could disadvantageously alter the light transmission characteristics of the LCD. Display driving techniques referred to as "column inversion" may prevent liquid crystal biasing. Some column inversion schemes are described in U.S. application Ser. No. 12/941,751, "COLUMN INVERSION SCHEMES FOR IMPROVED TRANSMITTANCE," which is assigned to Apple Inc. and incorporated by reference herein in its entirely.

In general, column inversion involves driving some columns of pixels at one polarity and other columns of pixels at an opposite polarity. The polarities then are occasionally swapped (e.g., on a frame-by-frame basis). To provide a few examples, column inversion may involve driving adjacent groups of one, two, three, or more columns of pixels of the LCD at one polarity and driving other adjacent groups of one, two, three or more columns of pixels at an opposite polarity. Occasionally, such as when every new frame of image data is programmed onto the display, the polarities may be swapped. In a 1-column inversion scheme, each adjacent column of pixels is driven at a polarity opposite the other. In a 2-column inversion scheme, groups of two adjacent columns are driven at the same polarity, alternating every group of two columns. Similarly, in a 3-column inversion scheme, groups of three columns of pixels are driven at the same polarity, alternating every group of three columns.

Driving adjacent pixels at opposite polarities reduces their transmittance. Since 1-column inversion involves polarity switches between every adjacent column of pixels, the transmittance of every pixel may be equally reduced. Performing 2-column inversion instead of 1-column inversion may avoid half of these polarity switches. Thus, 2-column inversion may offer greater pixel transmittance over 1-column inversion. In 3-column inversion, groups of three adjacent columns are driven at the same polarity. The center column of such a group of three will be surrounded on both sides by pixels driven at the same polarity. The outer columns of the group of three will each be adjacent to a column of pixels driven at an opposite polarity. As such, the transmittance of the pixels of the center column of the group of three will be enhanced in relation to those of the outer columns of the group of three.

The present disclosure describes several ways column inversion may mitigate or use to advantage the differences in pixel transmittance caused by different column inversion schemes. In one example, columns of pixels that will be driven at opposite polarities may be spaced farther apart than columns of pixels that will be driven at the same polarity. The additional space between those pixels driven at opposite polarities may reduce the effect of the polarity switch on the liquid crystal material. As a result, the transmittances of pixels adjacent to those of opposite polarity may be reduced to a lesser degree. Depending on the spacing, the reduction in transmittance may be reduced significantly or even substantially eliminated.

In another example, selecting or varying the column inversion scheme may permit the white point of the LCD to be adjusted. Specifically, the variations in pixel transmittance caused by polarity switches may affect the relative transmittance of pixels of different colors. For instance, selecting a 3-column inversion scheme in which columns of blue pixels are central may cause blue pixels to have enhanced transmittance in relation to green and red pixels. As a result, the white point of the display may shift toward blue. Additionally or alternatively, various column inversion schemes may be varied over time. Selecting a duty ratio of different column inversion schemes may cause the white point of the display to shift in any one of several possible color directions.

Additionally or alternatively, certain driving circuitry and/or driving techniques may enable reduced power consumption for some column inversion schemes. For example, temporal polarity switches occurring in some driving circuitry could cause the driving circuitry to consumer more power. That is, in general, the more polarity switches occurring over time, the more power consumed by the driving circuitry. In some examples, temporal polarity switches may be avoided by changing the order that image data enters the driving circuitry. Additionally or alternatively, demultiplexers used to funnel data to particular unit source drivers may be configured such that a single source amplifier provides data to a single demultiplexer each frame. By reducing electrically costly polarity switches in the driving circuitry, power may be conserved while a column inversion scheme is applied.

Figure 2:
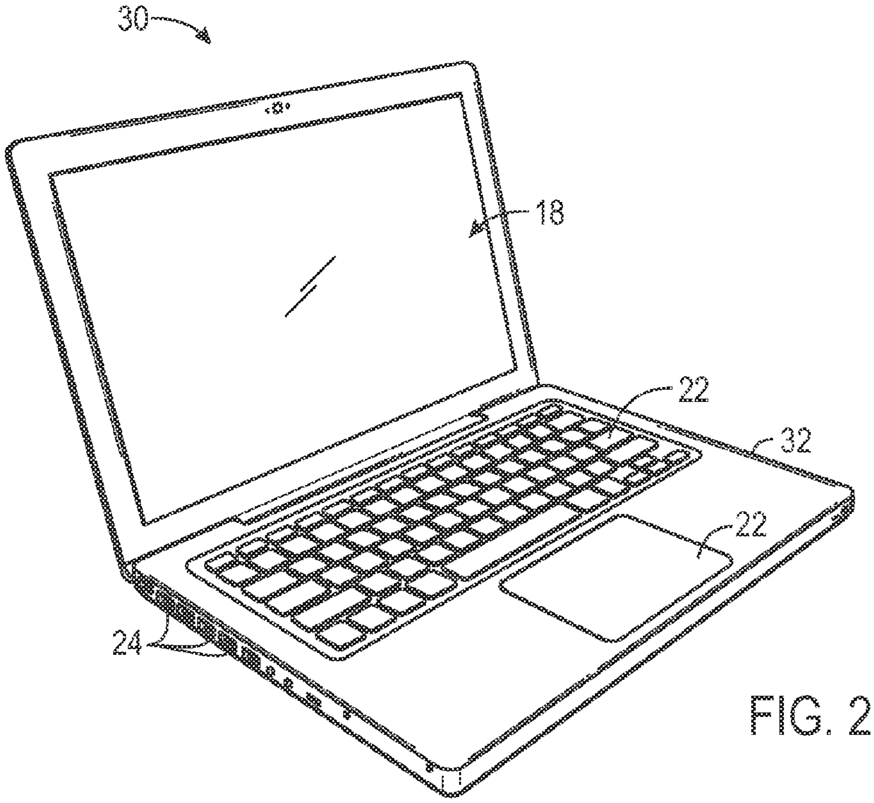
FIG. 2 is an example of the electronic device of FIG. 1 in the form of a notebook computer, in accordance with an embodiment.

With the foregoing in mind, a variety of electronic devices may incorporate the electronic displays and driving circuitry discussed above. One example appears in a block diagram of FIG. 1, which describes an electronic device 10 that may include, among other things, one or more processor(s) 12, memory 14, nonvolatile storage 16, a display 18 having outer resistive trace(s) 20, input structures 22, an input/output (I/O) interface 24, network interfaces 26, and/or temperature-sensing circuitry 28. The various functional blocks shown in FIG. 1 may include hardware, executable instructions, or a combination of both. In the present disclosure, the processor(s) 12 and/or other data processing circuitry may be generally referred to as "data processing circuitry." This data processing circuitry may be embodied wholly or in part as software, firmware, hardware, or any combination thereof. Furthermore, the data processing circuitry may be a single, contained processing module or may be incorporated wholly or partially within any of the other elements within the electronic device 10. FIG. 1 is merely one example of a particular implementation and is intended to illustrate the types of components that may be present in electronic device 10. These components may be found in various examples of the electronic device 10. By way of example, the electronic device 10 of FIG. 1 may represent a block diagram of a computer as depicted in FIG. 2, a handheld as device depicted in FIG. 3, or similar devices.

As shown in FIG. 1, the processor(s) 12 and/or other data processing circuitry may be operably coupled with the memory 14 and the nonvolatile storage 16. In this way, the processor(s) 12 may execute instructions to carry out various functions of the electronic device 10. Among other things, these functions may include generating image data in a particular order to be displayed on the display 18, though it may be appreciated that the display 18 may additionally or alternatively perform such functions. The programs or instructions executed by the processor(s) 12 may be stored in any suitable article of manufacture that includes one or more tangible, computer-readable media at least collectively storing the instructions or routines, such as the memory 14 and/or the nonvolatile storage 16. The memory 14 and the nonvolatile storage 16 may represent, for example, random-access memory, read-only memory, rewritable flash memory, hard drives, and optical discs.

The display 18 may be any suitable liquid crystal display (LCD) having suitable column inversion circuitry 20. In some embodiments, the display 18 may also serve as a touch-screen input device. For example, the display 18 may be a Multi-Touch™ touch screen device that can detect multiple touches at once. The column inversion circuitry 20 may perform column inversion according to any of the techniques discussed herein. For example, the column inversion circuitry 20 may represent a particular configuration of demultiplexers used in driving circuitry to minimize the power consumption of source amplifiers used in the display 18. Additionally or alternatively, the column inversion circuitry 20 may represent circuitry to effect a particular configuration or duty ratio of column inversion to adjust the white point of the display 18. The column inversion circuitry 20 may also represent circuitry to temporally adjust the manner in which image data is processed through the driving circuitry to reduce the number of polarity switches per frame, thereby reducing power consumption.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The temperature-sensing circuitry 28 may detect a temperature of the display 18. Since the temperature of the display 18 could affect the white point of the display 18, the electronic device 10 may select a column inversion scheme that the display 18 may use. The column inversion scheme used by the display 18 may cause the white point of the display to shift in a desired color direction.

The electronic device 10 may take the form of a computer or other type of electronic device. For example, the electronic device 10 in the form of a computer may be a model of a MacBook®, MacBook® Pro, MacBook Air®, iMac®, Mac® mini, or Mac Pro® available from Apple Inc. FIG. 2 provides one example of the electronic device 10 in the form of a notebook computer 30. The computer 30 may include a housing 32, a display 18, input structures 22, and ports of an I/O interface 24. The input structures 22, such as a keyboard and/or touchpad, may be used to interact with the computer 30. Via the input structures 22, a user may start, control, or operate a GUI or applications running on computer 30.

The computer 30 may include the display 18. Thus, in certain examples, the computer 30 may consume relatively less power than other similar devices without the column inversion circuitry 20 discussed herein. Likewise, in certain examples, the computer 30 may display images having a consistent white point across many different devices in a product line.

Figure 3:
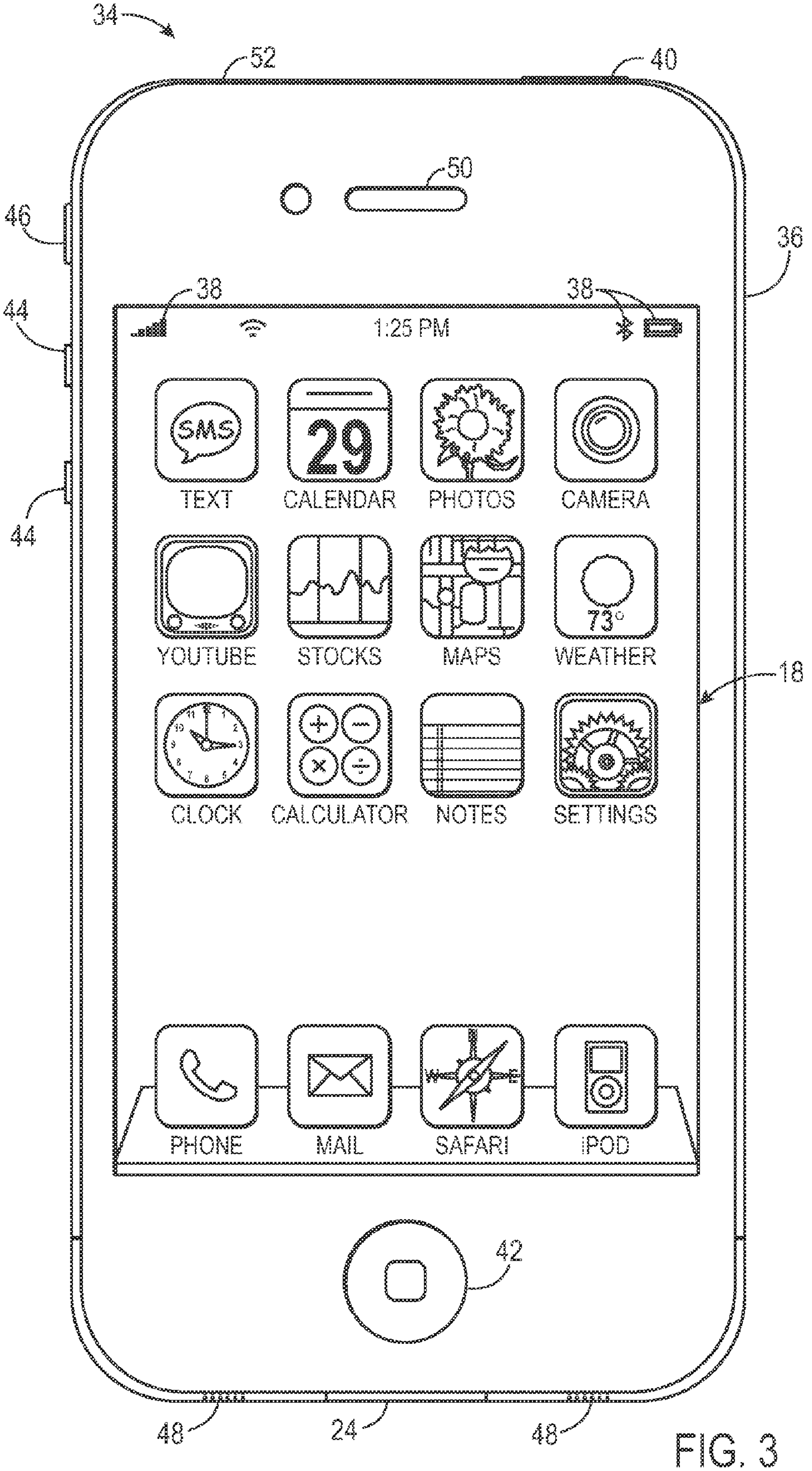
FIG. 3 is an example of the electronic device of FIG. 1 in the form of a handheld device, in accordance with an embodiment.

The electronic device 10 may also take the form of a handheld device 34, as generally illustrated in FIG. 3. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif. In other embodiments, the handheld device 34 may be a tablet-sized embodiment of the electronic device 10, which may be, for example, a model of an iPod® available from Apple Inc.

The handheld device 34 may include an enclosure 36 to protect interior components from physical damage and to shield them from electromagnetic interference. The enclosure 36 may surround the display 18, which may display indicator icons 38. The indicator icons 38 may indicate, among other things, a cellular signal strength, Bluetooth connection, and/or battery life. The I/O interfaces 24 may open through the enclosure 36 and may include, for example, a proprietary I/O port from Apple Inc. to connect to external devices. User input structures 40, 42, 44, and 46, in combination with the display 18, may allow a user to control the handheld device 34. A microphone 48 may obtain a user's voice for various voice-related features, and a speaker 50 may enable audio playback and/or certain phone capabilities. A headphone input 52 may provide a connection to external speakers and/or headphones. Like the computer 30, in certain examples, the handheld device 34 may consume relatively less power than other similar devices without the column inversion circuitry 20 discussed herein. Likewise, in certain examples, the handheld device 34 may display images having a consistent white point across many different devices in a product line.

Figure 4:
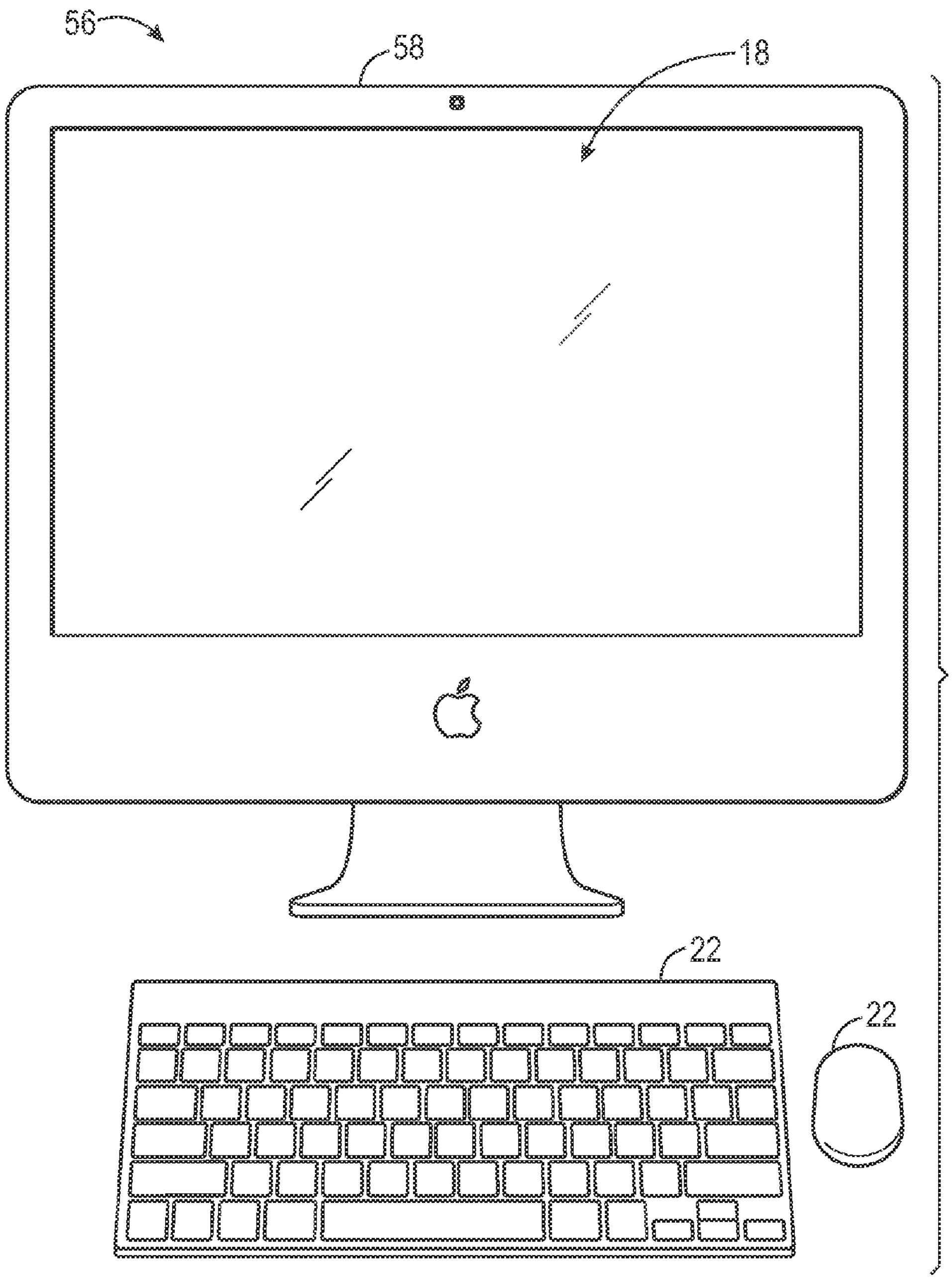
FIG. 4 is an example of the electronic device of FIG. 1 in the form of a desktop computer, in accordance with an embodiment.

The electronic device 10 also may take the form of a desktop computer 56, as generally illustrated in FIG. 4. In certain embodiments, the electronic device 10 in the form of the desktop computer 56 may be a model of an iMac®, Mac® mini, or Mac Pro® available from Apple Inc. The desktop computer 56 may include a housing 58, a display 18, and input structures 22, among other things. The input structures 22, such as a wireless keyboard and/or mouse, may be used to interact with the desktop computer 56. Via the input structures 22, a user may start, control, or operate a GUI or applications running on the desktop computer 56.

The display 18 may be a backlit liquid crystal display (LCD). Thus, in certain examples, the desktop computer 56 may consume relatively less power than other similar devices without the column inversion circuitry 20 discussed herein. Likewise, in certain examples, the desktop computer 56 may display images having a consistent white point across many different devices in a product line.

Regardless of whether the electronic device 10 takes the form of the computer 30 of FIG. 2, the handheld device 34 of FIG. 3, the desktop computer 56 of FIG. 4, or some other form, the display 18 of the electronic device 10 may form an array or matrix of picture elements (pixels). By varying an electric field associated with each pixel, the display 18 may control the orientation of liquid crystal disposed at each pixel. The orientation of the liquid crystal of each pixel may permit more or less light emitted from a backlight to pass through each pixel. The display 18 may employ any suitable technique to manipulate these electrical fields and/or the liquid crystals. For example, the display 18 may employ transverse electric field modes in which the liquid crystals are oriented by applying an in-plane electrical field to a layer of the liquid crystals. Examples of such techniques include in-plane switching (IPS) and/or fringe field switching (FFS) techniques.

By controlling of the orientation of the liquid crystals, the amount of light emitted by the pixels may change. Changing the amount of light emitted by the pixels will change the colors perceived by a user of the display 18. Specifically, a group of pixels may include a red pixel, a green pixel, and a blue pixel, each having a color filter of that color. By varying the orientation of the liquid crystals of different colored pixels, a variety of different colors may be perceived by a user viewing the display. It may be noted that the individual colored pixels of a group of pixels may also be referred to as unit pixels.

Figure 5:
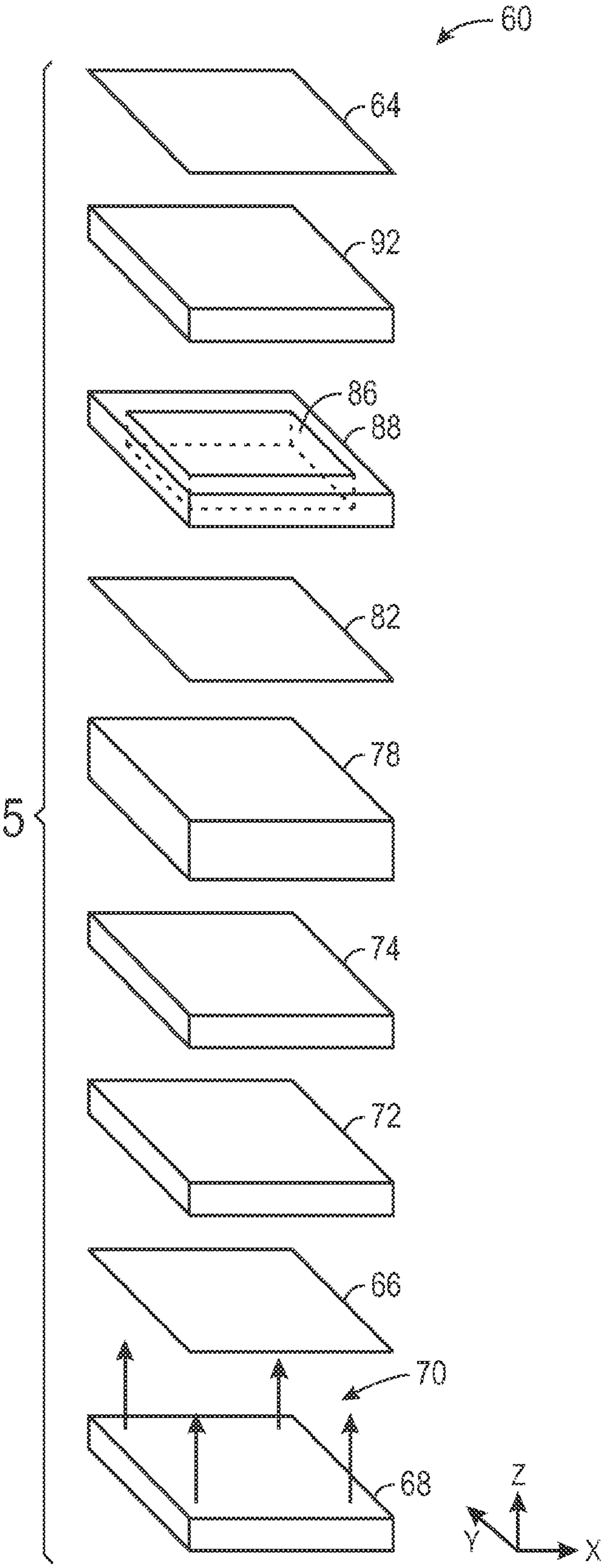
FIG. 5 is an exploded view of the display of the electronic device of FIG. 1, in accordance with an embodiment.

With the foregoing in mind, FIG. 5 depicts an exploded view of different layers of a pixel 60 of the display 18. The pixel 60 includes an upper polarizing layer 64 and a lower polarizing layer 66 that polarize light 70 emitted by a backlight assembly 68. A lower substrate 72 is disposed above the polarizing layer 66 and is generally formed from a light-transparent material, such as glass, quartz, and/or plastic.

A thin film transistor (TFT) layer 74 appears above the lower substrate 72. For simplicity, the TFT layer 74 is depicted as a generalized structure in FIG. 5. In practice, the TFT layer may itself include various conductive, non-conductive, and semiconductive layers and structures that generally form the electrical devices and pathways that drive the operation of the pixel 60. The TFT layer 74 may also include an alignment layer (formed from polyimide or other suitable materials) at the interface with a liquid crystal layer 78.

The liquid crystal layer 78 includes liquid crystal particles or molecules suspended in a fluid or gel matrix. The liquid crystal particles may be oriented or aligned with respect to an electrical field generated by the TFT layer 74. The orientation of the liquid crystal particles in the liquid crystal layer 78 determines the amount of light transmission through the pixel 60. Thus, by modulation of the electrical field applied to the liquid crystal layer 78, the amount of light transmitted though the pixel 60 may be correspondingly modulated.

Disposed on the other side of the liquid crystal layer 78 from the TFT layer 74 may be one or more alignment and/or overcoating layers 82 interfacing between the liquid crystal layer 78 and an overlying color filter 86. The color filter 86 may be a red, green, or blue filter, for example. Thus, each pixel 60 corresponds to a primary color when light is transmitted from the backlight assembly 68 through the liquid crystal layer 78 and the color filter 86.

The color filter 86 may be surrounded by a light-opaque mask or matrix, represented here as a black mask 88. The black mask 88 circumscribes the light-transmissive portion of the pixel 60, delineating the pixel edges. The black mask 88 may be sized and shaped to define a light-transmissive aperture over the liquid crystal layer 78 and around the color filter 86. In addition, the black mask 88 may cover or mask portions of the pixel 60 that do not transmit light, such as the scanning line and data line driving circuitry, the TFT, and the periphery of the pixel 60. In the example of FIG. 5, an upper substrate 92 may be disposed between the black mask 88 and color filter 86 and the polarizing layer 64. The upper substrate 92 may be formed from light-transmissive glass, quartz, and/or plastic.

Figure 6:
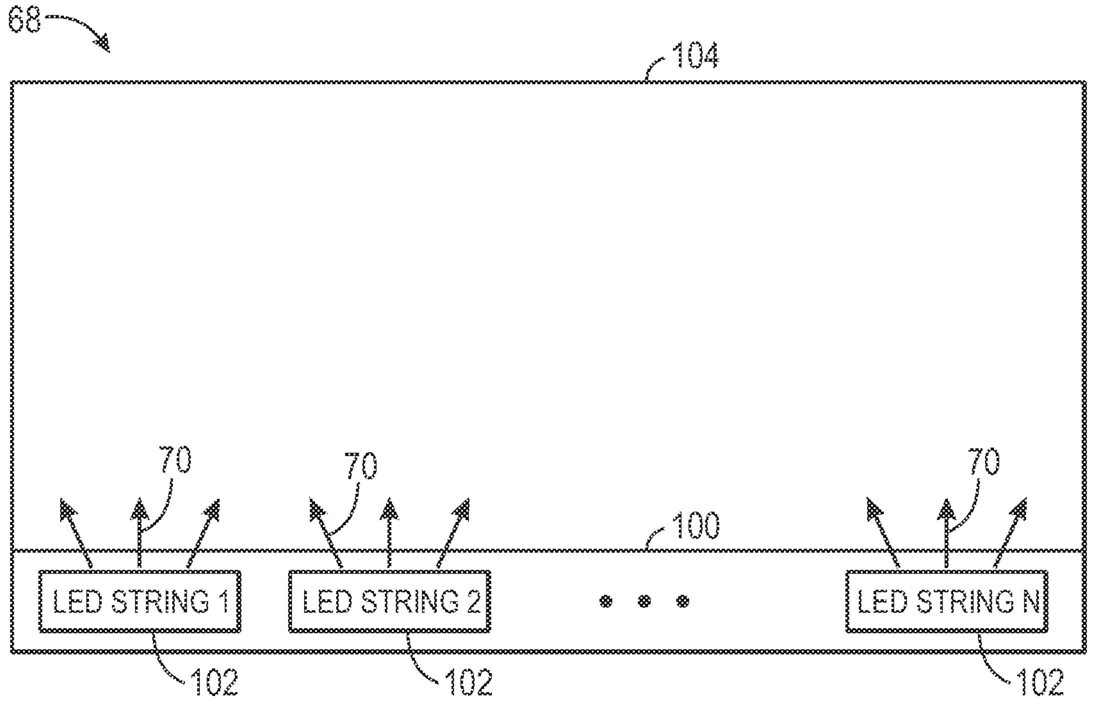
FIG. 6 is a block diagram of a backlight assembly of the display, in accordance with an embodiment.

The backlight assembly 68 provides light 70 to illuminate the display 18. As seen in FIG. 6, the backlight assembly 68 may include, among other things, one or more backlight elements 100 such as light emitting diode (LED) strings 102. Although the backlight elements 100 in FIG. 6 are shown to be LED strings 102, additionally or alternatively, any other suitable light emitting backlight elements 100 may be employed. For example, one or more cold cathode lighting elements may be used in lieu of, or in addition to, the LED strings 102. Moreover, although the LED strings 102 of the backlight assembly 68 schematically appear to be disposed in discrete locations apart from one another, the LED strings 102 may be interleaved among one another.

In FIG. 6, the backlight elements 100 are illustrated as located at the edge of a diffuser 104, rather than directly underneath. The light 70 may enter the light diffuser 104, which may cause the light 70 to be diffused substantially evenly. Additionally, the light diffuser 104 may cause the light to pass up through the other layers of the display 18, which have been generally discussed above with reference to FIG. 5. Moreover, while the backlight assembly 68 of FIG. 6 is represented as an edge-lit backlight assembly 68, other arrangements are possible. Indeed, the backlight elements 100 may be disposed in any suitable arrangement, including being disposed beneath or behind the backlight diffuser 104.

In any case, the white point of the display 18 may be affected by the color of the light 70 emitted by the backlight assembly 68. In particular, different LEDs from backlight elements 100 of different backlight assemblies may emit different colors of light 70. Moreover, different diffusers 104 of different backlight assemblies may cause the color of the light 70 to shift in different ways. As will be discussed further below, the impact of these variable colors on the white point of the display 18 may be mitigated by selecting a particular column inversion scheme or duty ratio of column inversion schemes.

Figure 7:
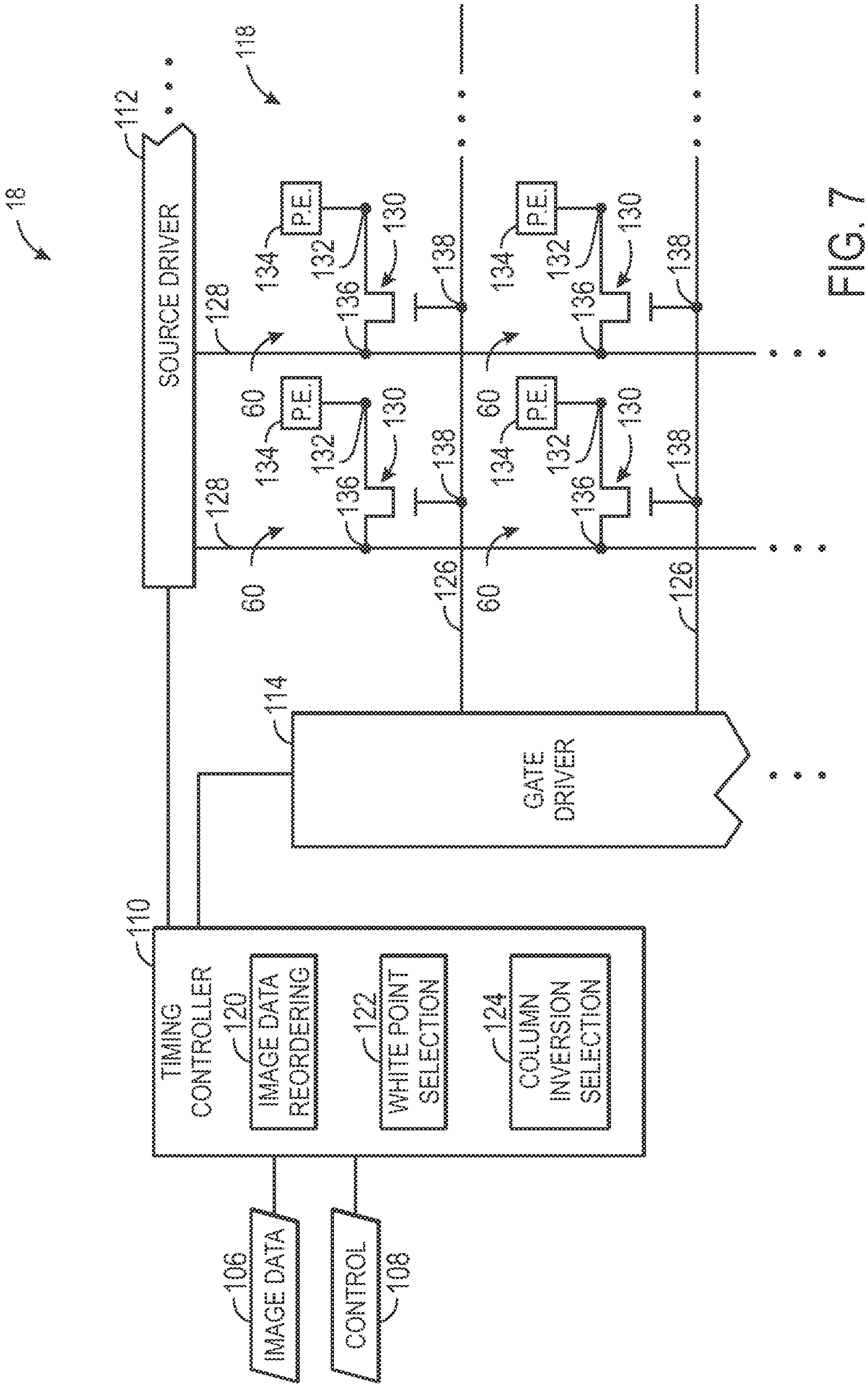
FIG. 7 is a block circuit diagram illustrating driving circuitry of the display, in accordance with an embodiment.

The light 70 emitted through the backlight may pass through the pixels 60 of the display 18 in varying amounts depending on the way the pixels 60 are driven. In FIG. 7, a circuit diagram illustrates various components that may be present in the display 18 to modulate the light 70 through the various pixels 60. For example, image data 106 and/or control signals 108 may be received by a timing controller 110. Using the image data 106 and/or the control signals 108, the timing control 110 may cause a source driver 112 and a gate driver 114 to program pixels 60 of a pixel array of a display panel 118. The timing controller 110 may receive the image data 106 and/or control signals 108 from the processor(s) 12 and/or a display controller (e.g., an Embedded Display Port (eDP)

enabled display controller). The timing controller 110 may include any suitable components (e.g., software, firmware, or hardware) for image data reordering 120, white point selection 122, and/or column inversion selection 124. It should be appreciated that not all of these components may be present in every example of the present disclosure. Indeed, various embodiments may include more or fewer components.

Describing each of these possible components in particular, the image data reordering component 120 may change the order of the image data 106 to enable a power-efficient manner of performing certain column inversion schemes. Specifically, the image data 106 generally may be received from the processor(s) 12 as 8-bit or 6-bit image data in a red-green-blue format. Unless the image data 106 is reordered beforehand, the timing controller 110 to the source driver 112 in the red-green-blue order may supply the image data 106. As will be discussed below, however, the image data reordering component 120 of the source driver 112 may, in some examples, drive pixels in a different order to improve the power consumption of the display 18.

In some cases, as will be discussed below, the display 18 may have a white point selected or varied based on certain column inversion schemes. For example, the components of the display 18 may operate to cause the white point to shift toward red, green, and/or blue. In one example, the timing controller 110, source driver 112, and gate driver 114 may carry out a particular column inversion scheme that increases the transmittance of the red, green, and/or blue pixels of the display 18. During the manufacture of the display 18, for example, a particular display panel configuration may be installed into the display 18 that, when a column inversion scheme is carried out, shifts more toward red, green, or blue in a way so as to offset the color emitted by the backlight assembly 68. In another example, the white point selection component 122 may cause the driving circuitry 110, 112, and/or 114 to apply various column inversion schemes according to a duty ratio that varies the white point of the display 18 in a red, green, and/or blue direction. In this way, a relatively precise variation in the white point may be effected by the driving circuitry of the display 18. In some embodiments, the column inversion selection component 124 and/or the white point selection component 122 may vary operation depending on a value of a temperature from the temperature-sensing circuitry 28. Since the temperature of the display 18 may impact the white point of the display 18, different temperatures may imply that certain column inversion schemes may be used to more closely achieve a desired white point. In another example, the white point selection component 122 may differentiate between a desired white point and a starting white point of the display 18 (e.g., as programmed upon the manufacture of the display 18). The white point selection component 122 may cause the column inversion selection component 124 to vary which column inversion scheme is applied so as to likely achieve a white point closer to the desired white point.

The column inversion selection component 124 may enable the selection of a particular column inversion scheme. In some examples, the white point selection component 122 and/or column inversion selection component 124 may represent a memory register that causes the timing controller 110 to control the source driver 112 and gate driver 114 to carry out certain column inversion schemes. The column inversion selection component 124 may relate to which type of column inversion scheme the driving circuitry 110, 112, and/or 114 use to drive the display panel 118. For example, the column inversion selection component 124 may control the switches used in the driving circuitry and/or the order of the image data supplied to the driving circuitry to apply a particular column inversion scheme.

Using timing and data signals from the timing controller 110, the gate driver 114 may apply a gate activation signal across gate lines 126, and the source driver 112 may apply image data signals (e.g., red (R), green (G), and blue (B) image data) on source lines 128 to program rows of pixels 60. Each pixel includes a thin film transistor (TFT) 130. A drain 132 of each TFT 130 is attached to a pixel electrode (PE) 134. A source 136 of each TFT 130 supplies the respective data signals to the pixel electrode (PE) 134 when a gate 138 of the TFT 130 is activated. As such, when a gate signal is applied across a gate line 126, the respective TFTs 130 whose gates 138 are coupled to that gate line 126, will become activated. Data signals provided by the source driver 112—by now converted into an analog voltage—to the source lines 128 will be programmed onto the particular pixel electrodes (PEs) 134. The voltage difference between the signal programmed on the pixel electrode 134 and a corresponding common electrode (not shown) will generate an electric field. This electric field will vary the liquid crystal layer 78 to modulate the amount of light passing through the pixel 60. By varying the amount of light passing through red, green, and blue pixels, a great variety of colors can be expressed on the display 18.

To prevent the liquid crystal layer 78 of the display 18 from becoming biased, the data signals supplied to the pixel electrodes (PEs) 134 the polarity of the signals will be switched occasionally under a column inversion scheme. This may generally mean that the polarity of data supplied to a pixel 60 may be switched each frame, although the polarity of the data may be switched at other times (e.g., after multiple frames). In any case, a particular column inversion scheme may involve supplying all pixels of a particular column of pixels with data of the same polarity during at least one frame.

Figure 8:
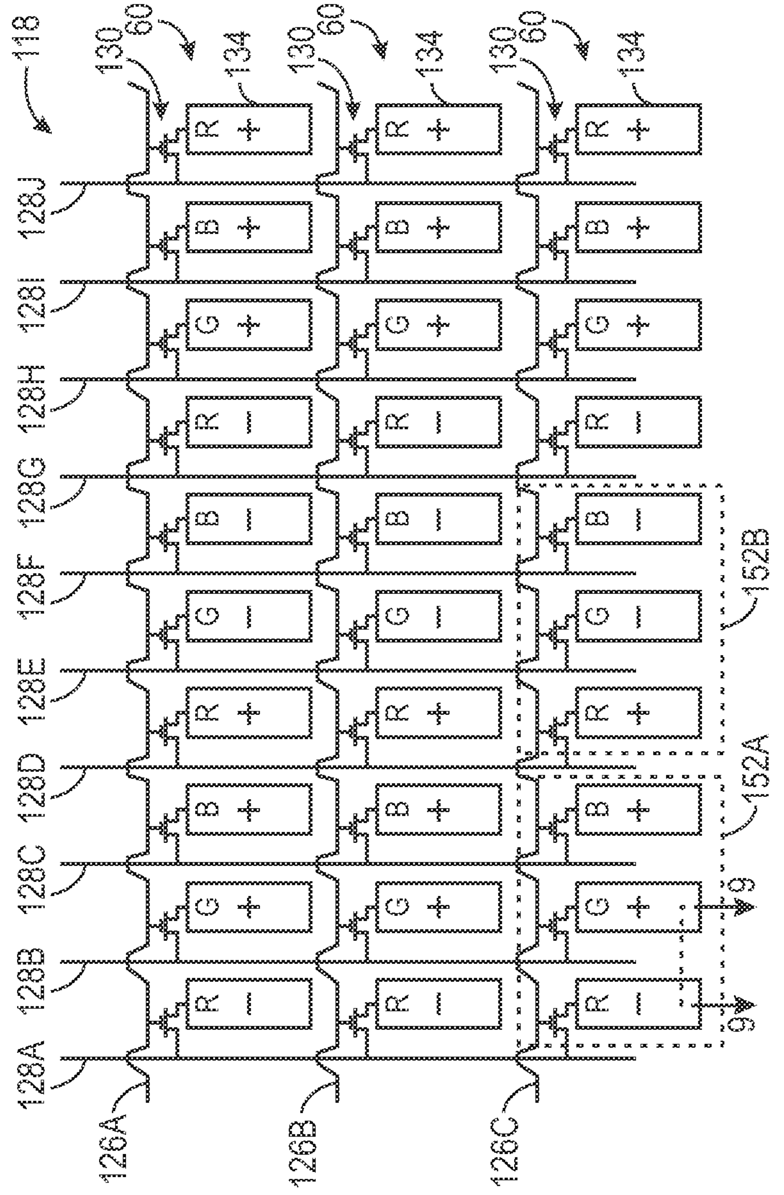
FIG. 8 is a schematic diagram of a 3-column inversion scheme with enhanced blue pixel transmittance, in accordance with an embodiment.

One example of a column inversion scheme that may be applied by the display 18 appears in a display panel layout 150 of FIG. 8. In particular, the display panel layout 150 of FIG. 8 illustrates a 3-column inversion scheme on the pixel array of the display panel 118. The example of FIG. 8 shows a subset of the pixels 60 appearing on the display panel 118. Three gate lines 126A-C are shown to supply activation signals to three corresponding rows of pixels 60 and ten source lines 128A-J supply data signals to ten corresponding columns of pixels 60. Note that each pixel 60 includes a respective TFT 130 and a pixel electrode 134.

Each pixel 60 modulates light through a red, green, or blue filter. In the example of FIG. 8, groups of red (R), green (G), and blue (B) pixels form superpixels (e.g., superpixels 152A and 152B). The 3-column inversion scheme illustrated in the display panel layout 150 repeats every two superpixels 152. Thus, the two superpixels 152A and 152B include the following polarities: R(−), G(+), B(+), R(+), G(−), and B(−). This pattern may repeat across the entire display 18. The polarities of these columns are switched occasionally (e.g., on a frame-by-frame basis). Thus, at a different time, the two superpixels 152A and 152B may instead include the following polarities: R(+), G(−), B(−), R(−), G(+), and B(+).

Figure 9:
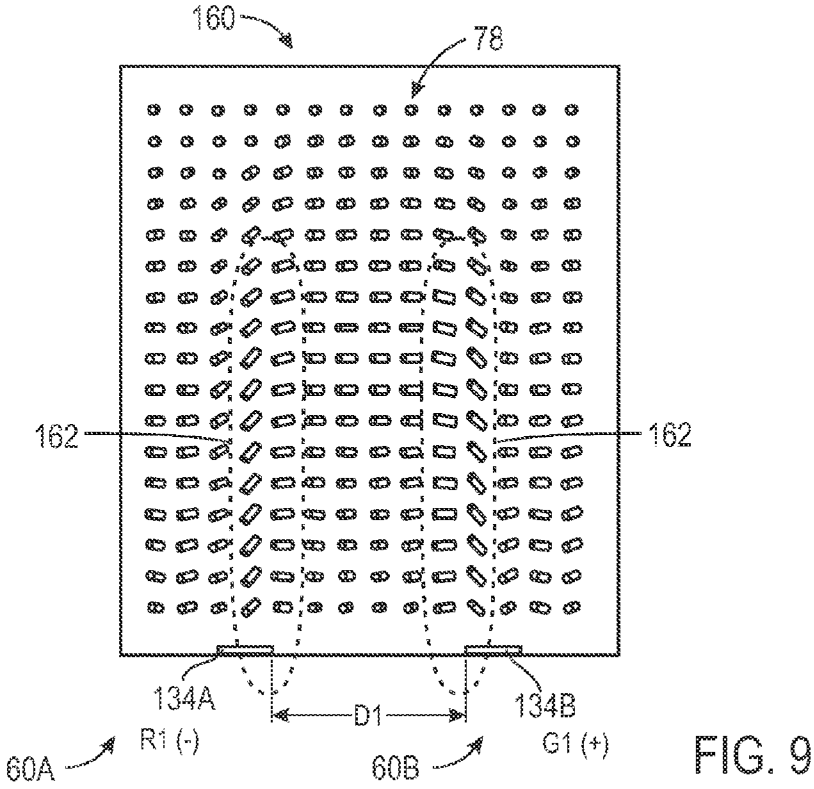
FIGS. 9 and 10 are cross-sectional views of a liquid crystal layer between two pixels driven at opposite polarities at two respective spacings, D1 and D2, in accordance with an embodiment.

The display panel layout 150 of FIG. 8, employing the 3-column inversion scheme so shown, may have the effect of emphasizing the transmittance of the blue pixels 60 of the pixel array of the display panel 118. Specifically, columns of pixels 60 driven at opposite polarities adjacent to one another will have slightly lower transmittance than adjacent columns of pixels 60 driven at the same polarities. An explanation appears in FIG. 9. Specifically, a liquid crystal diagram 160 of FIG. 9 represents a cross-sectional view of two subpixels driven at opposite polarities in the superpixel 152A of FIG. 8 at cut lines 9-9. In the liquid crystal diagram 160, the liquid crystal molecules of the liquid crystal layer 78 are shown to vary in orientation between two pixels 60A and 60B. In the example of FIG. 9, the pixel 60A is a red pixel driven at a negative polarity and the pixel 60B is a green pixel driven at a positive polarity. The pixel 60A includes a pixel electrode 134A and the pixel 60B includes a pixel electrode 134B. A distance D1 separates the pixel electrodes 134A and 134B. In the example of FIG. 9, the distance D1 represents a separation distance typical of two adjacent pixels. However, when driven at opposite polarities, the orientation of the liquid crystals molecules of the liquid crystal layer 78 may twist in such a way that transmittance is reduced. Specifically, as illustrated at areas 162 of the liquid crystal layer 78, such liquid crystal twisting results in reduced transmittance of light passing through the liquid crystal areas 162.

Figure 10:
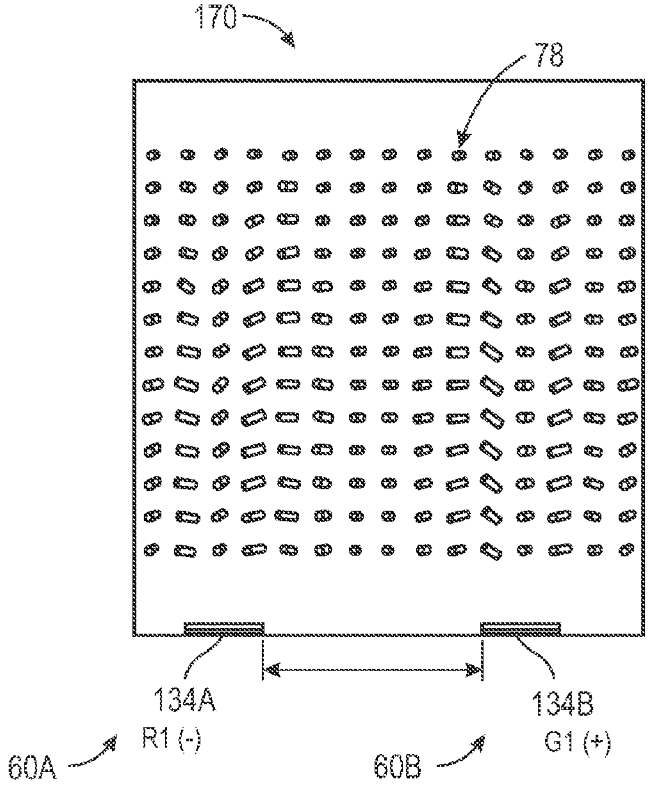

Increasing the spacing between the pixel electrodes 134A and 134B, as shown in FIG. 10, may mitigate this reduced transmittance. In FIG. 10, a liquid crystal diagram 170 shows that the orientation of the liquid crystal molecules of the liquid crystal layer 78 do not include the type of twisting found in the areas 162 of FIG. 9 when the spacing is increased. Specifically, pixel electrodes 134A and 134B are disposed far enough apart from one another, at a distance D2, such that the transmittance of the pixels 60A and 60B are not significantly reduced. Indeed, the distance D2 may be selected such that the transmittance through pixels 60A and 60B, driven at opposite polarities, may be substantially the same as similar pixels driven at the same polarity when supplied that same image data signals.

FIGS. 11-15 illustrate various display panel layouts in which columns of pixels are driven at opposite polarities are spaced further apart than columns driven at the same polarities. The examples of FIGS. 11-15 all show a subset of the pixels 60 appearing on the display panel 118. Three gate lines 126A-C are shown to supply activation signals to three corresponding rows of pixels 60 and ten source lines 128A-J supply data signals to ten corresponding columns of pixels 60. Each pixel 60 includes a respective TFT 130 and a pixel electrode 134. Each pixel 60 modulates light through a red, green, or blue filter. In the examples of FIGS. 11-15, red (R), green (G), and blue (B) pixels may have spacings between one another that vary depending on the column inversion scheme that the display panel 118 can carry out. In particular, adjacent columns of pixels driven at opposite polarities may be spaced farther apart (e.g., distances D2) than adjacent columns of pixels driven at the same polarity (e.g., distances D1).

In the examples of FIGS. 11-15, it should be appreciated that the distances D1 and the distances D2 need not be uniform everywhere throughout the display panel 118. Indeed, the distances D1 in one location of the display panel 118 may vary somewhat from the distances D1 in another location of the display panel 118. Likewise, the distances D2 in one location of the display panel 118 may vary somewhat from the distances D2 in another location of the display panel 118. For example, local electrical conditions may vary slightly, increasing or decreasing the impact of the distances D2 on the transmittance of adjacent pixels 60. In any case, however, nearby distances D2 may always be larger than nearby distances D1. As discussed above, the distance D2 may be selected to be any suitable distance that reduces the loss of transmittance caused by the change in polarity between certain adjacent columns. The distance D2 may be larger than D1, but it should be appreciated that the distances D1 and D2 may not have the precise relationship shown schematically in FIGS. 11-15. Moreover, it should be appreciated that while FIGS. 11-15 provide a few specific examples of display panel layouts with columns of pixels separated by distances D1 and D2, these examples are not meant to be exhaustive. Indeed, these examples are meant to suggest any suitable variations (e.g., which colors of pixels are grouped into columns, which pixel colors are selected as the center pixel(s) in groups of columns of pixels driven at like polarity, and so forth) while [illustrating the application of variable spacings between certain columns of pixels.

Figure 11:
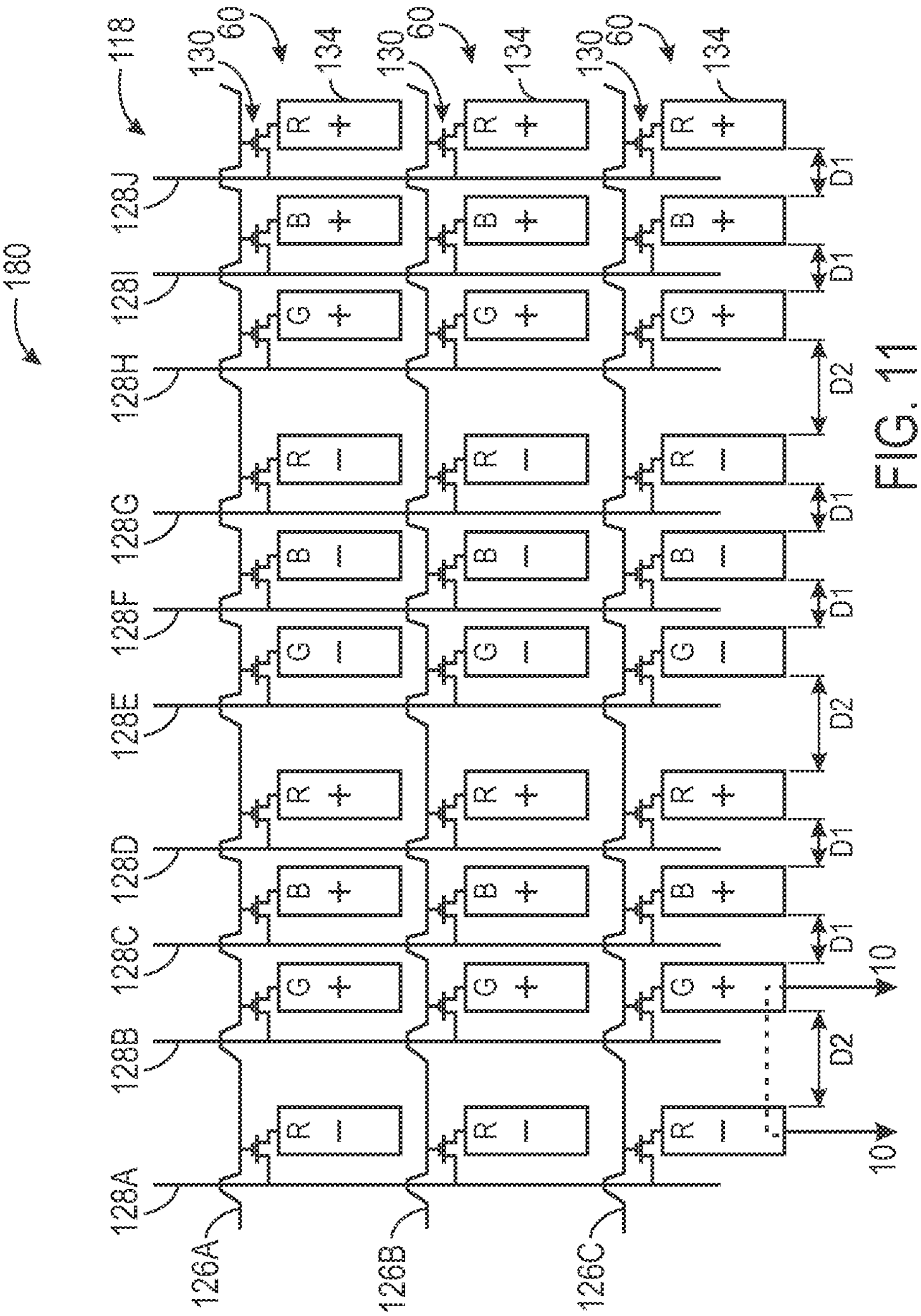
FIG. 11 is a schematic diagram of a display panel employing 3-column inversion and having increased spacing between columns driven at opposite polarities, in accordance with an embodiment.

FIG. 11 schematically illustrates a display panel layout 180 that employs 3-column inversion with certain variable spacing to reduce losses in pixel transmittance. The display panel layout 180 of FIG. 11 is similar to the display panel layout 150 of FIG. 8, except that columns of pixels of opposite polarities are spaced farther apart. As seen in FIG. 11, adjacent green (G) and blue (B) pixels and adjacent red (R) and blue (B) pixels will be driven at the same polarities. As such, any suitable distance D1 may separate these pixels from one another. On the other hand, adjacent red (R) and green (G) pixels will be driven at opposite polarities. As such, any suitable distance D2 greater than D1 may separate adjacent red (R) and green (G) pixels.

Figure 12:
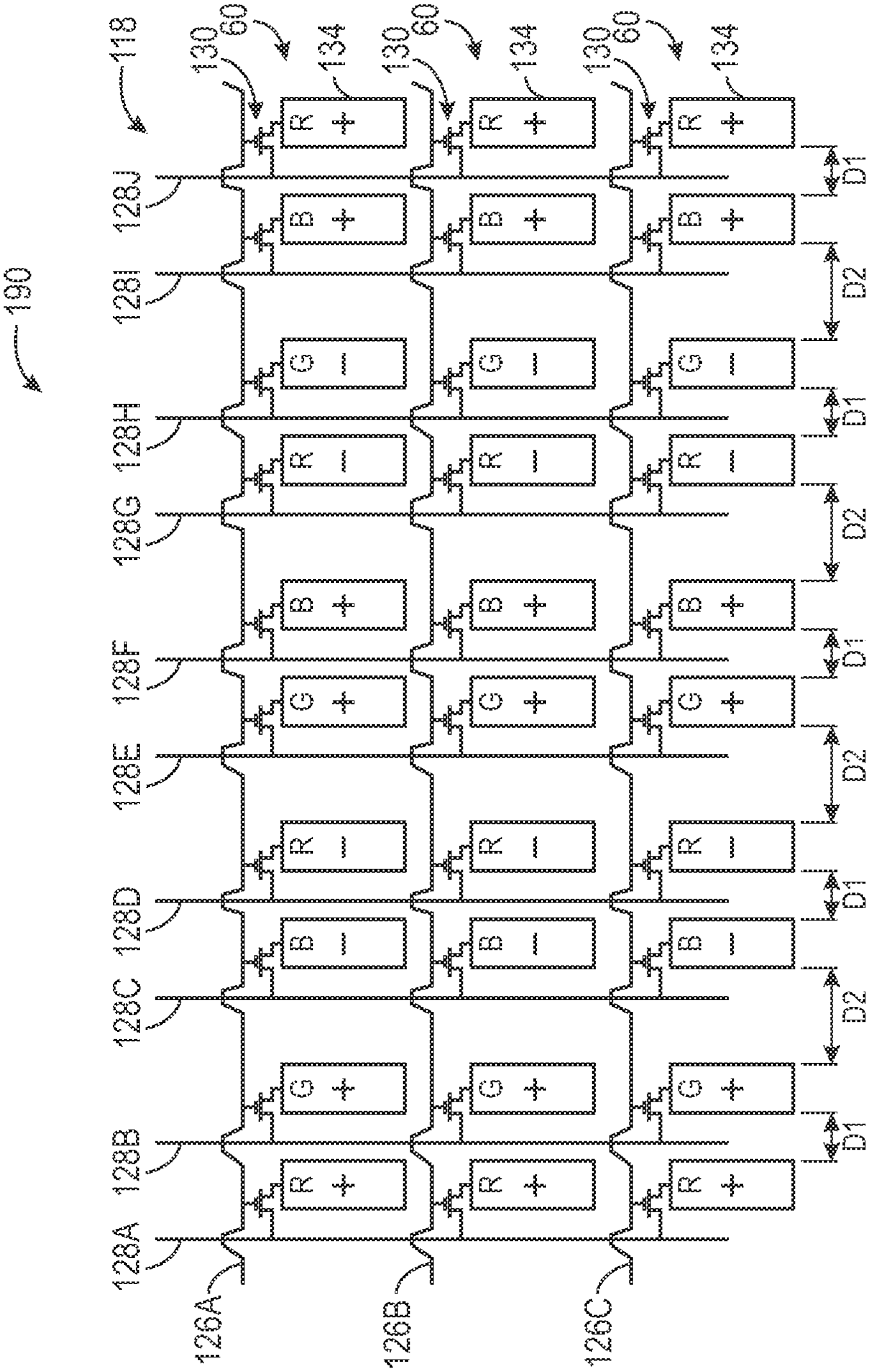
FIG. 12 is a schematic diagram of a display panel employing 2-column inversion and having increased spacing between columns driven at opposite polarities, in accordance with an embodiment.

FIG. 12 schematically illustrates a display panel layout 190 that employs 2-column inversion with certain variable spacing to reduce losses in pixel transmittance. In FIG. 12, groups of two adjacent pixels are driven at the same polarity, which alternates accordingly throughout the display panel 118. Thus, as shown in FIG. 12, first adjacent columns of red (R) and green (G) pixels both may be driven at one polarity, while the next two adjacent columns—blue (B) and red (R)—both may be driven an opposite polarity from that of the first two columns of red (R) and green (G) pixels. In keeping with the discussion above, a distance D1 may separate the first adjacent columns of red (R) and green (G) pixels and a distance D1 may separate the subsequent blue (B) and red (R) columns of pixels. To reduce the impact of driving the columns of green (G) and blue (B) pixels in the second and third columns shown in FIG. 12 at opposite polarities, however, these columns of pixels may be separated by a suitable distance D2 larger than the distance D1 (e.g., D2).

Figure 13:
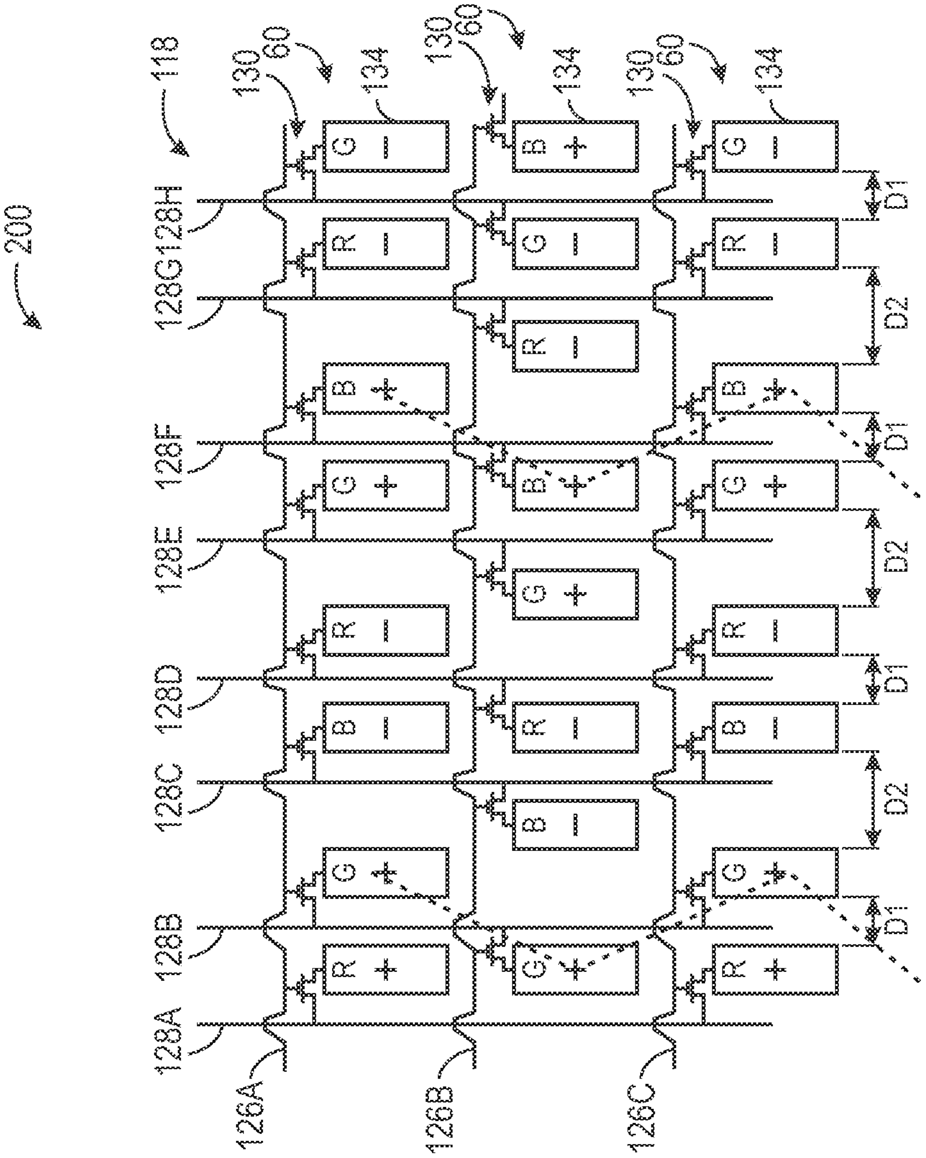
FIG. 13 is a schematic diagram of a display panel employing 2-column Z-inversion and having increased spacing between columns driven at opposite polarities, in accordance with an embodiment.

The configuration generally shown in FIG. 12 may be adjusted to obtain a display panel layout 200 of FIG. 13, in which pixel electrodes 134 of columns are alternately disposed on different sides of the source lines 128 to create a zig-zag pattern of columns. Although the example of FIG. 13 employs 2-column inversion, the zig-zag pattern shown in FIG. 13 may alternatively employ any other suitable column inversion scheme (e.g., 3-column inversion) by grouping more columns of pixels together driven at the same polarity. In any case, the resulting column inversion may be referred to as Z-inversion due to the Z-shaped pattern appearing on the display panel 118. In FIG. 13, as in FIG. 12, a distance D1 may separate the first adjacent columns of red (R) and green (G) pixels and a distance D1 may separate the subsequent blue (B) and red (R) columns of pixels despite the zig-zag pattern of the columns. To reduce the impact of driving the columns of green (G) and blue (B) pixels in the second and third columns shown in FIG. 13 at opposite polarities, however, these columns of pixels may be separated by a suitable distance D2 larger than the distance D1.

Figure 14:
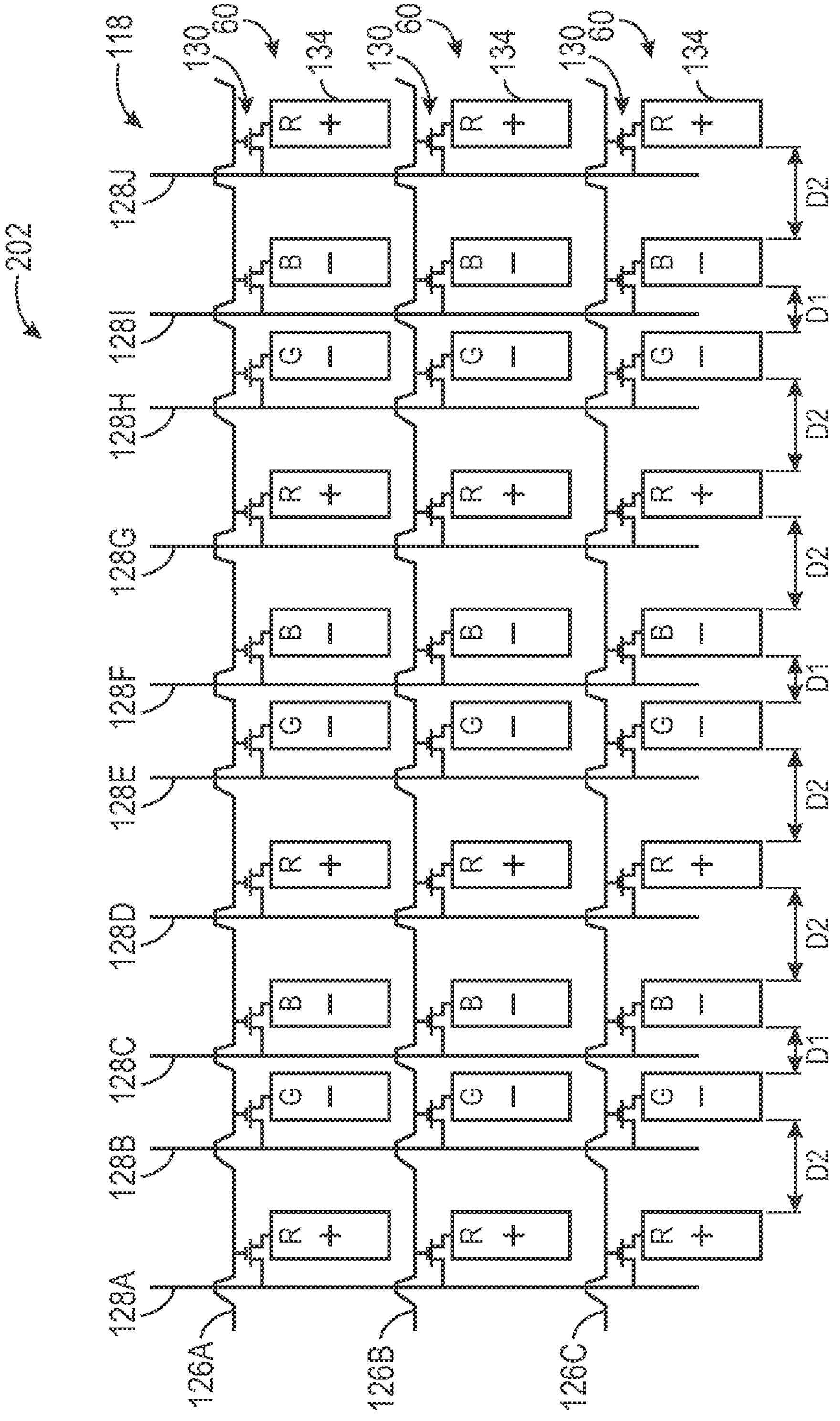
FIGS. 14 and 15 are schematic diagrams of display panels employing 2/1-column inversion and having increased spacing between columns driven at opposite polarities, in accordance with an embodiment.

In FIG. 14, a display panel layout 202 implements a 2/1-column inversion scheme with variable separation distances between columns. While a frame is being programmed onto the pixels 60 of the display panel 118, red (R) pixels are driven at one polarity and green (G) and blue (B) pixels are driven at another polarity. In other examples, green (G) or blue (B) may take the place of red (R) in the display panel layout 202 of FIG. 14. In any case, a distance D1 may separate adjacent columns both driven at one polarity, while a distance D2 may separate the solitary columns driven at the other polarity from the others.

Figure 15:
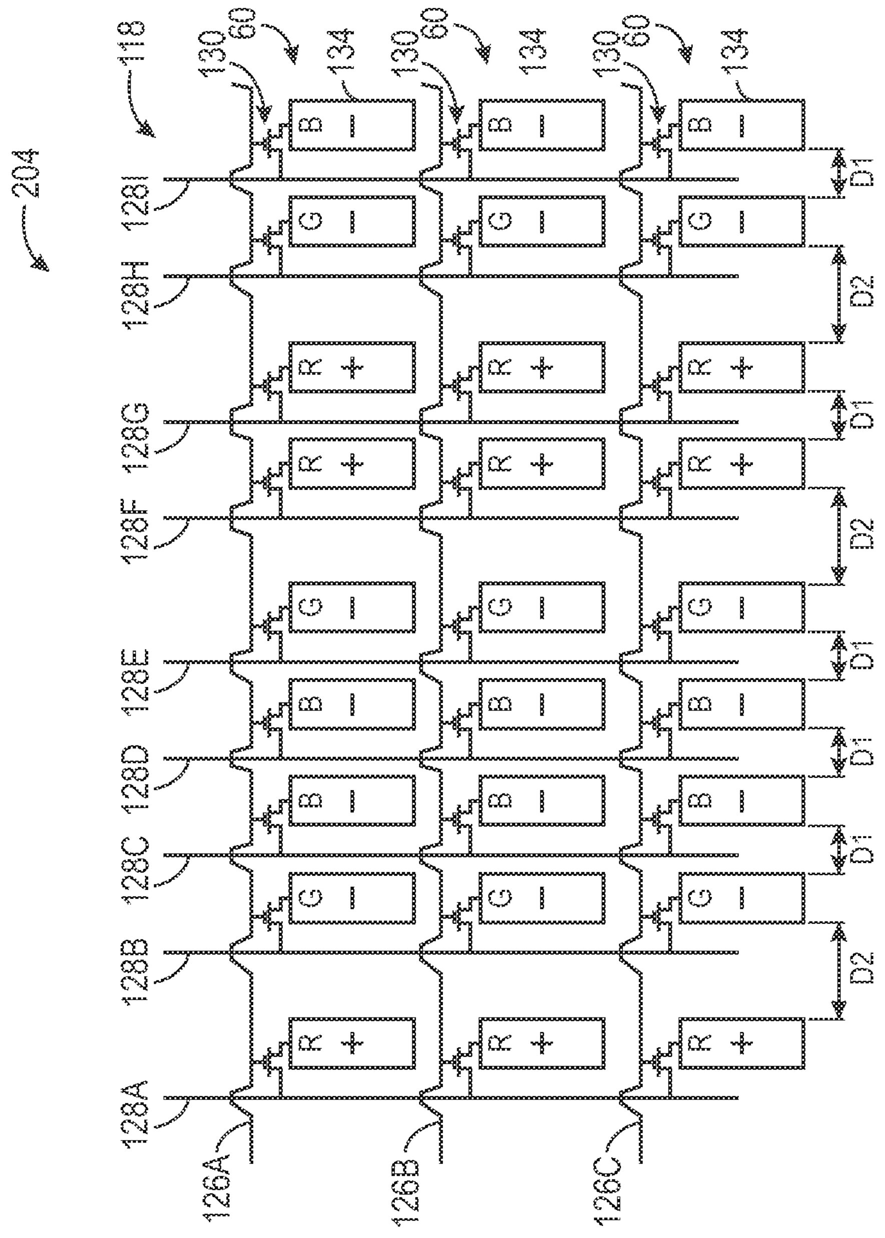

A display panel layout 204 of FIG. 15 represents an example of 4/2 column inversion, in which columns of pixels appear in the following order: red, green, blue, blue, green, red, and so forth. In a manner similar to the display panel layout 202 of FIG. 14, while a frame is being programmed onto the pixels 60 of the display panel 118, red (R) pixels are driven at one polarity and green (G) and blue (B) pixels are driven at another polarity. As such, groups of two columns of pixels (adjacent red (R) pixels) of one polarity and groups of four columns (adjacent green (G), blue (B), blue (B), and green (G) pixels) of another polarity may be formed. A distance D2 may separate these larger groups of pixels, while an internal distance D1 may separate individual pixels in the groups.

Figure 16:
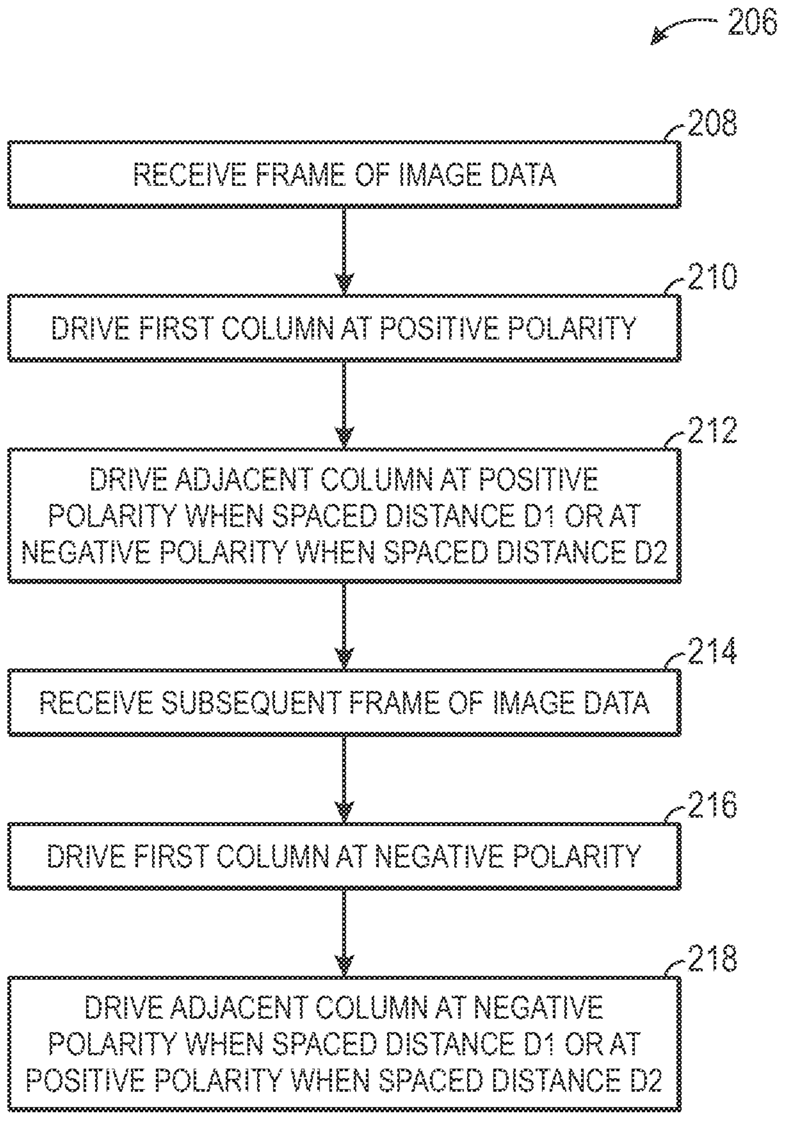
FIG. 16 is a flowchart describing a method for driving a display panel with improved transmittance between columns driven at opposite polarities, in accordance with an embodiment.

FIG. 16 is a flowchart 206 describing a method for driving a display 18 using a display panel layout such as those discussed above with reference to FIGS. 11-15. The flowchart 206 may begin when the timing controller 110 receives image data 106 for a first frame (block 208). A first column of pixels 60 may be driven at a positive polarity (block 210). An adjacent column of pixels 60 also may be driven at the positive polarity when spaced the distance D1 from the first column of pixels (block 212). When spaced the distance D2 from the first column of pixels, the adjacent column of pixels may be driven at a negative polarity (block 212). At a later time, the timing controller 110 may receive image data 106 for a second frame (block 214). For this second frame, the first column of pixels 60 may be driven at a negative polarity (block 216). The adjacent column of pixels 60 may be driven at the negative polarity for the second frame when spaced the distance D1 from the first column of pixels (block 212). When spaced the distance D2 from the first column of pixels, the adjacent column of pixels may be driven at a positive polarity for the second frame (block 212).

Regardless of whether the spacings D1 and D2 appear in the display 18 as discussed above, 3-column inversion may provide an efficient manner of driving columns of pixels 60 of the display 18. When the spacings D1 and D2 are not used, however, it should be noted that certain column inversion schemes may affect the transmittance of certain colors of the display panel 118. In the 3-column inversion discussed above with reference to FIG. 8, for example, the transmittance of blue pixels 60 may be enhanced in relation to the other pixels. Specifically, since columns of blue pixels are driven at the same polarity as adjacent columns of green and red pixels, the loss of transmittance discussed above with reference to FIG. 9 does not occur on either side of the column of blue pixels. On the other hand, the columns of pixels on opposite sides of the red and green pixels of a group of red, blue, and green pixels driven at the same polarity, may be driven at opposite polarities. Thus, the transmittance may be reduced in the red pixels and green pixels in relation to the blue pixels. Thus, when carrying out the 3-column inversion of FIG. 8, blue pixels may have greater transmittance than the red pixels or green pixels.

Figure 17:
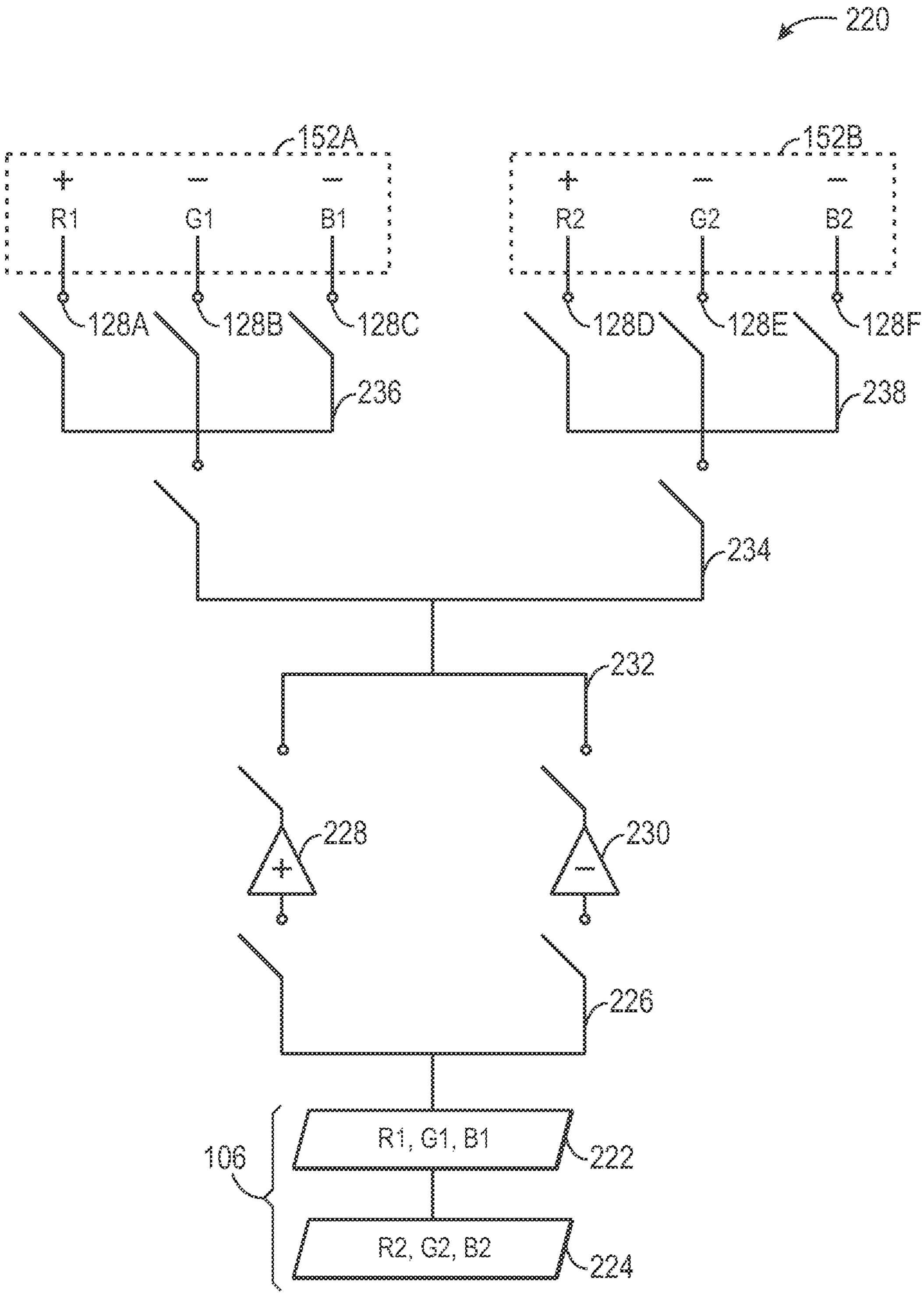
FIG. 17 is a schematic diagram of driving circuitry to perform 3-column inversion, in accordance with an embodiment.

Columns of superpixels 152A and 152B may be driven according to a 3-column inversion scheme, such as that described above with reference to FIG. 8, using driving circuitry 220 shown in FIG. 17. The driving circuitry 220 may receive image data 106 in the same order it may be received from the processor(s) 12. Specifically, first image data 222 may include image data 106 for the first superpixel 152A in red, green, blue order (e.g., R1, G1, B1). Second image data 224 for the second superpixel 152B is also supplied in red, green, blue order (e.g., R2, G2, B2).

In the example of FIG. 17, the ultimate polarities of the image data supplied to the driving circuitry 220 are shown to be R1(+), G1(−), B1(−), R2(−), G2(+), and B2(+). As such, in the example of FIG. 17, the driving circuitry 220 may include a demultiplexer 226 to feed the image data 106 into a positive source amplifier 228 or a negative source amplifier 230. In alternative embodiments, the image data 106 may feed into both the positive source amplifier 228 and the negative source amplifier 230. The resulting amplified analog image data may be output to a multiplexer 232 before being demultiplexed, using a demultiplexer 234, and output to a 3-column time demultiplexer 236 or 238. Additionally or alternatively, the multiplexer 232 and the demultiplexer 234 may represent switches.

The amplified analog image data from the demultiplexer 234 may enter the 3-column time demultiplexers 236 and 238. The demultiplexer 236 may time demultiplex the amplified analog image data to proper source lines 128A, 128B, and 128C. The demultiplexer 238 may time demultiplex the amplified analog image data to source lines 128D, 128E, and 128F. To achieve the polarities illustrated in FIG. 17, all of the first image data 222 will not pass through the same source amplifier 228 or 230. Rather, the R1 data is switched through the positive source amplifier 228 before the G1 and B1 image data are switched through the negative source amplifier 230. The second image data 224 will undergo similar switches. Namely, the image data R2 is switched through the negative source amplifier 230 before the image data G2 and B2 are switched through the positive source amplifier 228.

Figure 18:
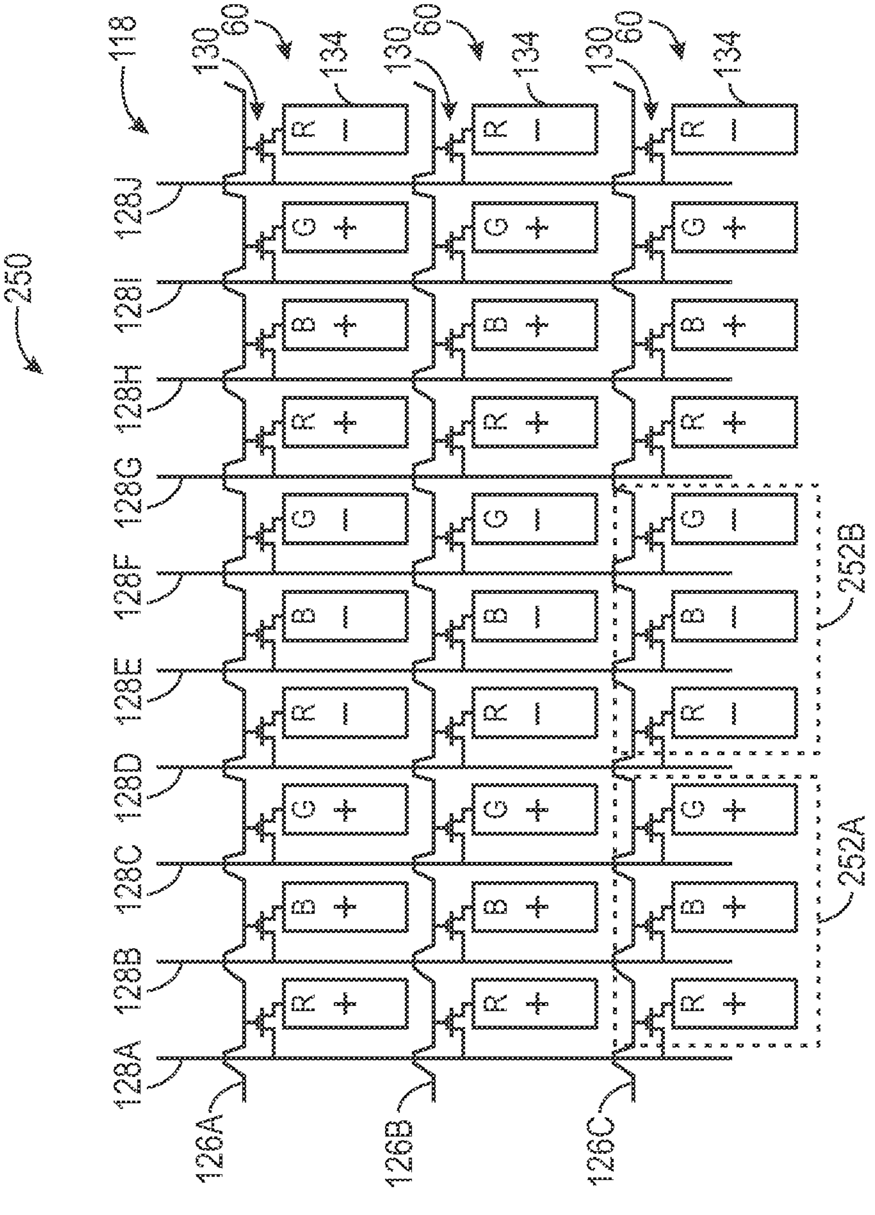
FIG. 18 is a schematic diagram of a display panel employing 3-column inversion with increased blue pixel transmittance, in accordance with an embodiment.

Switching the image data 222 and 224 through the driving circuitry 220 in this way may be relatively complex. Moreover, it may be relatively electrically costly to alternate between passing data between the positive source amplifier 228 and negative source amplifier 230. Accordingly, other manners of performing 3-column inversion are described with reference to FIGS. 18-25. Turning to FIG. 18, a display panel layout 250 includes superpixels 252A and 252B. The superpixels 252 of the display panel layout 250 are arranged in red-blue-green order rather than the typical red-green-blue order. Thus, in the display panel layout 250, blue pixels remain surrounded by pixels of the same polarity. Since the blue pixels are surrounded by pixels of the same polarity, the transmittance of the blue pixels will be enhanced in relation to that of the red and green pixels, which are adjacent to at least one pixel driven at opposite polarity.

Figure 19:
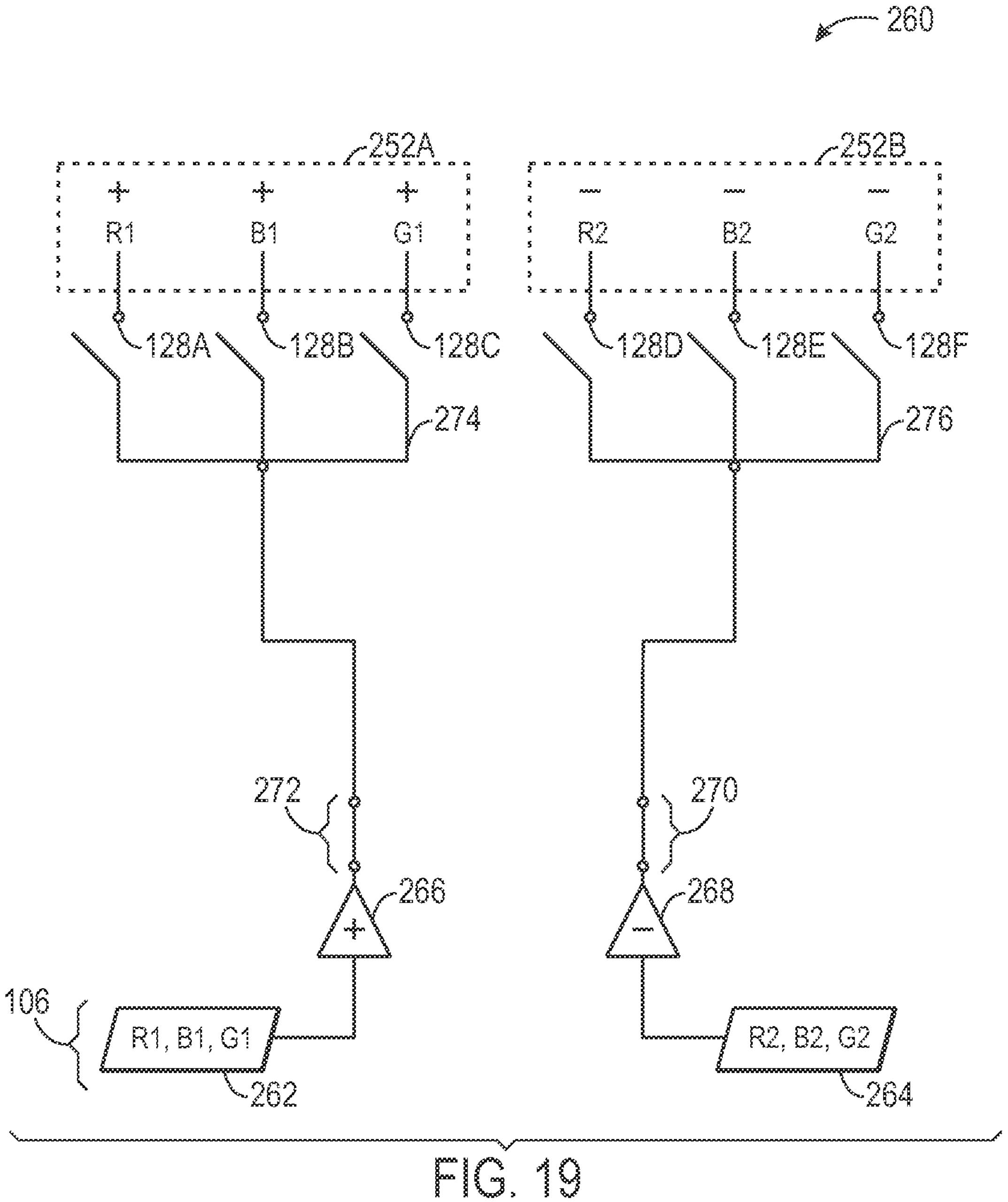
FIG. 19 is a schematic diagram of driving circuitry to perform the 3-column inversion of FIG. 18 using source amplifiers switched on a frame-by-frame basis, in accordance with an embodiment.

To achieve the 3-column inversion illustrated in FIG. 18, driving circuitry 260 of FIG. 19 may be employed. The driving circuitry 260 of FIG. 19 may increase efficiency over the driving circuitry 220 of FIG. 17. In the example of FIG. 19, the image data supplied may be reordered from the red-green-blue order. Specifically, first image data 262 corresponding to the first superpixel 252A may be ordered in a red-blue-green order (e.g., R1, B1, G1). Likewise, second image data 264 may also be ordered in a red-blue-green order (e.g., R2, B2, G2). The first and second image data 262 and 264 may respectively enter a positive source amplifier 266 and a negative source amplifier 268. Switches 270 and 272 will allow the source amplifiers 266 and 268 to switch to different demultiplexers 274 and 276 on different frames. Thus, the switches 270 and 272 can remain in place and need not switch multiple times per frame—or even per superpixel 252. The first demultiplexer 274 demultiplexes image data to program three columns of pixels respectably coupled to the source lines 128A, 128B, and 128C. The second demultiplexer 276 demultiplexers image data to columns of pixels on source lines 128D, 128E, and 128F. The image data 262 and 264 may be supplied to the opposite source amplifiers 266 and 268 on another frame.

Figure 20:
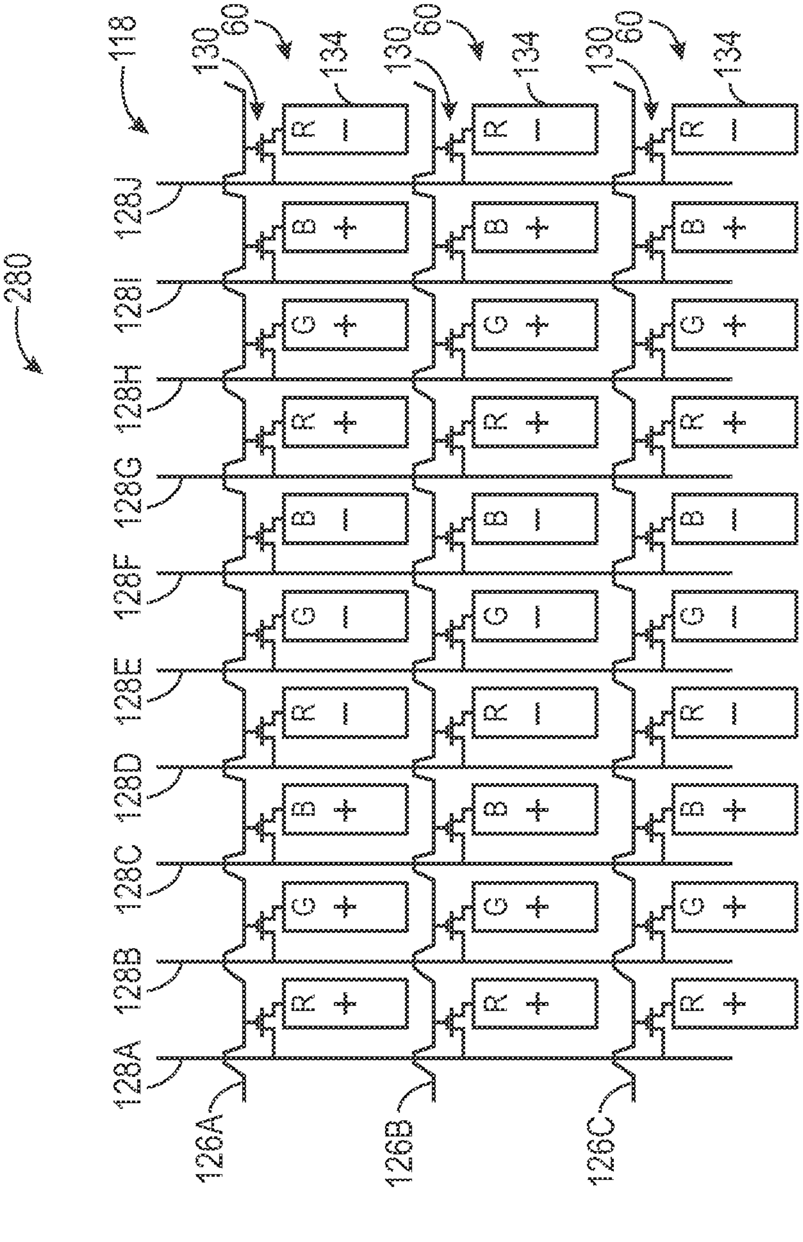
FIG. 20 is a schematic diagram of a display panel employing 3-column inversion with increased green pixel transmittance, in accordance with an embodiment.
Figure 21:
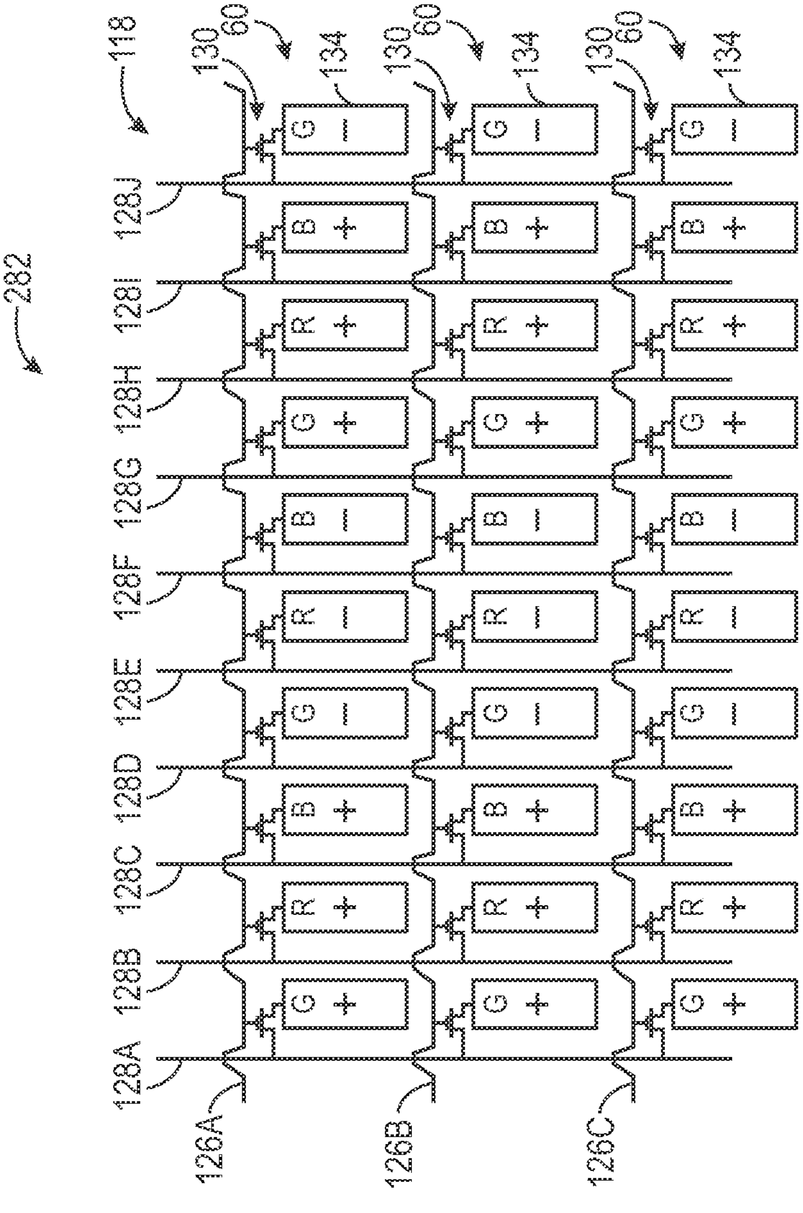
FIG. 21 is a schematic diagram of a display panel employing 3-column inversion with increased red pixel transmittance, in accordance with an embodiment.

While the example of FIG. 19 illustrates 3-column inversion with blue as the central pixel, thereby enhancing the transmittance of blue pixels in relation to the others, other pixels may be centered in other examples. For example, a display panel layout 280 of FIG. 20 shows green as the center column of pixels in another 3-column inversion scheme. Using the display panel layout 280, green color transmittance may be enhanced in relation to other pixels of the display 18. In a display panel layout 282 of FIG. 21, red is the center pixel. Using the display panel layout 282, red color transmittance may be enhanced in relation to other pixels of the display 18. It should be appreciated that the driving circuitry 260 may be employed to drive the display panel layouts 280 of FIG. 20 or 282 of FIG. 21 in substantially the same manner as previously described.

Figure 22:
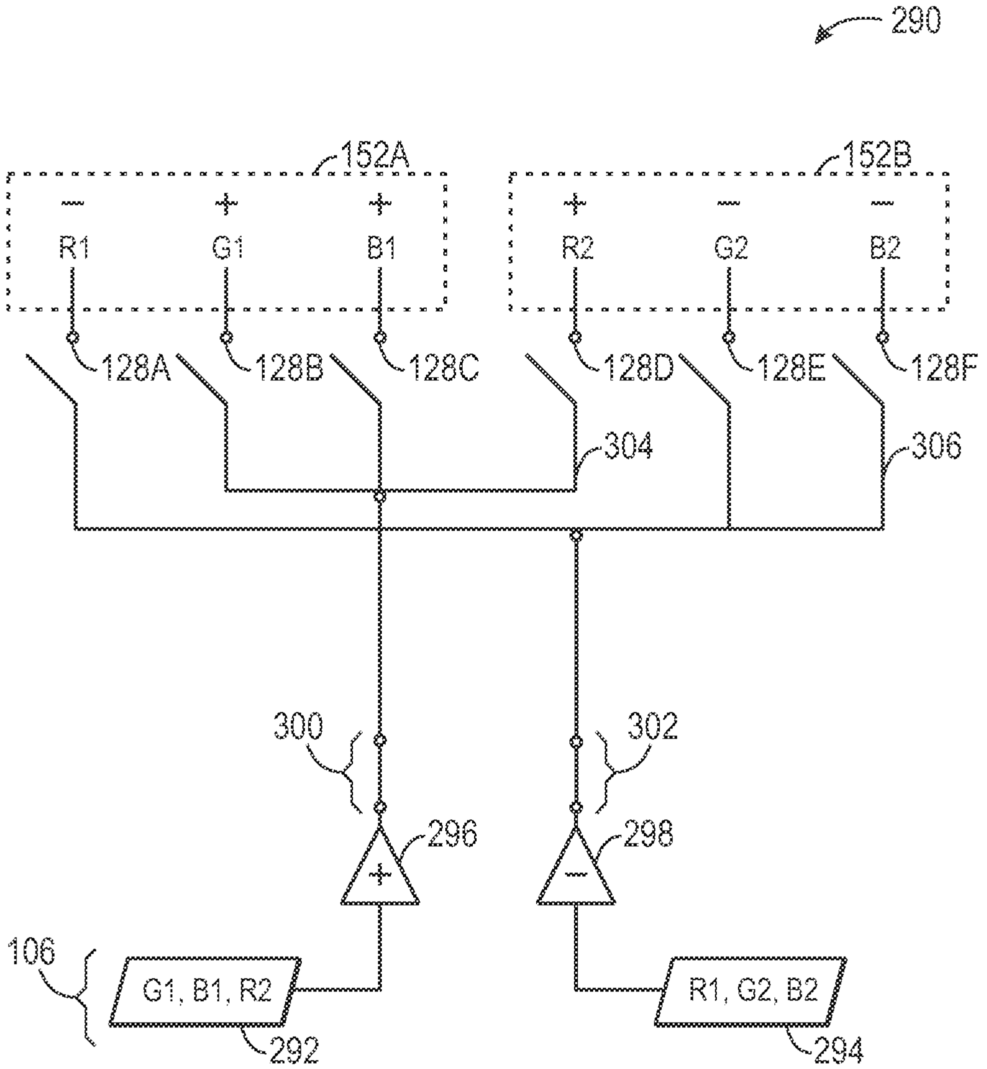
FIG. 22 is a schematic diagram of driving circuitry to perform the 3-column inversion of FIG. 8 using source amplifiers switched on a frame-by-frame basis, in accordance with an embodiment.

Other driving circuitry, such as driving circuitry 290 of FIG. 22, may drive the 3-column inversion and display panel layout 150 of FIG. 8 in a more power efficient manner than the circuitry 220 of FIG. 17. The circuitry 290 of FIG. 22 receives reordered image data 106 that includes first image data 292 and second image data 294. As illustrated, the first image data 292 and the second image data 294 do not respectively correspond to a single superpixel 252—instead, the first image data 292 and the second image data 294 each includes at least one pixel from each superpixel 252A and 252B. As seen in FIG. 22, the first image data 292 contains image data 106 corresponding to G1, B1, R2, and the second image data 294 contains image data 106 corresponding to R1, G2, B2. On one frame, the first image data enters a positive source amplifier 296 and the second image data 294 enters a negative source amplifier 298. On another frame, the first image data 292 may enter the negative source amplifier 298 and the second image data 294 may enter the positive source amplifier 296. Switches 300 and 302 alternate which demultiplexer 304 or 306 is coupled to the source amplifiers 296 and 298 for a given frame. Thus, the switches 300 and 302 only are switched on a frame-by-frame basis, reducing power consumption. Two demultiplexers 304 and 306 supply the image data 106 to the columns of the superpixels 152A and 152B. As illustrated in FIG. 22, the first demultiplexer 304 supplies the image data G1, B1, and R2. The second demultiplexer 306 supplies the image data R1, G2, and B2.

Figure 23:
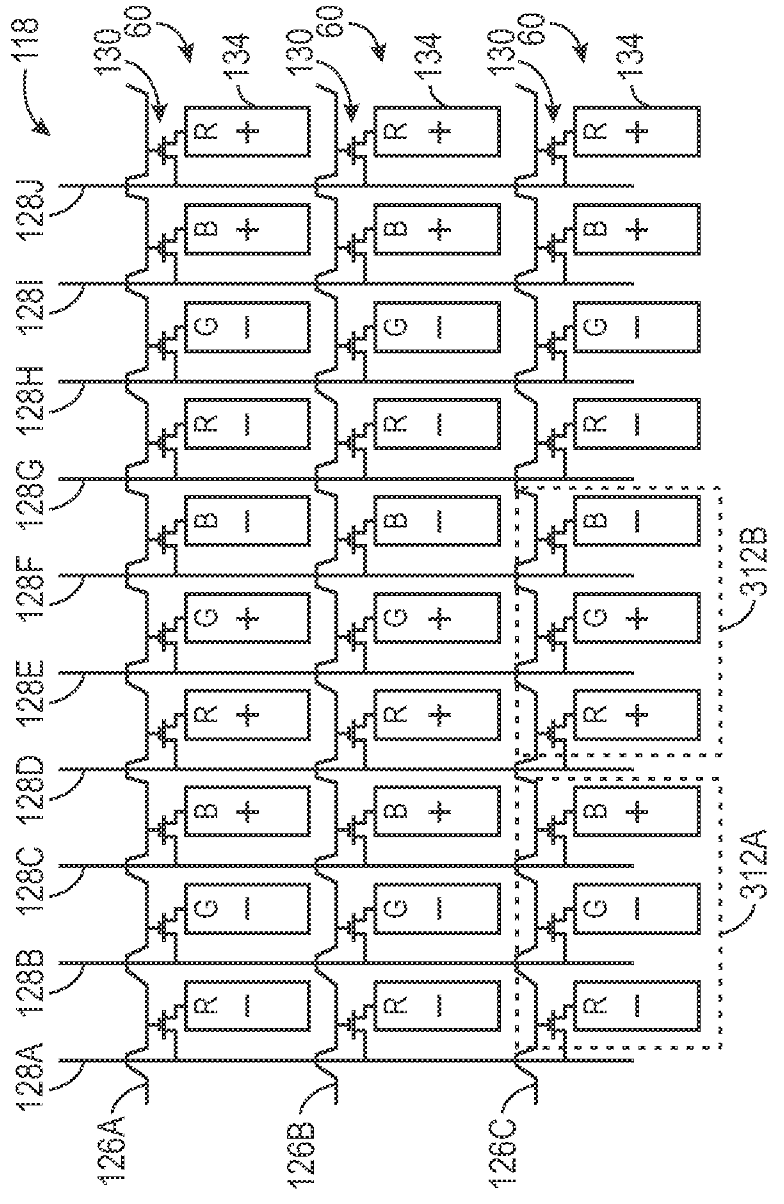
FIG. 23 is a schematic diagram of another display panel employing 3-column inversion with increased red pixel transmittance, in accordance with an embodiment.

Pixel columns of red or green, not only blue as disclosed above, may have enhanced transmittance in relation to the that of other pixel colors using other driving circuitry. In a display panel layout 310 of FIG. 23, for example, performing 3-column inversion as illustrated will enhance the transmittance of the red pixels in relation to green and blue pixels. Specifically, as shown in FIG. 23, columns of red pixels are driven at the same polarity as adjacent columns of green and blue. The change in polarity occurring between blue and green pixel columns will may reduce the transmittance of these pixels near the change in polarity. Since the red pixel is not adjacent to pixels driven at a different polarity, the red pixel will not suffer the same loss of transmittance. Instead, the transmittance of the red pixel will appear enhanced in relation to the transmittance of the other pixels.

Figure 24:
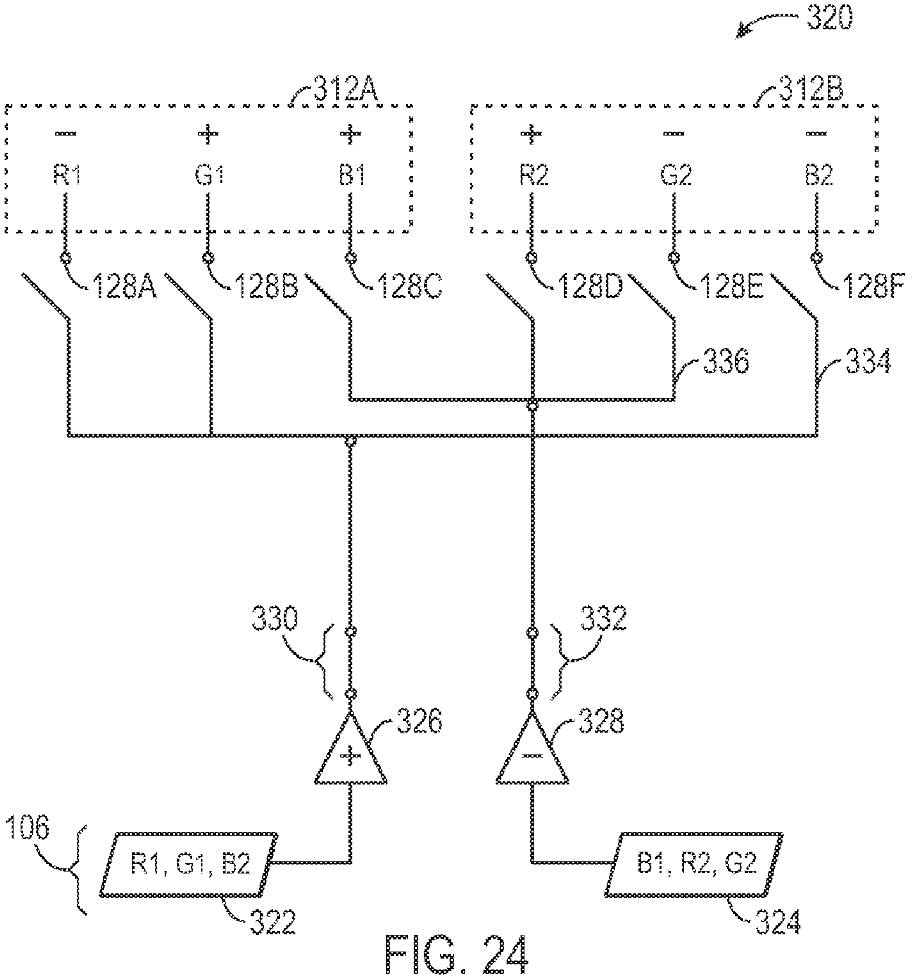
FIG. 24 is a schematic diagram of driving circuitry to perform the 3-column inversion of FIG. 23 using source amplifiers switched on a frame-by-frame basis, in accordance with an embodiment.

Two superpixels 312A and 312B are illustrated in FIG. 23, and may be driven using driving circuitry 320 shown in FIG. 24. The driving circuitry 320 of FIG. 24 may receive reordered image data 106, such as first image data 322 and second image data 324. For one frame, the first image data 322 feeds into a negative source amplifier 326 and the second image data 324 feeds into a positive source amplifier 328. On another frame, the first image data 322 feeds into the positive source amplifier 328 and the second image data 324 feeds into the negative source amplifier 326. Switches 330 and 332 couple the source amplifiers 326 and 328 to respective demultiplexers 334 and 336. Thus, for example, the first image data 322 may pass through the negative source amplifier 326 to the columns R1, G1, and B2. Likewise, the second image data 324 may pass through the positive source amplifier 328 to the columns B1, R2, and G2. The switches 330 and 332 may alternate on different frames to invert the polarity at which the various columns of pixels are driven.

Figure 25:
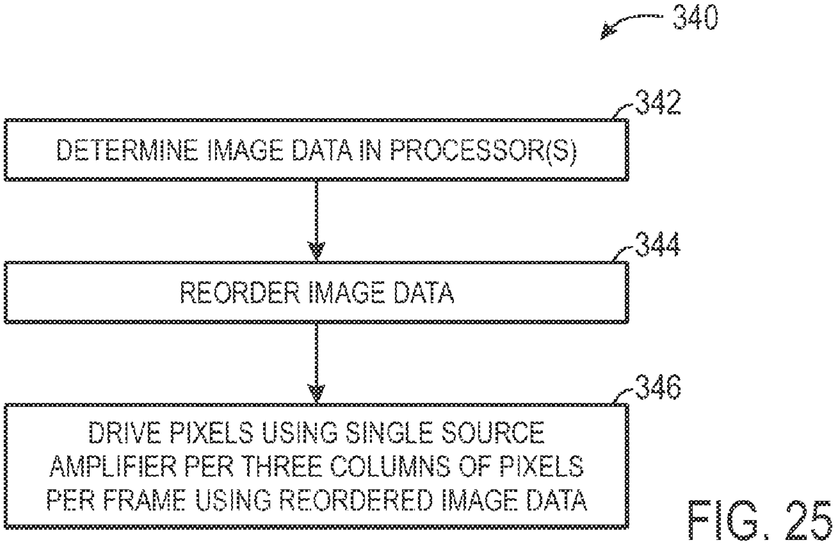
FIG. 25 is a flowchart describing a method for driving a display panel using reordered image data, in accordance with an embodiment.

A flowchart 340 of FIG. 25 represents one way to drive the display 18 using the driving circuitry 260 of FIG. 19, 290 of FIG. 22, 320 of FIG. 24, as well as similar variations. The flowchart 340 may begin when image data is determined in the processor(s) 12 of the electronic device 10. This image data 106 may be provided to the timing controller 110, at which point the timing controller 110 may reorder the image data 106 as appropriate for the driving circuitry to which it will be given (block 344). Alternatively, the processor(s) 12 may reorder the image data 106 before providing the image data 106 to the timing controller 110. Thereafter, the driving circuitry (e.g., 260, 290, or 320) may drive the pixels 60 of the display 18 using the reordered image data 106 (block 346).

Figure 26:
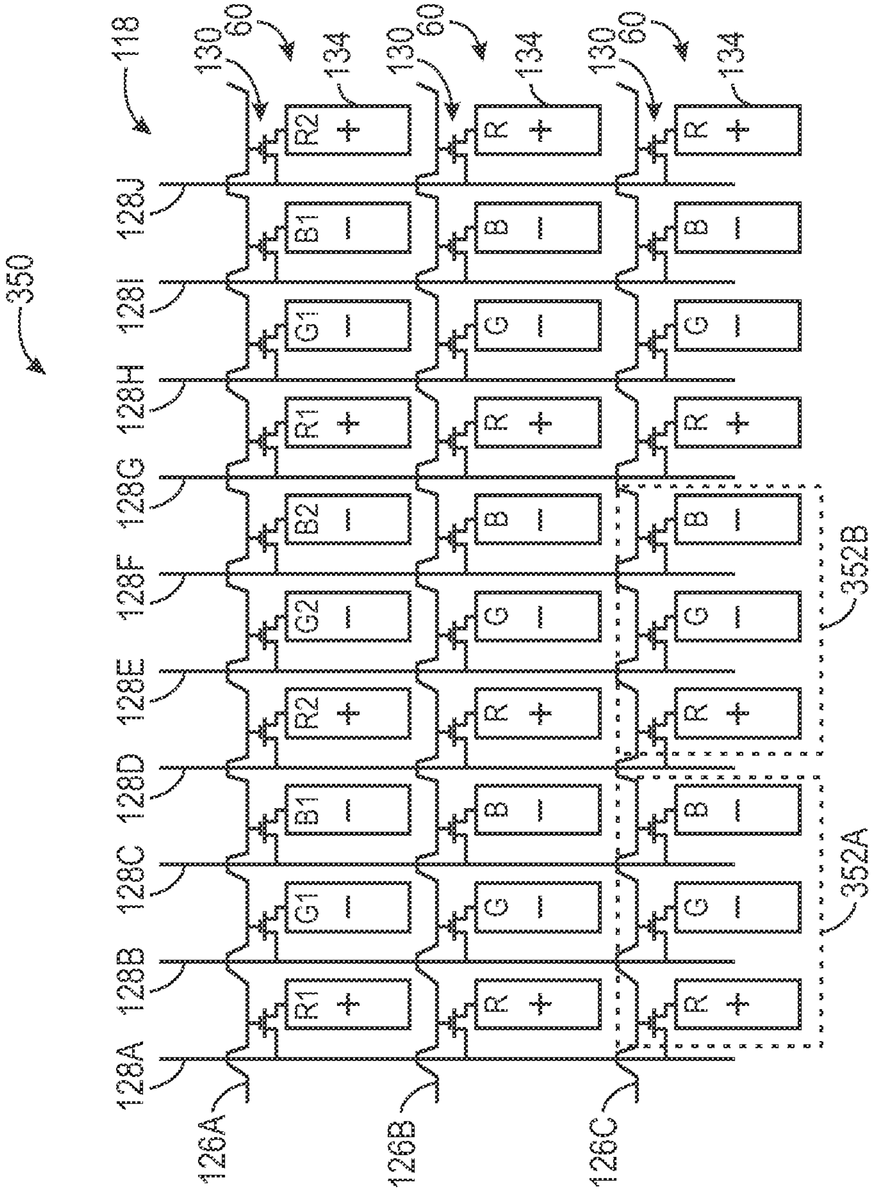
FIG. 26 is a schematic diagram of a display panel employing 2/1-column inversion that emphasizes blue and green pixel transmittance, in accordance with an embodiment.

Other column inversion schemes are contemplated. For example, a display panel layout 350 shown in FIG. 26 illustrates a 2/1-column inversion scheme. As used herein, a "2/1-column inversion scheme" describes a hybrid of a 2-column inversion scheme and a 1-column inversion scheme. In the examples that follow in FIGS. 26-28, a subset of the pixels 60 is shown on the display panel 118. Three gate lines 126A-C are shown to supply activation signals to three corresponding rows of pixels 60 and ten source lines 128A-J supply data signals to ten corresponding columns of pixels 60. Each pixel 60 includes a respective TFT 130 and a pixel electrode 134. Each pixel 60 modulates light through a red (R), green (G), or blue (B) filter.

In the example of FIG. 26, all columns of red pixels are supplied with data driven at one polarity, and columns of blue and green pixels are driven at the opposite polarity. Since the columns of red pixels are surrounded on both sides to columns of pixels driven at an opposite polarity from the column of red pixels, the transmittance of the columns of red pixels will be relatively less than the transmittances of the other columns of pixels—only one adjacent side of the green and blue pixels will be driven at an opposite polarity. Accordingly, the 2/1-column inversion scheme shown in FIG. 26 may also be referred to as 2/1-column inversion (G, B) to indicate that green pixels and blue pixels have slightly increased transmittance in relation to red pixels. Two superpixels 352A and 352B are shown in FIG. 26. These superpixels 352A and 352B will be illustrated in an example of driving circuitry described below with reference to FIG. 29.

Figure 27:
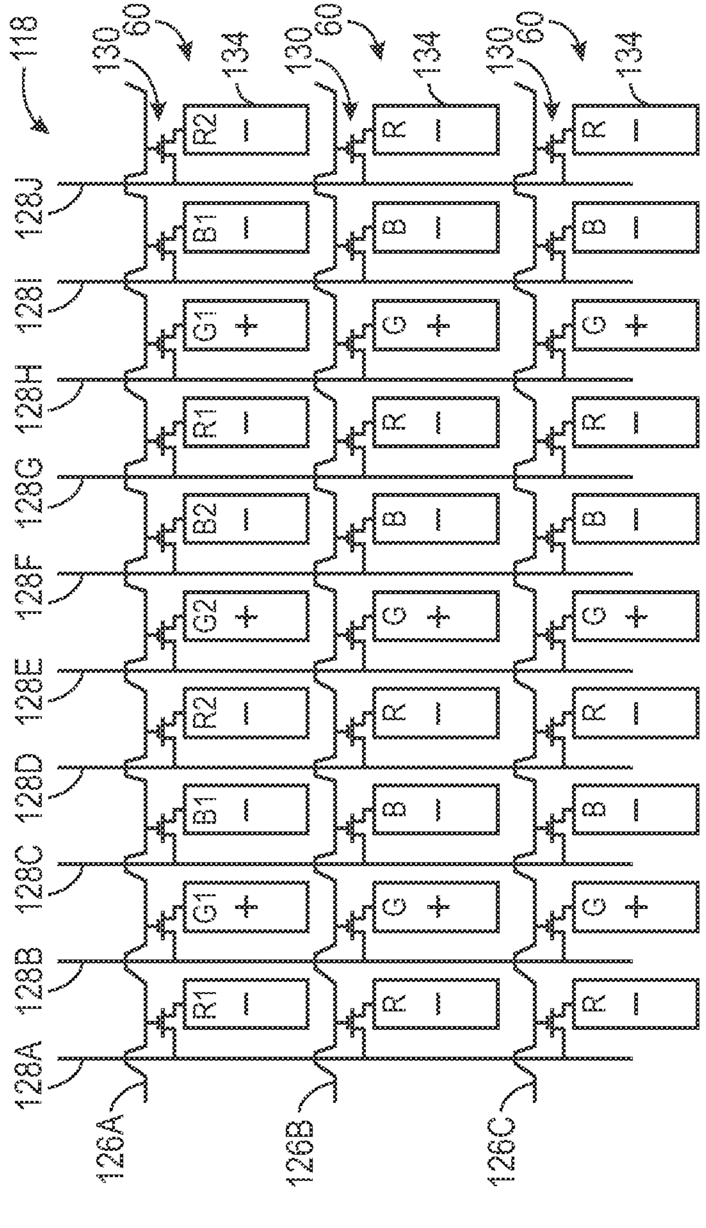
FIG. 27 is a schematic diagram of a display panel employing 2/1-column inversion that emphasizes red and blue pixel transmittance, in accordance with an embodiment.
Figure 28:
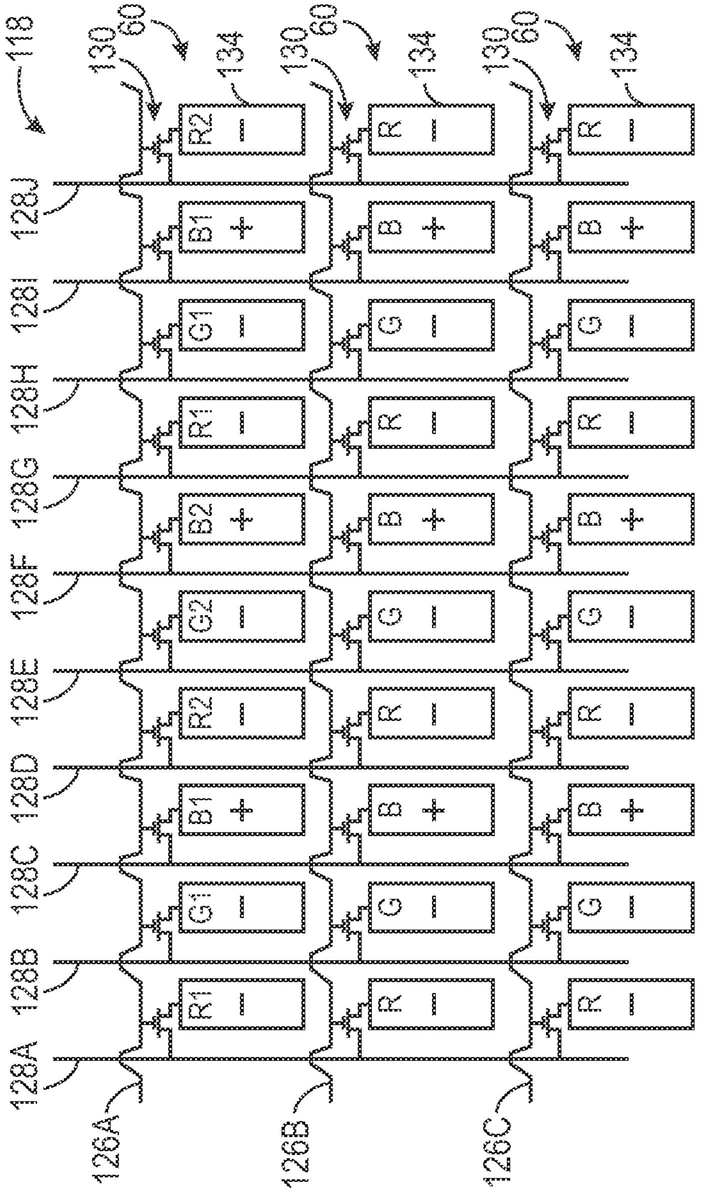
FIG. 28 is a schematic diagram of a display panel employing 2/1-column inversion that emphasizes red and green pixel transmittance, in accordance with an embodiment.

FIGS. 27 and 28 similarly illustrate examples of 2/1-column inversion. FIG. 27, for instance, illustrates a display panel layout 360 employing 2/1-column inversion (R, B). That is, the 2/1-column inversion appearing in FIG. 27 drives the columns of green pixels at one polarity and drives the columns of red and blue pixels at the other polarity. As such, adjacent red and blue pixel columns will have slightly higher transmittances than the green pixel columns. Specifically, the green pixel columns may be fully surrounded by columns of pixels driven at the polarity opposite than that at which the green pixels are driven. Since only one adjacent side of the columns of red and blue pixels will be driven at an opposite polarity, red and blue pixels will have slightly higher transmittances than the green pixels in the display panel layout 360. Similarly, a display panel layout 370 of FIG. 28 illustrates a manner of 2/1-column inversion (R, G). The display panel layout 370 of FIG. 28 is substantially the same as the display panel layout 350 of FIG. 26 and 360 of FIG. 27, except that the polarities of the columns of pixels are selected as illustrated in FIG. 28. This configuration may cause the transmittances of the red and green columns of pixels to be enhanced over the transmittances of the columns of blue pixels.

Figure 29:
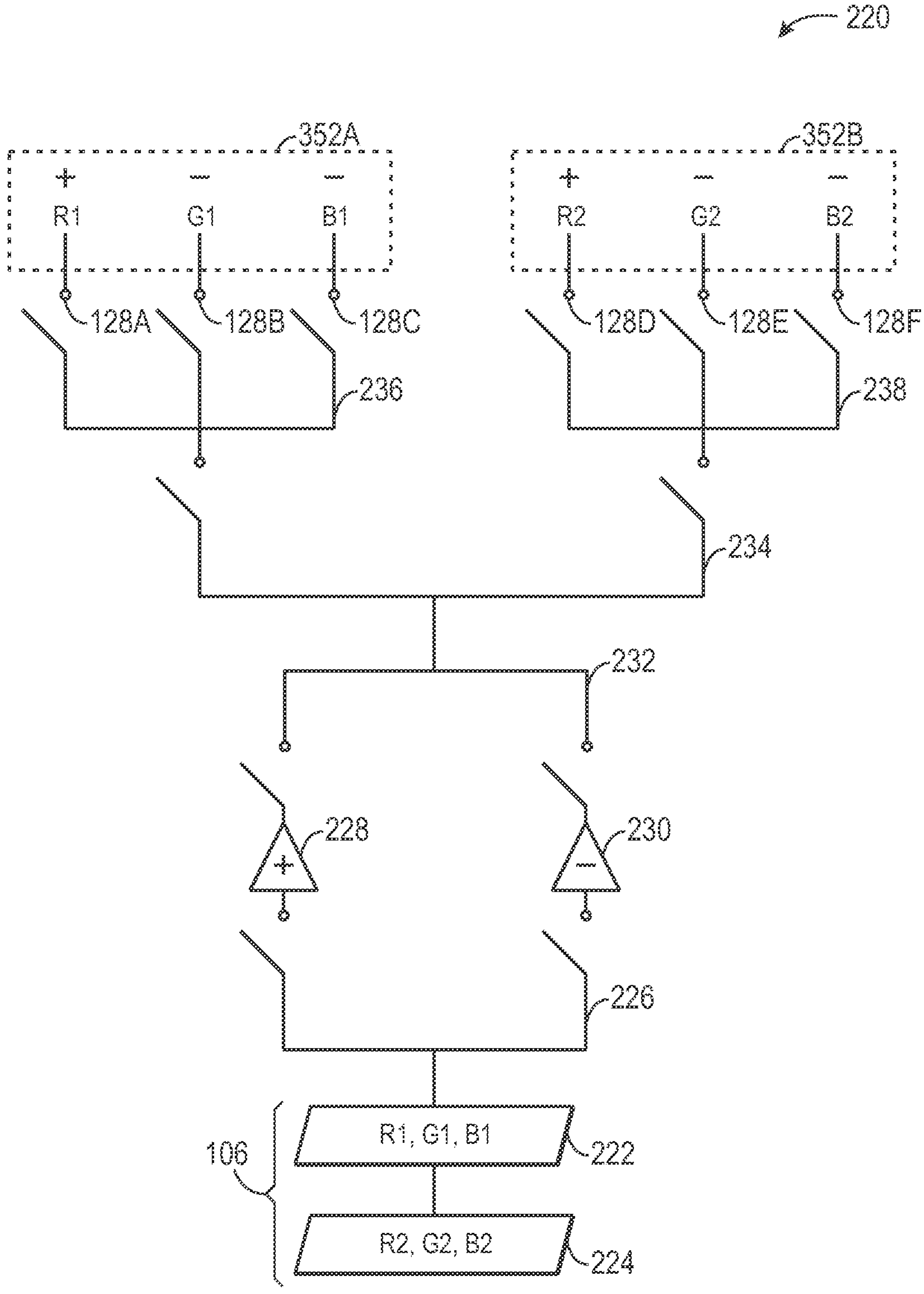
FIG. 29 is a schematic diagram of the driving circuitry of FIG. 17 performing the 2/1-column inversion of FIG. 26, in accordance with an embodiment.

A variety of driving circuitry may be used to achieve the 2/1-column inversion schemes illustrated in FIGS. 26-28. For example, as shown in FIG. 29, the driving circuitry 220 (originally described with reference to FIG. 17) may be used to achieve the 2/1-column inversion (G, B) shown in FIG. 26. Specifically, as seen in FIG. 29, first image data 222 and second image data 224 of the image data 106 may be supplied, in a normal order, through the positive source amplifier 228 and/or negative source amplifier 230. The image data 106 may be switched in a suitable manner so as to program the superpixels 352A and 352B in the polarities shown in FIG. 29. It may be noted that the elements of the driving circuitry 220 shown in FIG. 29 are discussed above with reference to FIG. 17, and therefore are not discussed here.

Although the driving circuitry 220 may be used to achieve any 2/1-column inversion schemes, the requirement of polarity switches through the positive source amplifier 228 and/or negative source amplifier 230 may be electrically costly. These polarity switches are illustrated in a timing diagram 380 of FIG. 30. Specifically, the timing diagram 380 illustrates the image data 106 passing through the driving circuitry 220 in temporal order. That is, the image data 106 may be supplied in the order R1(+), G1(−), B1(−), R2(+), G2(−), B2(−), and so on, repeating each row (or scan line) of the frame. Thus, image data 106 is shown for a first scan line 382 and second scan line 384. Polarity switches 386 occur between R1 and G1, B1 and R2, and R2 and G2 of the first scan line 382, and between B2 and R1 of the second scan line 384. In other words, for each scan line 382 or 384, a total of four polarity switches 386 may take place. These polarity switches 386 are electrically costly and power would be conserved if the number of polarity switches 386 could be decreased.

Figure 30:
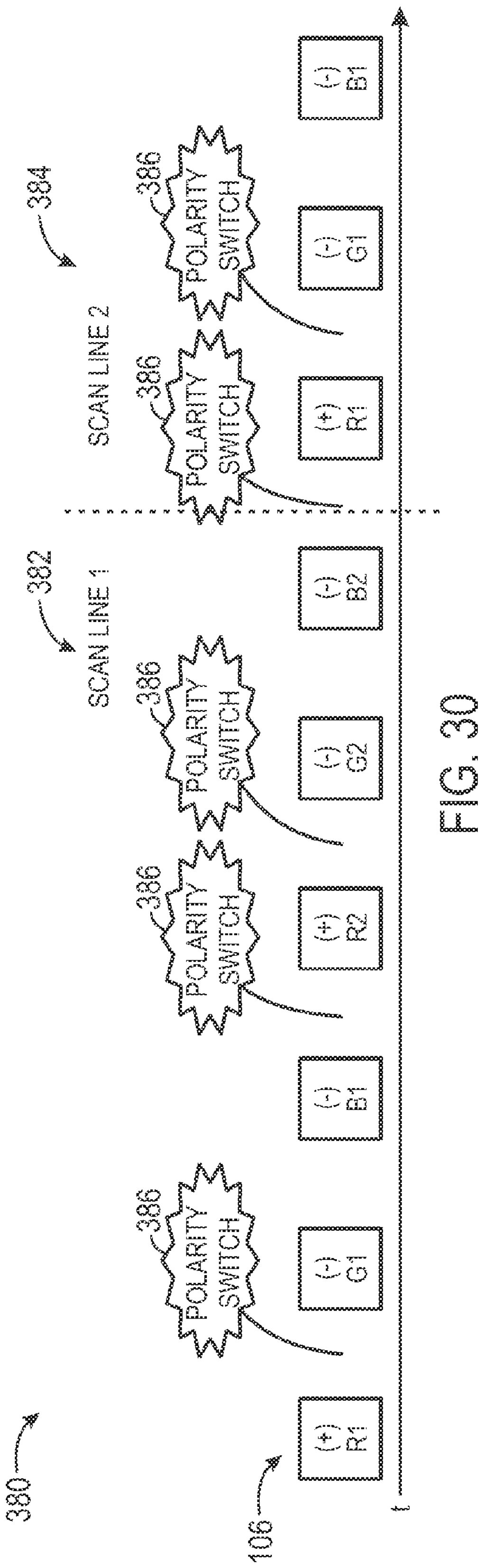
FIG. 30 is a timing diagram illustrating the electrical impact of performing the 2/1-column inversion of FIG. 29, in accordance with an embodiment.
Figure 31:
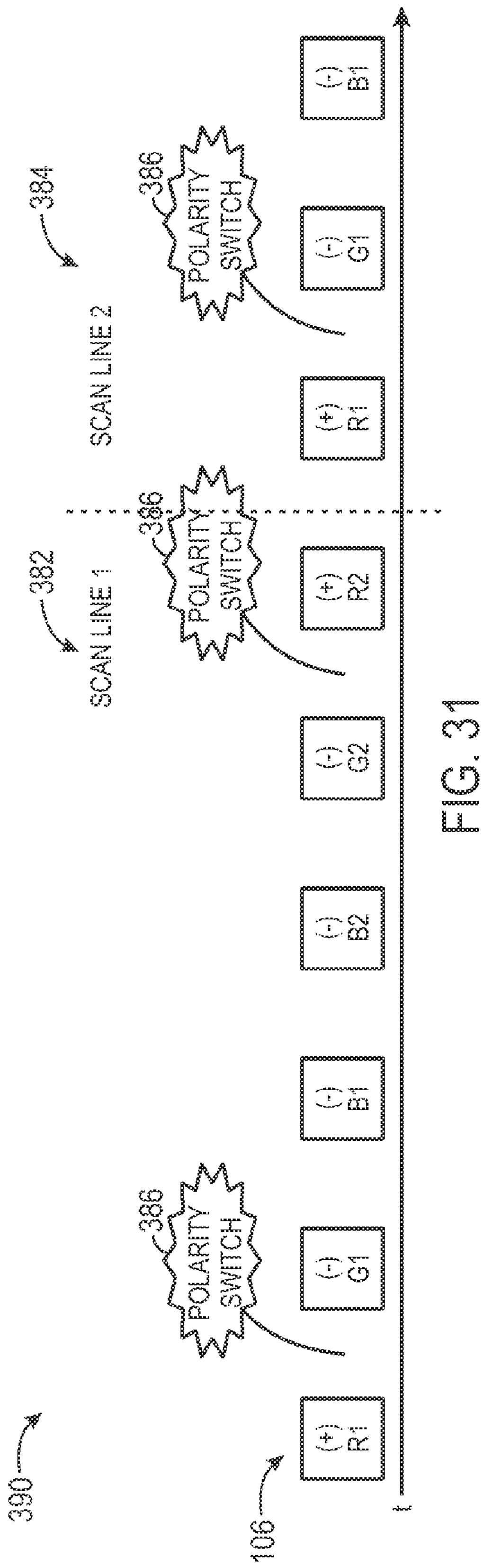
FIG. 31 is a timing diagram illustrating the electrical impact of performing 2/1-column inversion when image data is reordered to reduce polarity switches, in accordance with an embodiment.

Another timing diagram 390, shown in FIG. 31, presents such an alternative manner of driving the display 18 to reduce the number of polarity switches 386. In the timing diagram 390 of FIG. 31, the image data 106 of each scan line 382 and 384 is supplied in a different order. In the timing diagram 390, the order appears as follows, but may be any other suitable order to reduce the number of polarity switches 386: R1(+), G1(−), B1(−), B2(−), G2(−), R2(+). Thus, polarity switches 386 occur between R1 and G1 and G2 and R2 of each scan line. In the timing diagram 390 of FIG. 31, the number of polarity switches 386 to achieve the same column inversion scheme achieved with the timing diagram 380 of FIG. 30 is reduced by half.

Figure 32:
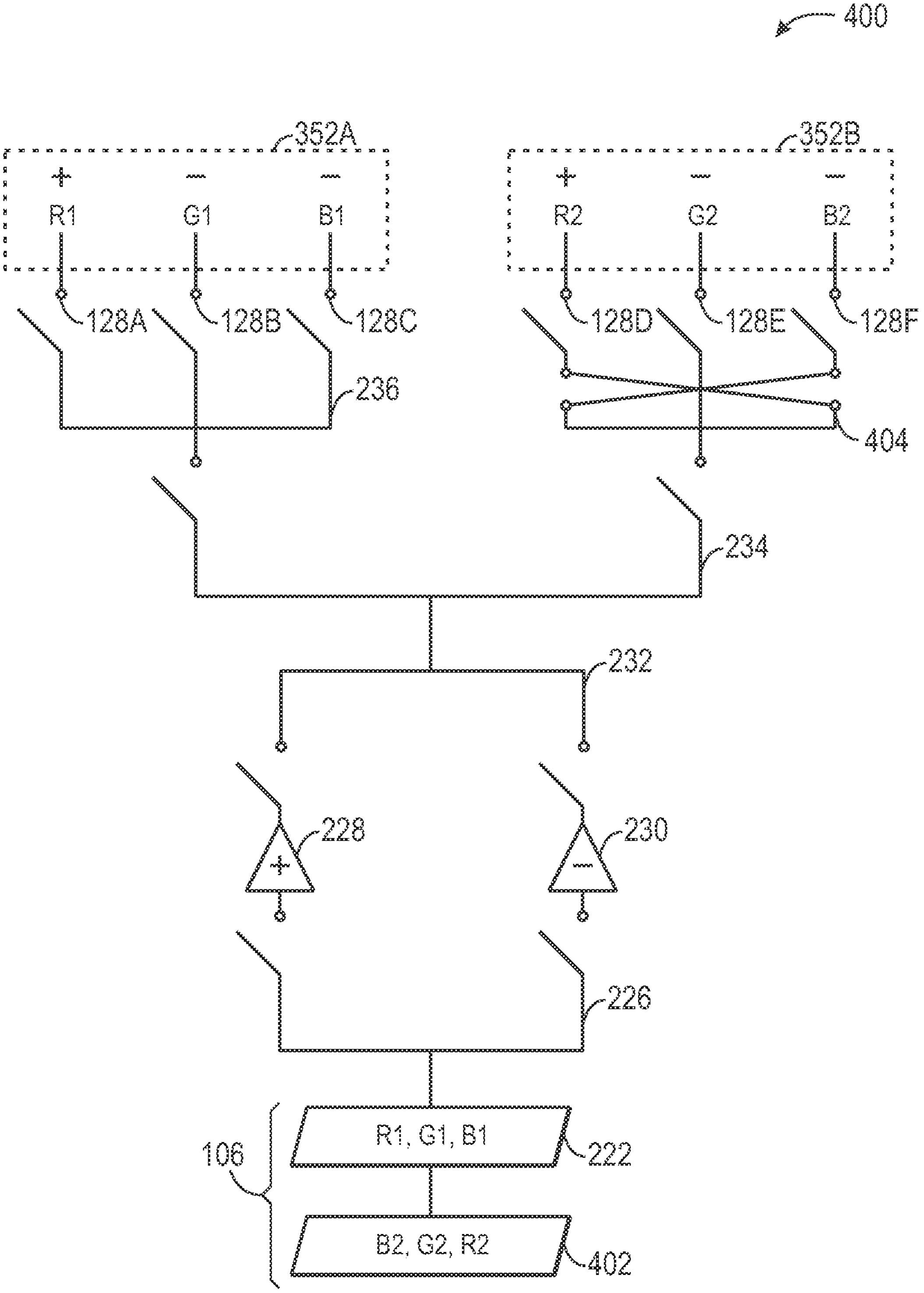
FIG. 32 is a schematic diagram of driving circuitry to perform the 2/1-column inversion of FIG. 26 using the reordered image data of FIG. 31, in accordance with an embodiment.

In some embodiments, the driving circuitry 220 may be modified slightly to drive the display 18 in the manner suggested by the timing diagram 390 of FIG. 31. One example of such driving circuitry appears as driving circuitry 400 of FIG. 32. The driving circuitry 400 is substantially the same as the driving circuitry 220, with a few changes. For example, as shown in FIG. 32, the image data 222 is supplied in a traditional order, but second image data 402 is reordered. Namely, in the second image data 402, red pixel data is swapped with the blue pixel data, such that the order is as follows: B2, G2, R2. It should be appreciated that the second image data 402 may be so ordered, for example, by an image data reordering component 120 of the display 18, as discussed above with reference to FIG. 7. Additionally or alternatively, the second image data 402 may be so ordered by the processor(s) 12 before being supplied to the display 18.

The driving circuitry 400 of FIG. 32 also differs from the driving circuitry 220 of FIG. 17 in that, while the first demultiplexer 236 maintains the same manner of operation, the demultiplexer 238 has been replaced with a demultiplexer 404. The demultiplexer 404 reverses the order in which the R2 and B2 image data of the superpixel 352B are time demultiplexed to the driving circuitry 400. As a result, the image data 106 may pass through the driving circuitry 400 with a reduced number of polarity switches 386 as compared to the driving circuitry 220.

Figure 33:
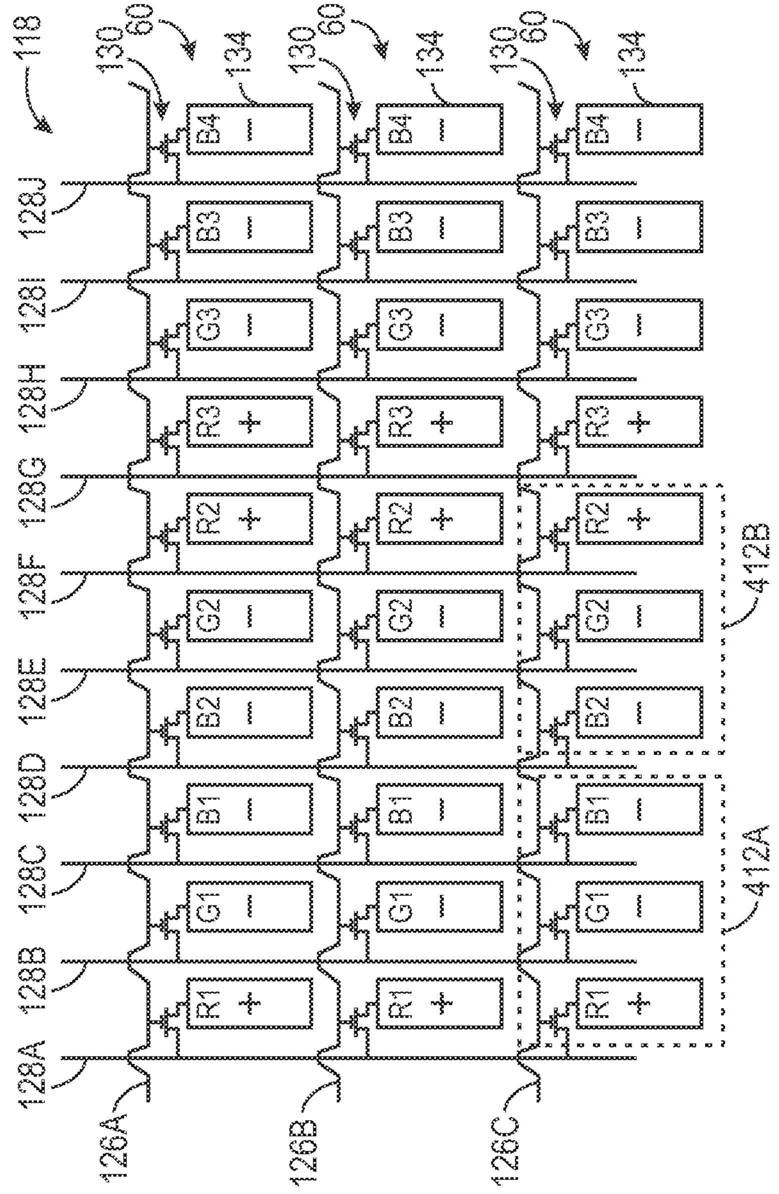
FIG. 33 is a schematic diagram of a display panel employing 4/2-column inversion with increased blue pixel transmittance, in accordance with an embodiment.

A different display panel layout 410, as shown in FIG. 33, may also effect the driving order discussed above with reference to the timing diagram 390 of FIG. 31. In the example of FIG. 33, a subset of the pixels 60 is shown on the display panel 118. Three gate lines 126A-C are shown to supply activation signals to three corresponding rows of pixels 60 and ten source lines 128A-J supply data signals to ten corresponding columns of pixels 60. Each pixel 60 includes a respective TFT 130 and a pixel electrode 134. Each pixel 60 modulates light through a red (R), green (G), or blue (B) filter. As apparent in the subpixel arrangement of two adjacent superpixels 412A and 412B, the component subpixels of every superpixel is reverse from the superpixel before and after it. Thus, the component subpixels of the first superpixel 412A appear in red-green-blue order and the component subpixels of the second superpixel 412B appear in blue-green-red order. The display panel layout 410 of FIG. 33 may be said to be performing 4/2-column inversion, since groups of two columns of pixels (adjacent red (R) pixels) of one polarity and groups of four columns (adjacent green (G), blue (B), blue (B), and green (G) pixels) of another polarity are formed. The 4/2-column inversion may have the effect of enhancing the transmittance of blue pixels in relation to others, since blue pixels are wholly surrounded by pixels driven at the same polarity.

Figure 34:
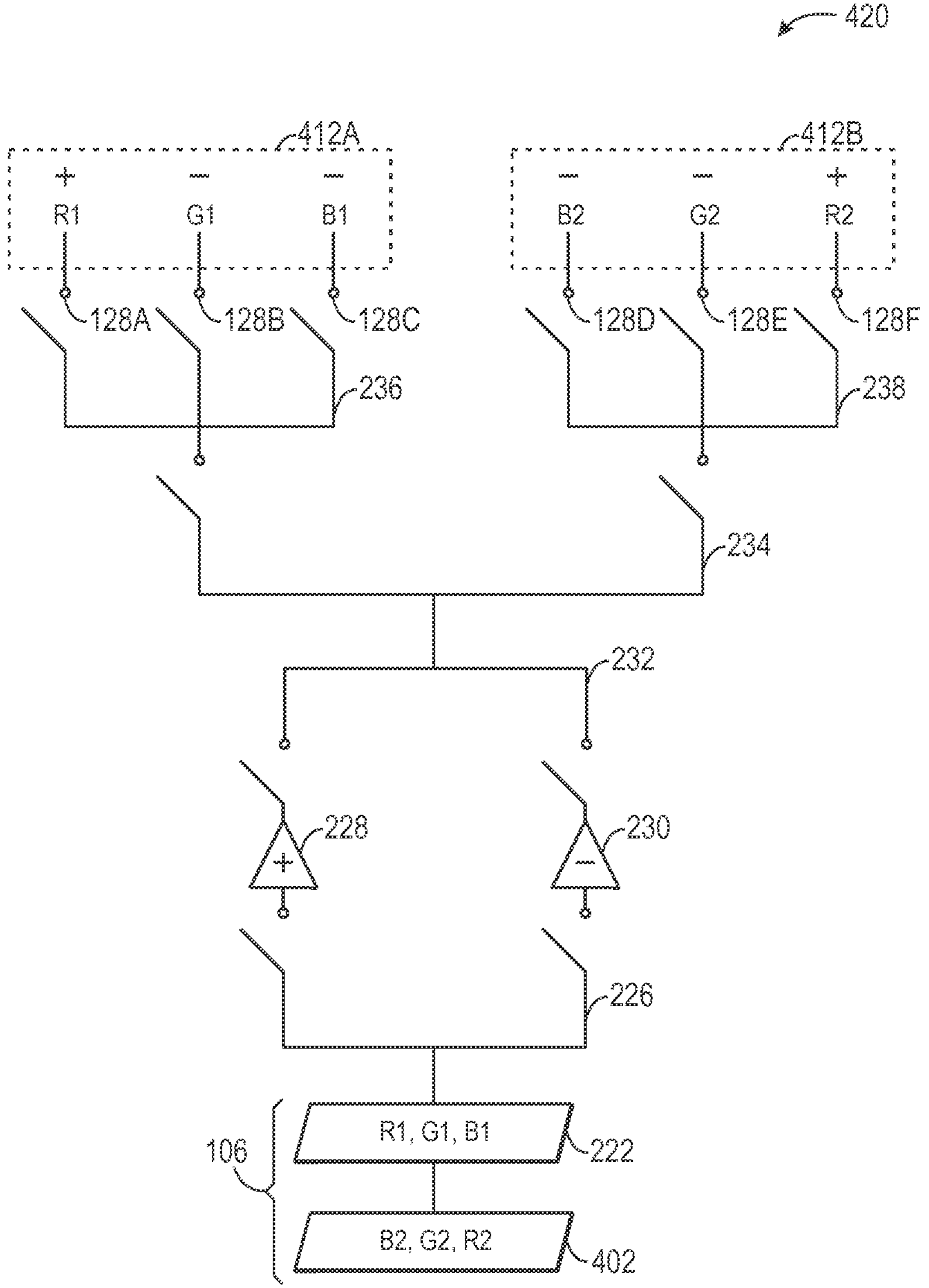
FIG. 34 is a schematic diagram of driving circuitry to perform the 4/2-column inversion of FIG. 33, in accordance with an embodiment.

Driving circuitry 420 of FIG. 34 may be used to drive the display 18 to achieve the 4/2-column inversion shown in FIG. 33. The driving circuitry 420 may be substantially the same as the driving circuitry 220, except that the order of the second image data 402 is changed and the second demultiplexer 238 couples to the pixels of the superpixel 412B. As such, like elements previously described are not discussed here. It should be appreciated that the second image data 402 may be ordered as shown in FIG. 34, for example, by an image data reordering component 120 of the display 18, as discussed above with reference to FIG. 7. Additionally or alternatively, the second image data 402 may be so ordered by the processor(s) 12 before being supplied to the display 18. Additionally, it may be seen that the order of pixel columns in the superpixel 412B is reversed from a typical image data order. As a result, the image data 106 may pass through the driving circuitry 400 to carry out the timing diagram 390 of FIG. 31.

Figure 35:
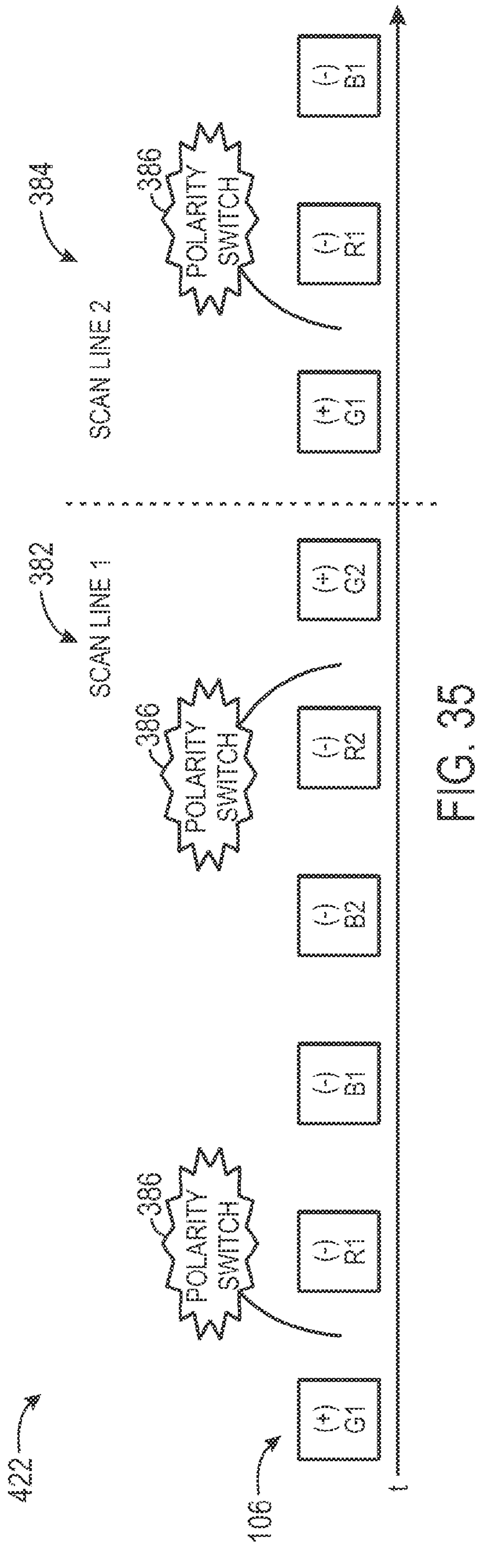
FIG. 35 is a timing diagram illustrating the electrical impact of reordering image data to carry out the 2/1 column inversion of FIG. 27, in accordance with an embodiment.
Figure 36:
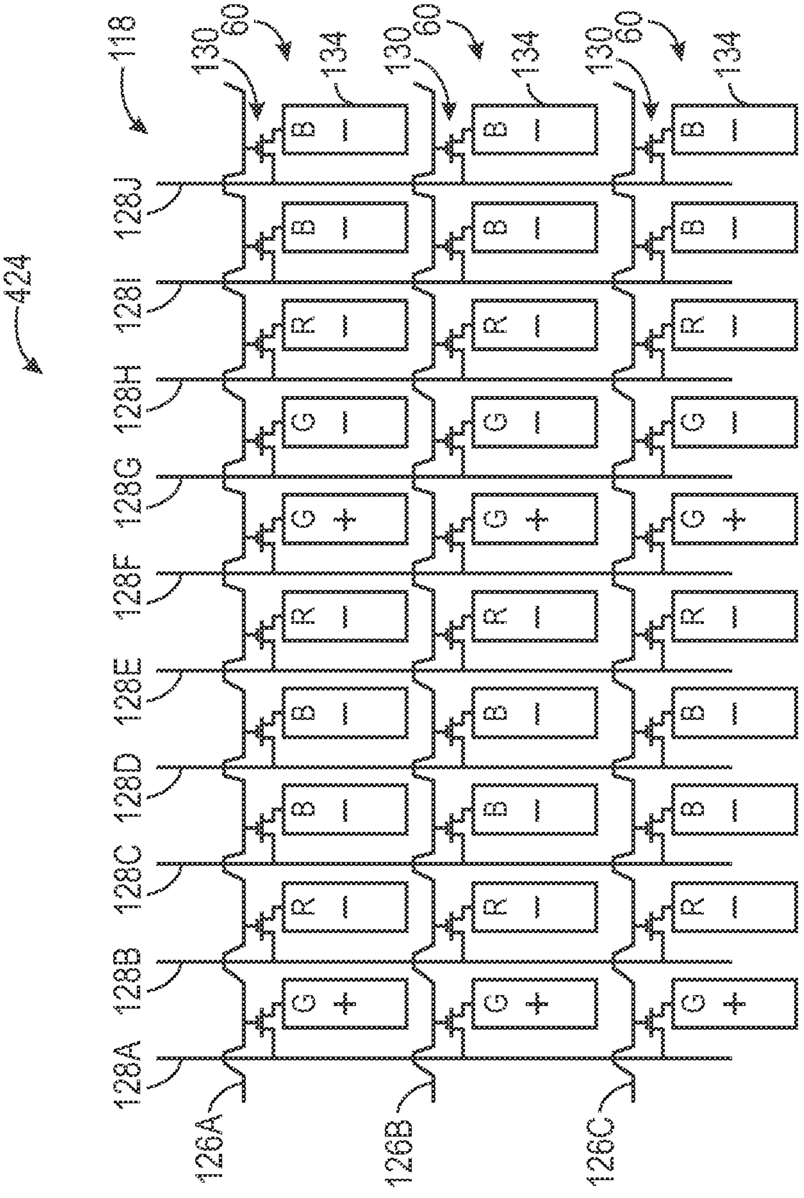
FIG. 36 is schematic diagram of another display panel employing 4/2-column inversion with increased blue pixel transmittance, in accordance with an embodiment.

An alternative arrangement to reduce polarity switches 386 while carrying out 2/1-column inversion (R, B) or 4/2-column inversion (B) appear in FIGS. 35 and 36. Specifically, a timing diagram 422 of FIG. 35 illustrates the timing of image data passing through driving circuitry for 2/1-column inversion (R, B) as illustrated in FIG. 27. In the timing diagram 422 of FIG. 35, the image data 106 is supplied in the following order: G1(+), R1(−), B1(−), B2(−), R2(−), G2(+). Polarity switches 386 occur in only two places per scan line—between G1 and R1 and R2 and G2. It should be appreciated that this reordered image data 106 of FIG. 35 can be handled by driving circuitry similar to that of FIG. 32, in which the ultimate demultiplexers handling each superpixel are arranged to reduce the number of polarity switches.

Alternatively, the timing diagram 422 of FIG. 35 may be effected using a display panel layout 424 to carry out 4/2-column inversion (B), as shown in FIG. 36. In the example of FIG. 36, a subset of the pixels 60 is shown on the display panel 118. Three gate lines 126A-C are shown to supply activation signals to three corresponding rows of pixels 60 and ten source lines 128A-J supply data signals to ten corresponding columns of pixels 60. Each pixel 60 includes a respective TFT 130 and a pixel electrode 134. Each pixel 60 modulates light through a red (R), green (G), or blue (B) filter. In the display panel layout 424, the component subpixels of every superpixel is reverse from the superpixel before and after it. For example, the component subpixels of the first superpixel appear in green-red-blue order and the component subpixels of the second superpixel appear in blue-red-green order. This pattern may continue throughout the display panel 118. The display panel layout 424 of FIG. 36 may be said to be performing 4/2-column inversion (B), since groups of two columns of pixels (adjacent green (G) pixels) of one polarity and groups of four columns (adjacent red (R), blue (B), blue (B), and red (R) pixels) of another polarity are formed. The 4/2-column inversion may have the effect of enhancing the transmittance of blue pixels in relation to others, since blue pixels are wholly surrounded by pixels driven at the same polarity.

Figure 37:
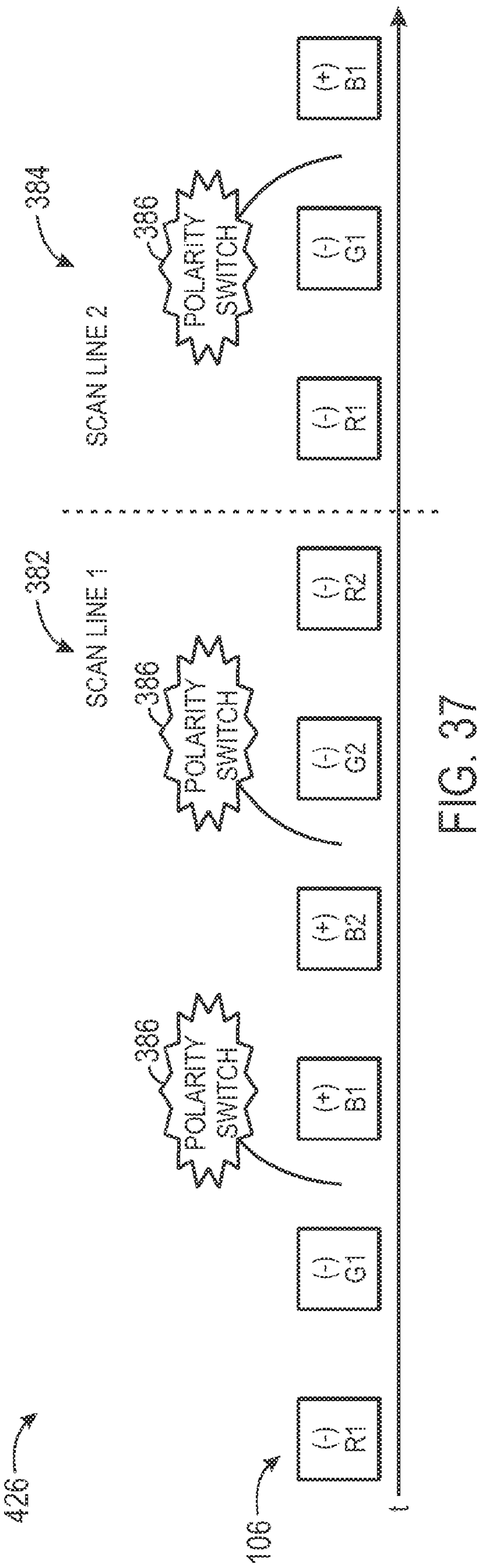
FIG. 37 is a timing diagram illustrating the electrical impact of reordering image data to carry out the 2/1 column inversion of FIG. 28, in accordance with an embodiment.
Figure 38:
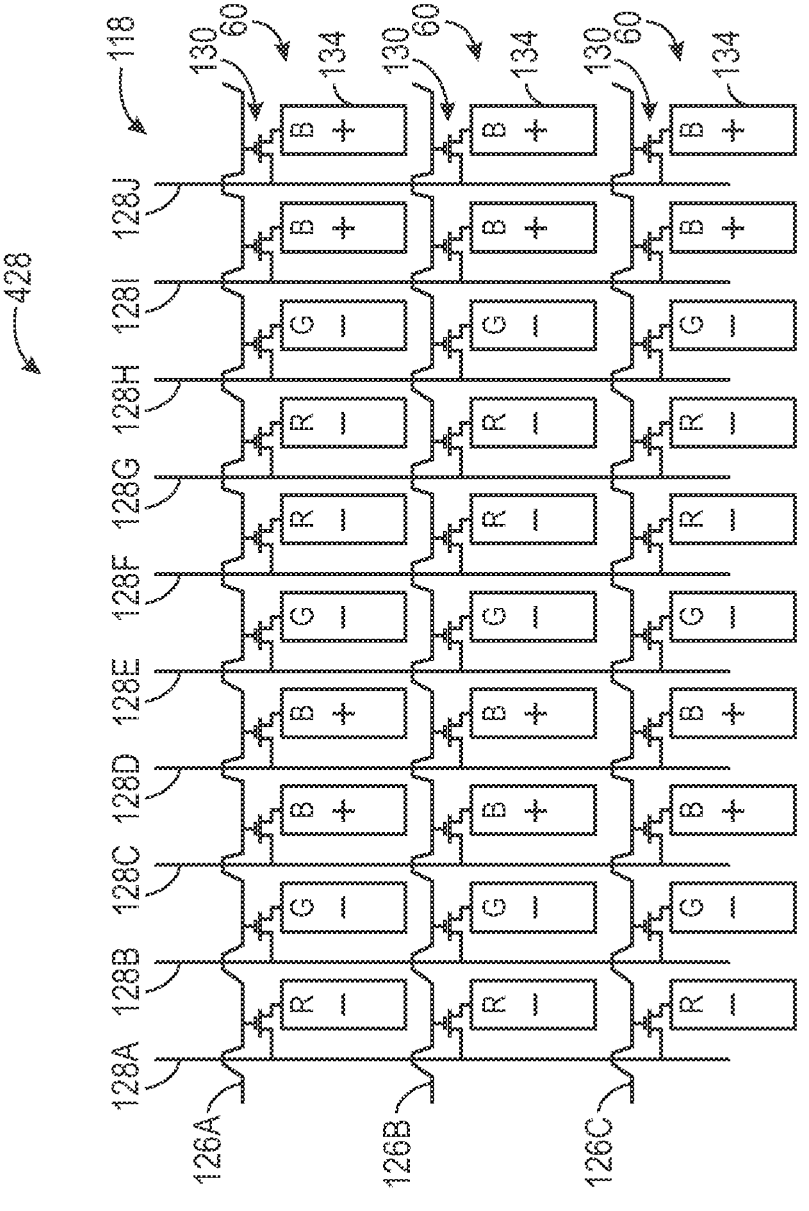
FIG. 38 is schematic diagram of a display panel employing 4/2-column inversion with increased red pixel transmittance, in accordance with an embodiment.

Similarly, an arrangement to reduce polarity switches 386 while carrying out 2/1-column inversion (R, G) or 4/2-column inversion (R) appear in FIGS. 37 and 38. Specifically, a timing diagram 426 of FIG. 37 illustrates the timing of image data passing through driving circuitry for 2/1-column inversion (R, G) as illustrated in FIG. 28. In the timing diagram 422 of FIG. 35, the image data 106 is supplied in the following order: R1(−), G1(−), B1(+), B2(+), G2(−), R2(−). Polarity switches 386 occur in only two places per scan line—between G1 and B1 and B2 and G2. It should be appreciated that this reordered image data 106 of FIG. 37 can be handled by driving circuitry similar to that of FIG. 32, in which the ultimate demultiplexers handling each superpixel are arranged to reduce the number of polarity switches.

Alternatively, the timing diagram 426 of FIG. 37 may be effected using a display panel layout 428 to carry out 4/2-column inversion (R), as shown in FIG. 38. In the example of FIG. 36, a subset of the pixels 60 is shown on the display panel 118. Three gate lines 126A-C are shown to supply activation signals to three corresponding rows of pixels 60 and ten source lines 128A-J supply data signals to ten corresponding columns of pixels 60. Each pixel 60 includes a respective TFT 130 and a pixel electrode 134. Each pixel 60 modulates light through a red (R), green (G), or blue (B) filter. In the display panel layout 424, the component subpixels of every superpixel is reverse from the superpixel before and after it. For example, the component subpixels of the first superpixel appear in red-green-blue order and the component subpixels of the second superpixel appear in blue-green-red order. This pattern may continue throughout the display panel 118. The display panel layout 424 of FIG. 36 may be said to be performing 4/2-column inversion (R), since groups of two columns of pixels (adjacent green (B) pixels) of one polarity and groups of four columns (adjacent green (G), red (R), red (R), and green (G) pixels) of another polarity are formed. This 4/2-column inversion may have the effect of enhancing the transmittance of red pixels in relation to others, since red pixels are wholly surrounded by pixels driven at the same polarity.

Before continuing, it should be noted that many other variations of 2/1-column inversion and 4/2-column inversion are contemplated. Indeed, the examples discussed above are intended merely to represent some of the ways in which 2/1-column inversion and 4/2-column inversion may be carried out with a reduced number of polarity switches in driving circuitry.

Figure 39:
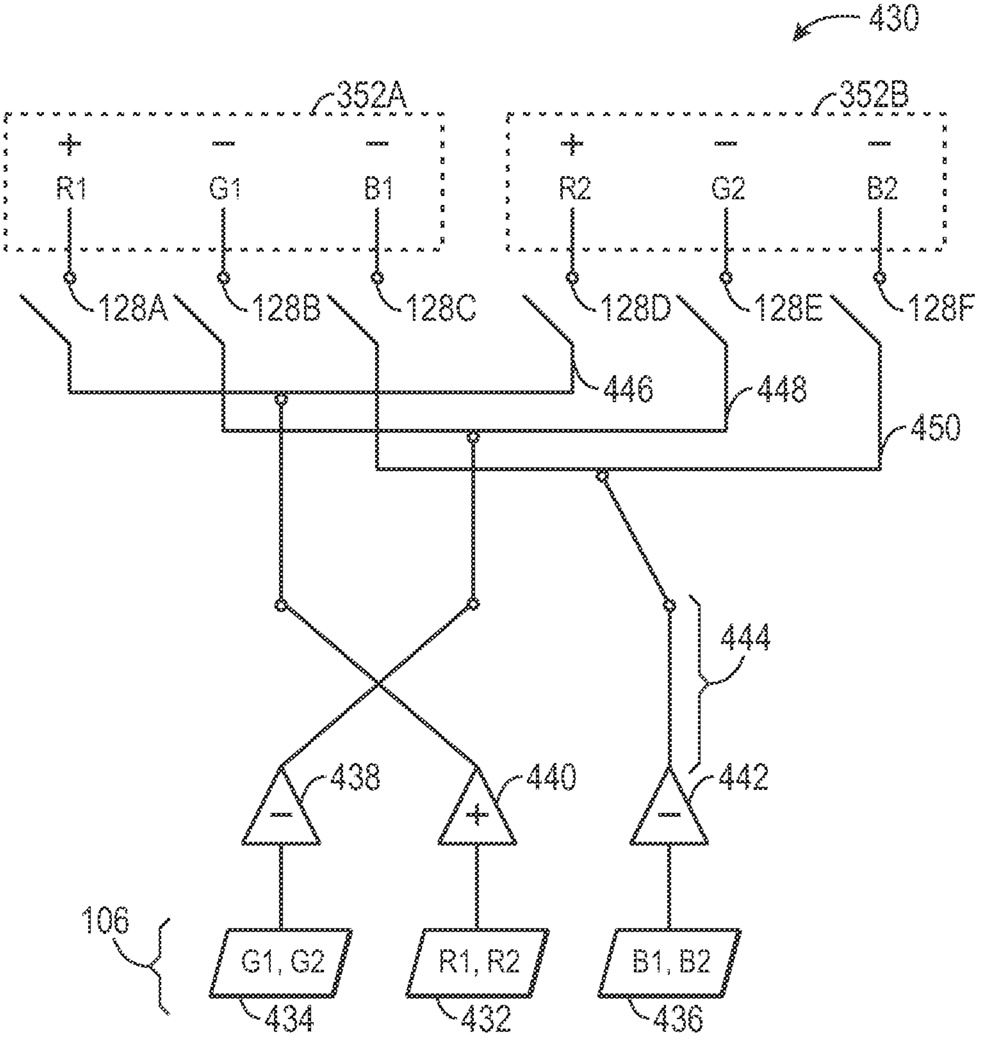
FIG. 39 is a schematic diagram of driving circuitry to perform 2/1-column inversion of FIG. 26 using three source amplifiers switched on a frame-by-frame basis, in accordance with an embodiment.

Indeed, another example of driving circuitry to perform 2/1-column inversion appears in FIG. 39. In FIG. 39, driving circuitry 430 may consume relatively less power than conventional driving techniques by joining only one source amplifier to one demultiplexer per frame. Specifically, three groups of image data 106—first image data 432, second image data 434, and third image data 436—may be provided to source amplifiers 438, 440, and 442. In the example of FIG. 39, a negative source amplifier 438 receives the second image data 434, a positive source amplifier 440 receives the first image data 432, and a negative source amplifier 442 receives the third image data 436. As illustrated, the first image data 432, second image data 434, and third image data 436 respectively include the image data 106 associated with the red pixels of the superpixel 352A and 352B (e.g., R1 and R2), the green pixels (e.g., G1 and G2), and the blue pixels (e.g., B1 and B2).

Switches 444 couple the source amplifiers 438, 440, and 442 to different respective 2-column demultiplexers 446, 448, and 450. The switches 444 occasionally (e.g., once for each frame) vary how the source amplifiers 438, 440, and 442 connect to the demultiplexers 446, 448, 450. Thus, for one frame, the demultiplexer 446 supplies amplified image data to the red pixels of the superpixels 352A and 352B. The demultiplexer 448 supplies amplified image data to the green pixels of the superpixels 352A and 352B. The demultiplexer 450 supplies amplified image data to the blue pixels of the superpixels 352A and 352B.

On other frames, the switches 444 may connect the source amplifiers 438, 440, and 442 and demultiplexers 446, 448, 450 in different ways. Likewise, the first image data 432, second image data 434, and third image data 436 may be provided to different of the source amplifiers 438, 440, and 442. By way of example, for every three frames, the first image data 432, second image data 434, and third image data 436 may be amplified into each polarity at least once (e.g., amplified twice to a negative value via the source amplifiers 438 and/or 442 and amplified once to a positive value via the source amplifier 440).

Figure 40:
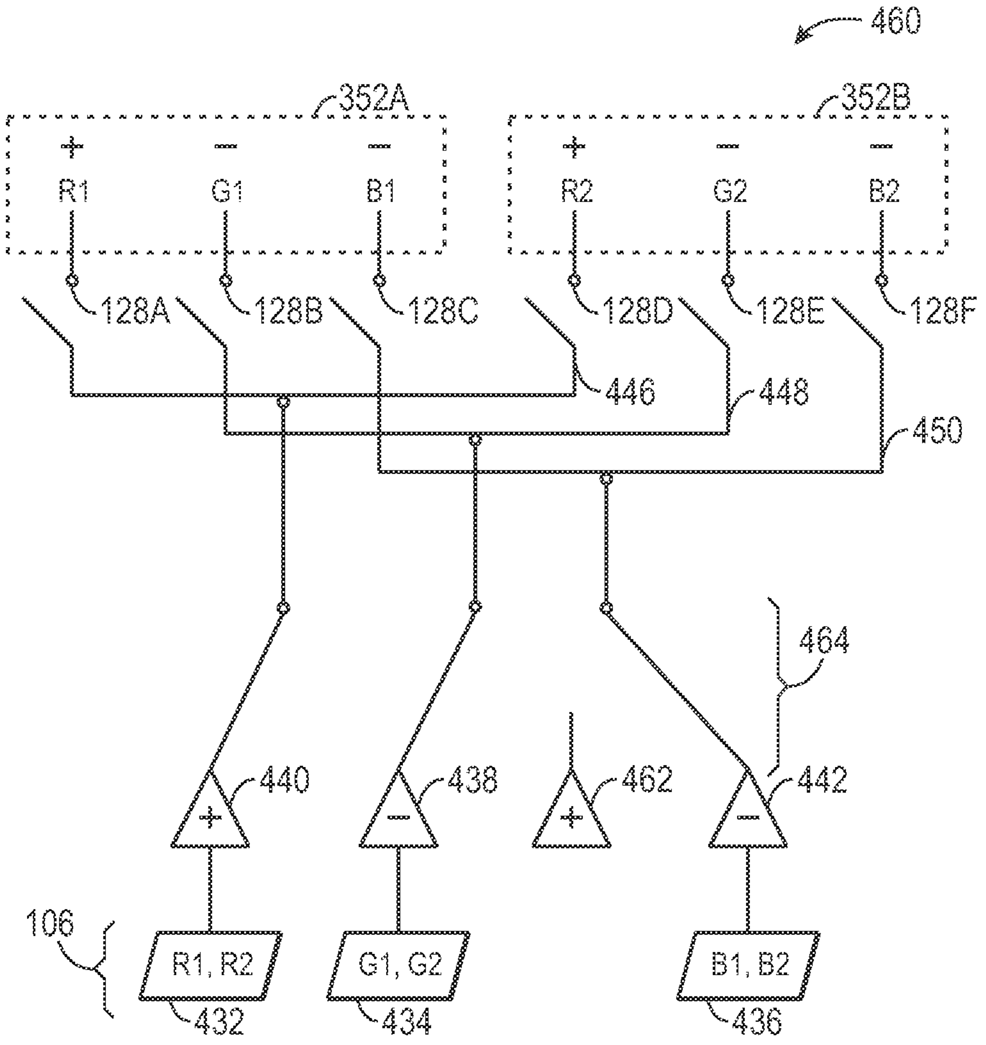
FIG. 40 is a schematic diagram of driving circuitry to perform 2/1-column inversion using three demultiplexers coupled to three of four source amplifiers switched on a frame-by-frame basis, in accordance with an embodiment.

As mentioned above, because the driving circuitry 430 of FIG. 39 includes only three source amplifiers, the driving circuitry 430 may drive each column at one polarity for two frames before switching to the opposite polarity for the third frame. By adding another source amplifier, however, many other column inversion schemes may also be performed. For example, FIG. 40 illustrates driving circuitry 460 that, while similar to that of FIG. 39, includes an additional positive source amplifier 462 and switches 464. Like-numbered elements from other drawings that also appear in FIG. 40 may be understood to operate in substantially the same way. The switches 464 may switch the source amplifiers 438, 440, 442, and 462 on occasion (e.g., on a frame-by-frame basis).

Using the driving circuitry 460 of FIG. 40, substantially any 2/1-column inversion schemes may be performed. Indeed, the driving circuitry 460 of FIG. 40 may carry out any of the 2/1-column inversion schemes described above with reference to FIGS. 26-28. The driving circuitry 460 of FIG. 40 may be able to carry out these column inversion schemes in a more efficient way than the driving circuitry 220, since each demultiplexer 446, 448, 450 may supply amplified image data to the pixels through a single source amplifier each frame. It should be appreciated that the image data 106 may be reordered from an original image data order before being handled by the driving circuitry 430 of FIG. 39 or 460 of FIG. 40. An image data reordering component 120 of the display 18, as discussed above with reference to FIG. 7, or the processor(s) 12 may reorder the image data 106 in any suitable order (e.g., as illustrated in FIGS. 39 and 40).

Figure 41:
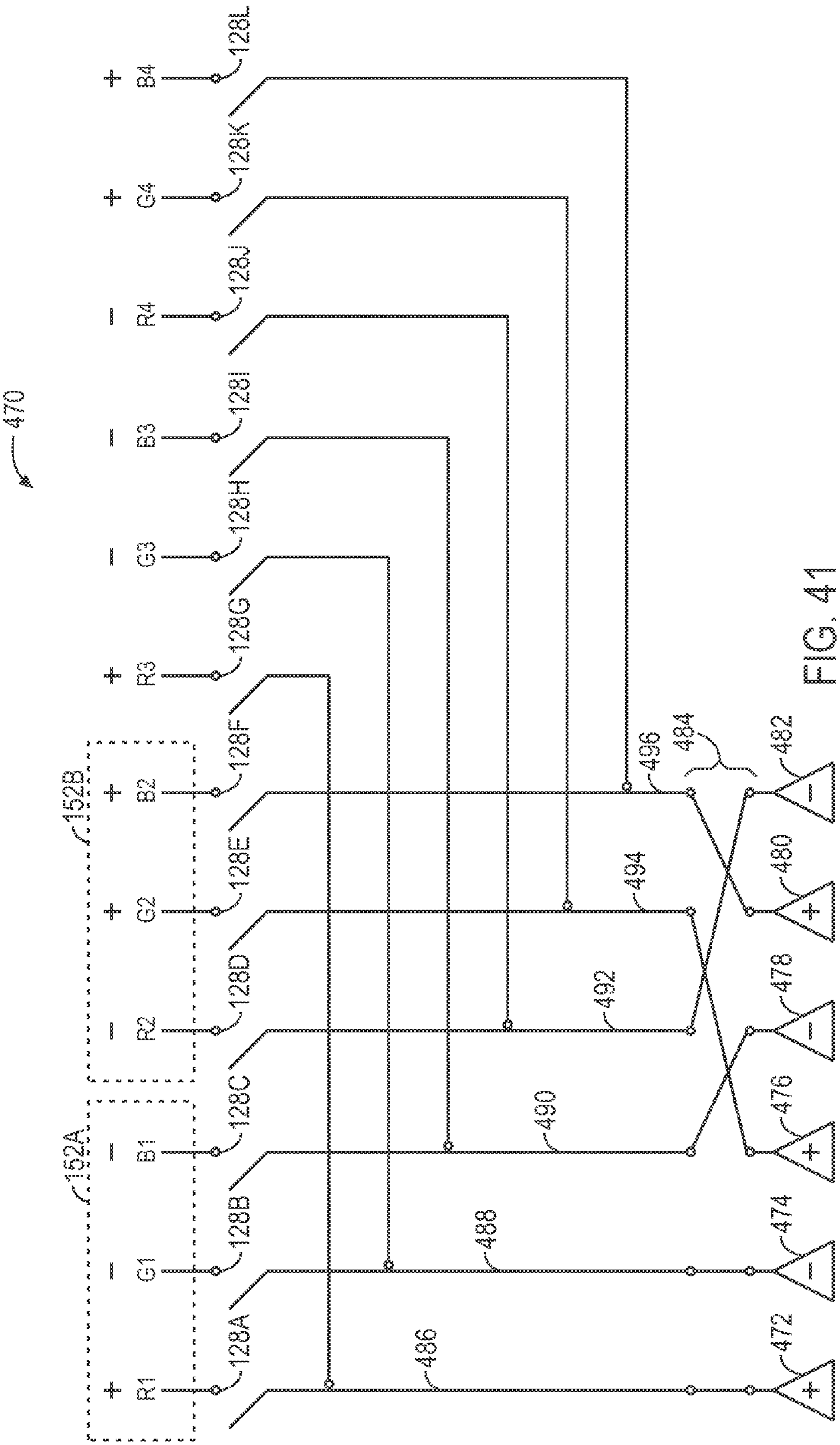
FIG. 41 is a schematic diagram of driving circuitry to perform any suitable symmetrical column inversion scheme, including 3-column inversion, in accordance with an embodiment.

Other driving circuitry may operate on similar principles as the driving circuitry 430 of FIG. 39 or 460 of FIG. 40. Driving circuitry 470 of FIG. 41, for instance, may similarly include one source amplifier per demultiplexer. As seen in FIG. 41, the driving circuitry 470 may drive 12 columns of pixels that include a first red pixel (R1), a first green pixel (G1), a first blue pixel (B1), a second red pixel (R2), a second green pixel (G2), a second blue pixel (B2), a third red pixel (R3), a third green pixel (G3), a third blue pixel (B3), a fourth red pixel (R4), a fourth green pixel (G4), and a fourth blue pixel (B4). Source amplifiers 472, 474, 476, 478, 480, and 482 may couple via switches 484 to respective demultiplexers 486, 488, 490, 492, 494, and 496. The switches 484 may change occasionally (e.g., on a frame-by-frame basis) to invert the polarities of the columns of pixels according to any suitable column inversion scheme. It should be appreciated that the image data 106 may be reordered from an original image data order before being handled by the driving circuitry 470 of FIG. 41. An image data reordering component 120 of the display 18, as discussed above with reference to FIG. 7, or the processor(s) 12 may reorder the image data 106 in any suitable order (e.g., as illustrated in FIGS. 39 and 40). Upon programming different frames onto the display 18, different image data 106 may be supplied to different ones of the source amplifiers 472, 474, 476, 478, 480, and 482 of the driving circuitry 470.

The demultiplexers 486, 488, 490, 492, 494, and 496 respectively couple to the same color pixels in every other superpixel. For example, the demultiplexer 486 couples to pixels R1 and R3, the demultiplexer 488 couples to pixels G1 and G3, and the demultiplexer 490 couples to pixels B1 and B3, and so forth. In this way, the driving circuitry 470 may be used to drive the pixels of the display 18 using, among other things, any symmetrical column inversion schemes. As used herein, “symmetrical column inversion” refers to column inversion in which an equal number of columns of pixels are driven at positive polarities as negative polarities for every two superpixels. For example, the driving circuitry 470 may perform any form of 3-column, 2-column, or even 1-column inversion discussed in this disclosure. In the example of FIG. 41, the driving circuitry 470 is shown to perform 3-column inversion (blue center pixel), which may enhance the transmittance of the blue pixels of the display 18 in relation to the red and green pixels.

Figure 42:
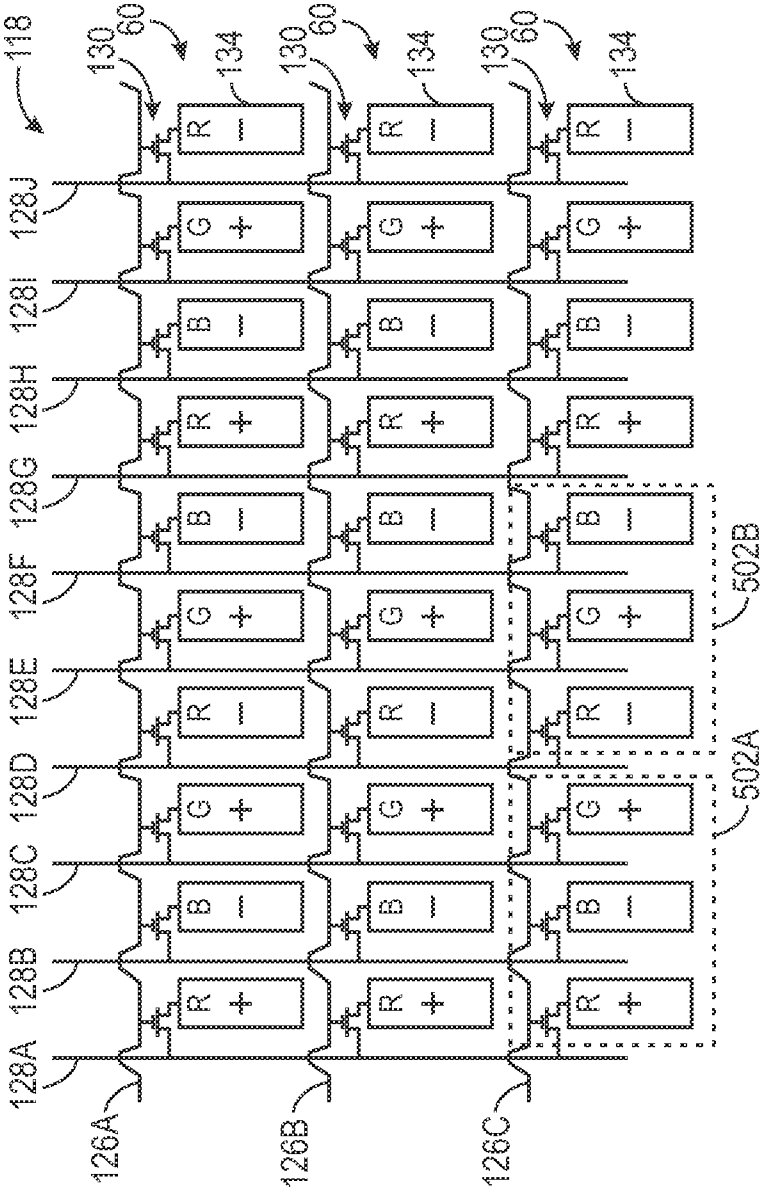
FIG. 42 is a schematic diagram of a display panel employing 1-column inversion, in accordance with an embodiment.
Figure 43:
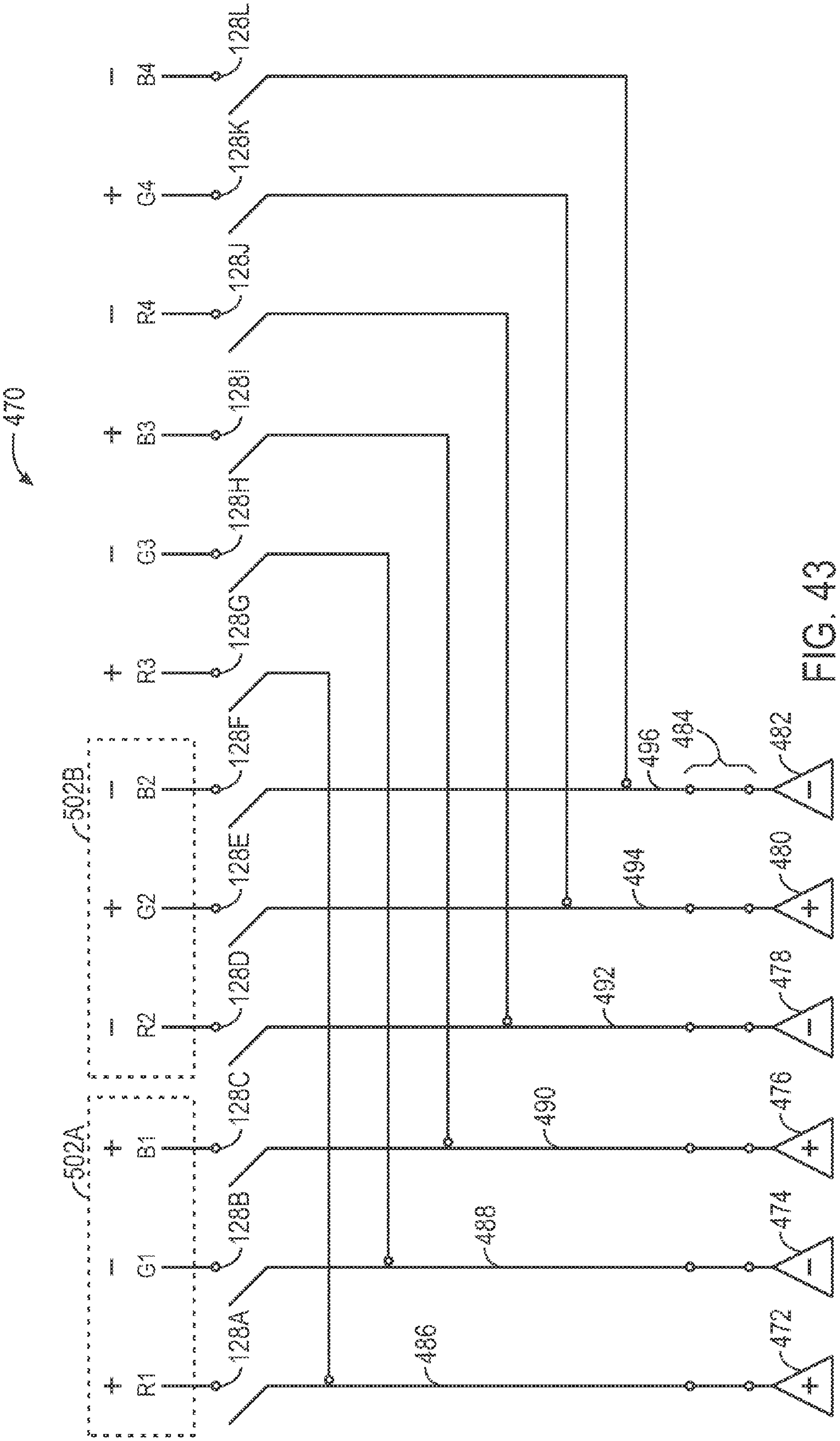
FIG. 43 is a schematic diagram illustrating the use of the driving circuitry of FIG. 41 to perform the 1-column inversion of FIG. 42, in accordance with an embodiment.

The driving circuitry 470 also may perform 1-column inversion in the manner illustrated in FIG. 42. FIG. 42 represents a display panel layout 500 in which adjacent columns of pixels are driven at opposite polarities. In the example of FIG. 42, a subset of the pixels 60 is shown on the display panel 118. Three gate lines 126A-C are shown to supply activation signals to three corresponding rows of pixels 60 and ten source lines 128A-J supply data signals to ten corresponding columns of pixels 60. Each pixel 60 includes a respective TFT 130 and a pixel electrode 134. Each pixel 60 modulates light through a red (R), green (G), or blue (B) filter. With a 1-column inversion scheme, such as that shown in FIG. 42, two adjacent superpixels 502A and 502B will have pixels of the same color driven at opposite polarities. This pattern will repeat for every two adjacent superpixels.

Although 1-column inversion provides reduced transmittance from all pixels of the display, all adjacent columns of pixels are driven at opposite polarities. As a result, all columns of pixels in 1-column inversion will have reduced transmittance compared to a configuration in which at least some columns of pixels are not completely adjacent to pixels of opposite polarities (e.g., 3-column inversion, 2-column inversion, or 2/1-column inversion). Occasionally providing 1-column inversion, however, could produce superior color reproduction of the display panel 18. In particular, varying which column inversion scheme is used—for example, selecting a particular column inversion scheme to apply during the manufacture of the display 18 or applying a duty ratio of different column inversion schemes—may cause the white point of the display 18 to shift. As mentioned above, the term white point refers to the color emitted by the display 18 when programmed to display the color white.

Figure 44:
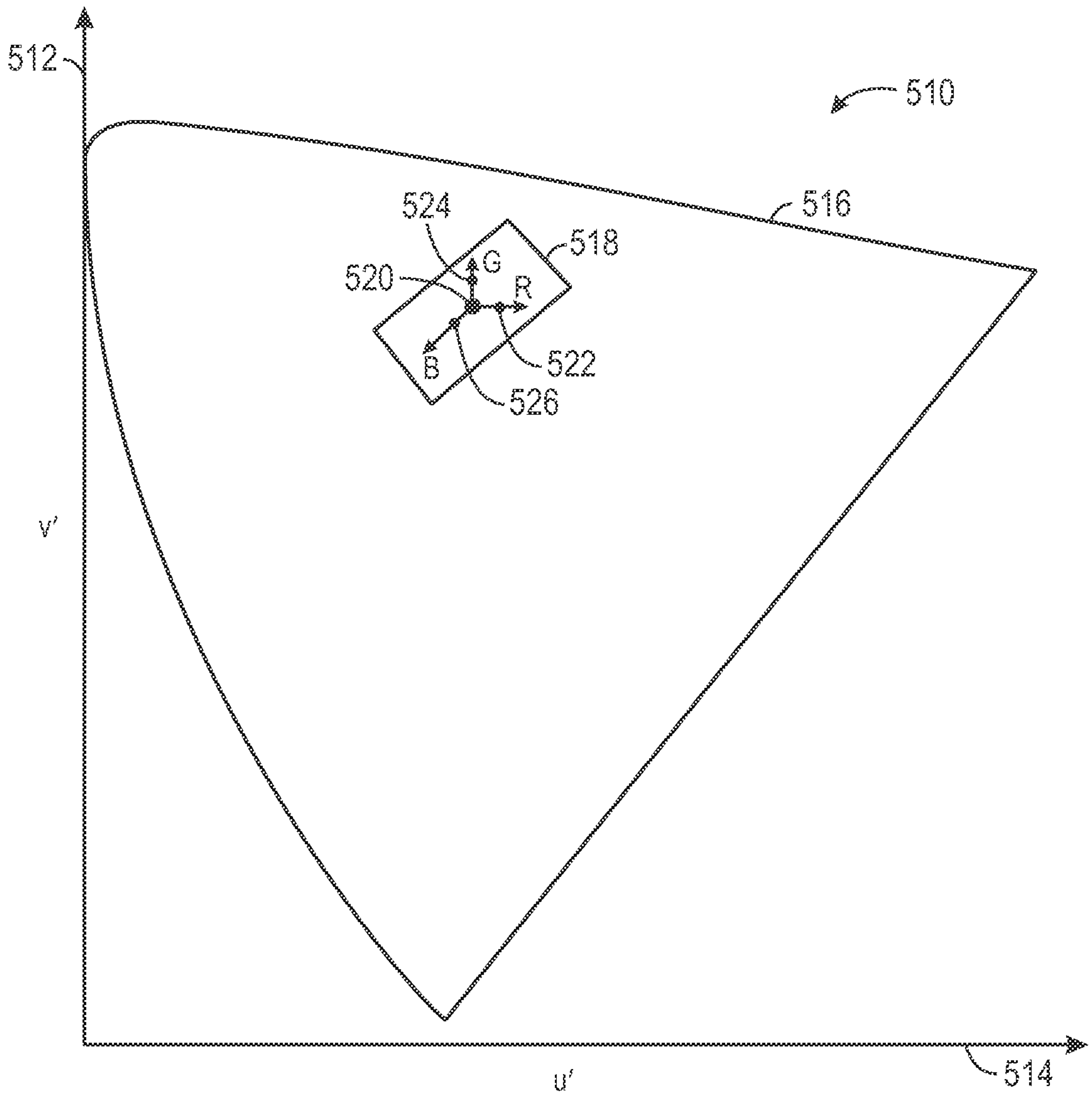
FIG. 44 is a plot modeling possible white point adjustments to a display that may be obtained using column inversion, in accordance with an embodiment.

One example of a white point of the display 18 is generally illustrated in FIG. 44, which illustrates a color space plot 510. Before continuing further, it should be noted that the white point of the display 18 may be adjusted through software processing to change the values of the image data 106 entering the display 18, but doing so may cause some image information to be lost. In addition or alternatively to software processing, the white point of the display 18 may be adjusted using the column inversion scheme(s) applied in the display 18. As will be discussed below, the column inversion scheme may be selected to be static or dynamic. As used herein, a static column inversion scheme is one that has been selected to run generally exclusively and may be selected relatively few times (e.g., only once at manufacture). A dynamic column inversion scheme is one that may vary over time to adjust the white point (e.g., a duty ratio of multiple column inversion schemes).

The color space plot 510 of FIG. 44 illustrates a CIE 1976 color space in color units of u' and v'. Namely, an ordinate 512 illustrates the v' axis and an abscissa 514 illustrates the u' axis. Appearing in the plot 510 is the CIE 1976 color space. As should be appreciated by those of ordinary skill in the art, the color space 516 represents a range of color values. Within the color space 516 fall a range of acceptable white points 518 of the display 18. The range of acceptable white points 518 is intended to generally be schematic in FIG. 44. That is, in an actual implementation, a much smaller range of acceptable white points 518 could be chosen. Moreover, the acceptable white points 518 may be located elsewhere in the color space 516.

Different displays 18 will generally have different white points within the range of acceptable white points 518. The different white points are generally caused by differences in the backlight assemblies 68 and the display panels 118 of different displays 18. Different backlight assemblies 68, for instance, may have LEDs that emit slightly different colors of light. In addition, differences in the diffusers 104 of the different backlight assemblies 68 may cause the color of light from the LEDs to shift, further varying the color of the light. Finally, differences in the display panels 118 of the displays 18 may further cause various color shifts. As such, the likelihood that all displays 18 will have the same white point is extremely slim.

Particular column inversion schemes may have the effect of shifting the white point from a starting white point (e.g., color point 520) of a display 18 more toward a desired white point. In various embodiments, the starting white point may occur in various locations within the range of acceptable white points 518. The desired white point may be a color point within the range of acceptable white points 518 that may most approximate the color white when seen by the human eye. The color point 520 represents a white point that may result when 1-column inversion is used. Since 1-column inversion reduces the transmittances of all columns of pixels substantially equally, the color that results after 1-column inversion will be substantially the same as that which would occur without column inversion. A color point 522 illustrates a white point that may result when 3-column inversion (red center pixel) is used, which may enhance the transmittance of red pixels in relation to the others, thereby shifting the starting color point 520 toward red. A color point 524 illustrates a white point that may result when 3-column inversion (green center pixel) is used, which may enhance the transmittance of green pixels in relation to the others, thereby shifting the starting color point 520 toward green. Finally, a color point 526 illustrates a white point that may result when 3-column inversion (blue center pixel) is used, which may enhance the transmittance of blue pixels in relation to the others, thereby shifting the starting color point 20 toward blue.

As will be discussed below, a particular column inversion scheme may be selected to keep the starting white point of the display 18 in place (e.g., at the color point 520) or to shift the starting white point more toward a desired white point (e.g., to the color points 522, 524, or 526). Additionally or alternatively, a duty ratio of different column inversion schemes may cause a shift to a particular point 520, 522, 524, or 526 during particular periods of time. By varying the column inversion schemes applied over time, the average white point may more closely approximate the desired white point. Various ways of more closely approaching the desired white point will be discussed further below.

If a display panel 18 includes driving circuitry such as the driving circuitry 220 or 470, any suitable column inversion having an equal number of image data driven at one polarity as driven at the other polarity may be employed. Suitable column inversion schemes may include, for example, 1-column inversion or 3-column inversion. Although 1-column inversion may not affect the white point of the display, 3-column inversion may do so in a manner that emphasizes red, green, or blue in relation to the other pixels. In addition, the driving circuitry 220 and its variants may perform 2/1-column inversion, which may similarly emphasize red and green over blue, green and blue over red, or red and blue over green.

Figure 45:
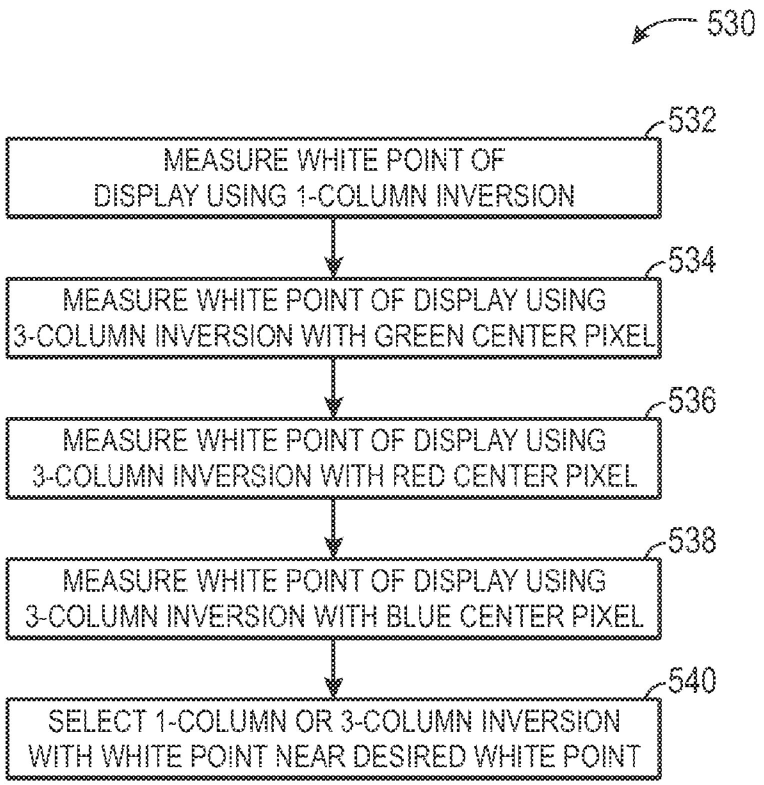
FIG. 45 is a flowchart describing a method for adjusting the white point of a display using 1-column and/or 3-column inversion, in accordance with an embodiment.

As such, the column inversion scheme may be selected cause the white point of the display 18 to shift closer to a desired white point. For example, as shown by a flowchart 530 of FIG. 45, during or after manufacture, a display 18 may be programmed to display the color white, and the white point associated with each column inversion scheme measured. The white point of the display 18 may be measured while the display 18 is performing a 1-column inversion scheme (block 532), a 3-column inversion scheme (green center pixel) (block 534), a 3-column inversion scheme (red center pixel) (block 536), and a 3-column inversion scheme (green center pixel) (block 538).

Thereafter, the display 18 may be programmed to perform the 1-column inversion scheme or the one of the 3-column inversion schemes that produces a white point closes to the desired white point (block 540). For example, the column inversion selection component 124 may be programmed and/or the white point selection component 122 may be programmed to cause the display driver circuitry of the display 18 to perform the selected column inversion. Thus, in a product-manufacturing setting, some of the displays 18 may have starting white points more red, green, or blue than the desired white point. The displays 18 programmed in the manner of the flowchart 530 of FIG. 45 may perform different column inversion depending on their respective starting white points to shift the white point of the display 18 more closely to the desired white point.

Figure 46:
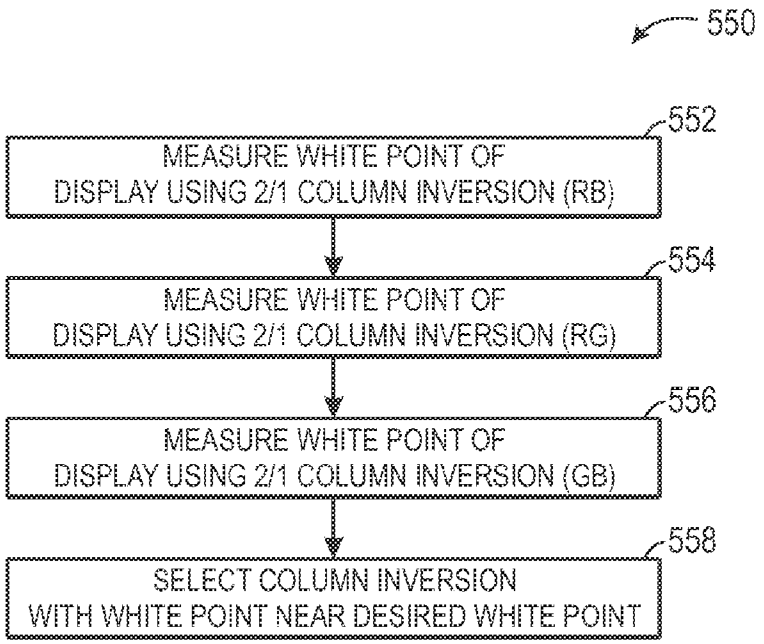
FIG. 46 is a flowchart describing an embodiment of a method for adjusting the white point of a display using 2/1-column inversion, in accordance with an embodiment.

Additionally or alternatively, other column inversion schemes may be employed to shift the white point of a display 18 toward a desired white point. For example, as shown by a flowchart 550 of FIG. 46, during or after manufacture, a display 18 may be programmed to display the color white, and the white point associated with each column inversion scheme measured. The white point of the display 18 may be measured while the display 18 is performing a 2/1-column inversion scheme (red, blue) (block 552), a 2/1-column inversion scheme (red, green) (block 554), and a 2/1-column inversion scheme (blue, green) (block 556). In other embodiments, any suitable column inversion schemes may be performed and tested.

Thereafter, the display 18 may be programmed to perform any of these column inversion schemes that produces a white point closes to the desired white point (block 558). For example, the column inversion selection component 124 and/or the white point selection component 122 may be programmed to cause the display driver circuitry of the display 18 to perform the selected column inversion. Thus, in a product-manufacturing setting, some of the displays 18 may have starting white points more red, green, or blue than the desired white point. The displays 18 programmed in the manner of the flowchart 550 of FIG. 46 may perform different column inversion depending on their respective starting white points to shift the white point of the display 18 more closely to the desired white point.

Before continuing further, it should also be understood that variations of the above-described methods are contemplated. For example, in other embodiments, rather than test the resulting white points that arise when different column inversion schemes are applied, only the white point without column inversion or with only 1-column inversion may be tested. From this value, a particular column inversion scheme that is likely to shift the white point toward the desired white point may be determined. For instance, the starting white point of the display 18 may be compared to the desired white point to obtain a color space vector. The column inversion scheme that most closely approximates the color space vector may be selected in an effort to shift the white point of the display 18 toward the desired white point.

As discussed above, some display panels 118 and/or driving circuitry associated with the display panels 118 may carry out one particular column inversion scheme. For example, some display panels 118 and/or driving circuitry associated with the display panels 118 may carry out 3-column inversion with a particular center pixel color whose transmittance is enhanced in relation to other colors. In another example, some display panels 118 and/or driving circuitry associated with the display panels 118 may carry out 2/1-column inversion in which two colors of pixels has an enhanced transmittance in relation to that of the other color. Since the color of light emitted by the backlight assembly 68 may impact the ultimate color of the white point emitted by the display 18, certain backlight assemblies 68 may be paired to certain display panels 118 and/or driving circuitry associated with the display panels 118.

Figure 47:
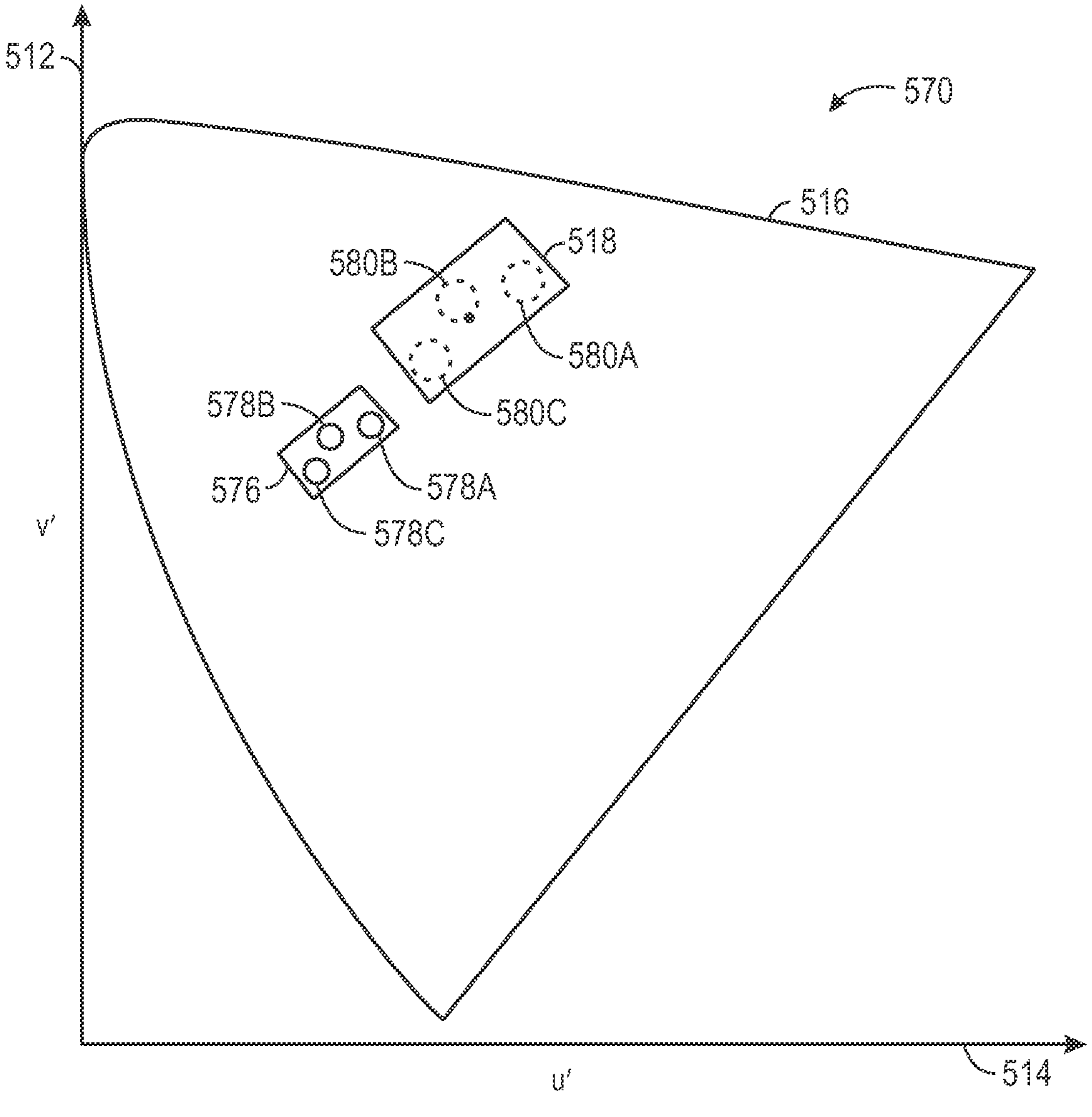
FIG. 47 is a plot modeling display panel white points in relation to backlight white points, in accordance with an embodiment.

A color space plot 570 of FIG. 47 illustrates a relationship between the color of the light emitted by different backlight assemblies 68 and the ultimate colors emitted by the display 18. The color space plot 570 of FIG. 47 illustrates the CIE 1976 color space 516 in units of u' and v'. Namely, an ordinate 512 illustrates the v' axis and an abscissa 514 illustrates the u' axis. Illustrated within the color space 516 shown in FIG. 47 is a range 576 of backlight assembly light emission colors. The range 576 generally describes the color of light emitted by the backlight assembly 68. For example, light emitted by four different backlight assemblies 68 may include a first range 578A, a second range 578B, and a third range 578C. As the light emitted from a backlight assembly 68 passes through other layers of a display 18, the emitted color of light may shift to an area within the range of acceptable white points 518. For instance, the first backlight range of colors 578A may translate to a first range 580A of light emitted by the display 18. Similarly, the second range 578B of light emitted by the backlight assembly 68 may translate to a second range 580B of light emitted by the display 18. Finally, in another example, light emitted by the backlight assembly 68 in the third range 578C generally may translate to a range 580C of light through the display 18. As shown in the example of FIG. 47, light emitted by backlight assemblies 68 in a more red, blue, or green segment of the range 576 may likewise translate to a white point within the range of acceptable white points that are generally more red, blue, or green.

Figure 48:
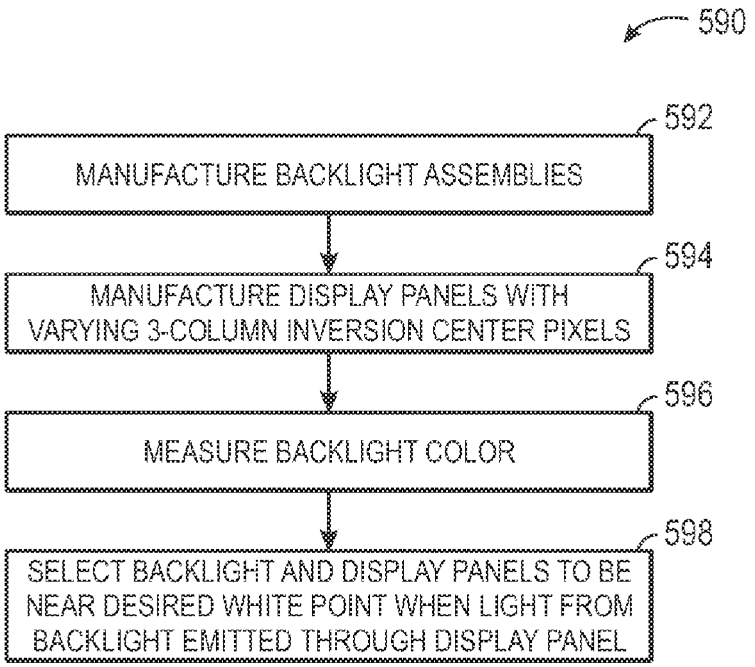
FIG. 48 is a flowchart describing a method for manufacturing a display with a display panel that compensates for backlight color, in accordance with an embodiment.

As shown in a flowchart 590 of FIG. 48, the color of light emitted by the backlight assembly 68 may be used to anticipate the likely color of the light emitted by the display 18 and select a corrective column inversion scheme during the manufacture of the display 18. In particular, a particular backlight assembly 68 may be paired to a particular display panel 118, thereby producing a display 18 with an improved white point of the display 18. The flowchart 590 may begin when backlight assemblies 68 of displays are manufactured (block 592). Other components of the displays 18 may be manufactured with display panels 118 and driver circuitry that can carry out at least one of the 3-column inversion schemes discussed above (block 594). For instance, in one example, one-third of the display panels 118 may have display panel layouts and driving circuitry to perform 3-column inversion with a blue center pixel, one-third of the display panels 118 may have display panel layouts and driving circuitry to perform 3-column inversion with a red center pixel, and one-third of the display panels 118 may have display panel layouts and driving circuitry to perform 3-column inversion with a green center pixel.

The color of light emitted by the backlight assemblies 68 may be measured (block 596), from which the likely ultimate white point of the display 18 may be estimated. Thus, using the color of the light emitted by the backlight assemblies 68, different backlight assemblies 68 and display panels 118 may be mated together such that the resulting combination is likely to be near a target white point (block 598). For example, a backlight assembly 68 that tends to emit more light in a red and/or green direction may be mated to a display panel that employs 3-column inversion (blue center pixel) to cause the white point to move away from red and green, and toward blue. A backlight assembly 68 that tends to emit more light in a blue and/or green direction may be mated to a display panel that employs 3-column inversion (red center pixel) to cause the white point to move away from blue and green, and toward red. Likewise, a backlight assembly 68 that tends to emit more light in a blue and/or red direction may be mated to a display panel that employs 3-column inversion (green center pixel) to cause the white point to move away from blue and red, and toward green.

In the examples discussed above, the displays 18 generally may perform substantially one column inversion scheme until reprogrammed. As such, the column inversion scheme may be referred to as "static" column inversion, which may shift the white point of the display 18 more closely to the desired white point. Alternatively, the display 18 may perform a duty ratio of several column inversion schemes in what may be referred to as "dynamic" column inversion. It should be appreciated, however, that the example of FIG. 45 may additionally or alternatively employ dynamic column inversion in the manner discussed below.

Figure 49:
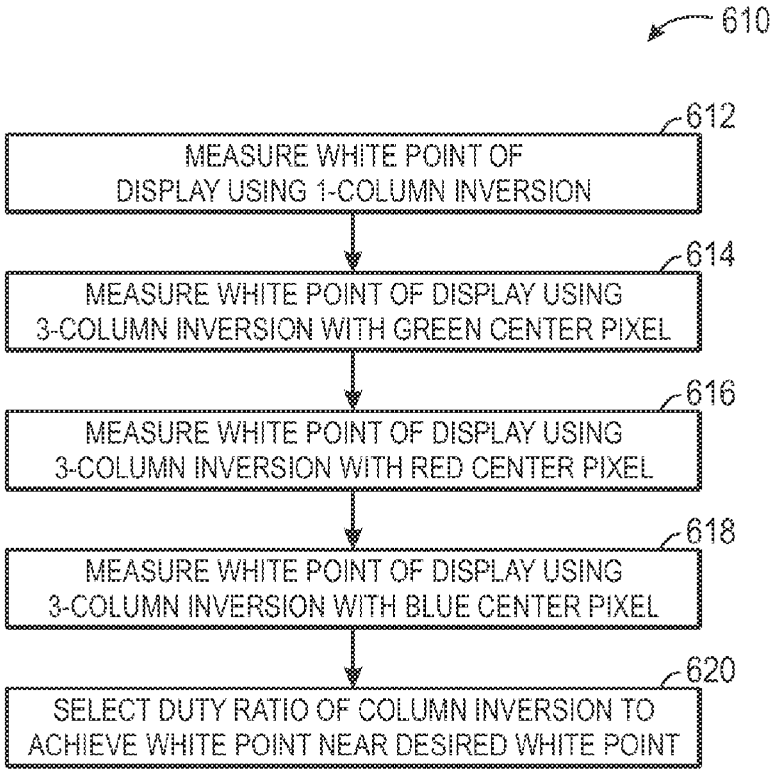
FIG. 49 is a flowchart describing a method for controlling a white point of a display by selecting a duty ratio of column inversion schemes, in accordance with an embodiment.

One example of dynamic column inversion appears in a flowchart 610 of FIG. 49. The flowchart 610 may begin when the white point of a display 18 may be measured using 1-column inversion (block 612), 3-column inversion (green center pixel) (block 614), 3-column inversion (red center pixel) (block 616), and 3-column inversion (blue center pixel) (block 618). Measuring the white points of the display 18 when particular column inversion schemes are applied may indicate the extent to which the white point may be affected by particular column inversion schemes. By applying certain column inversion schemes according to a particular duty ratio, the white point may be altered from its starting white point by some particular amount. Thus, the display 18 may be programmed to perform a duty ratio of column inversion to more closely approach a desired white point (block 620). By way of example, the white point selection component 122 and/or column inversion selection component 124 may be programmed to cause the driving circuitry of the display 18 to perform the particular duty ratio of column inversion.

Figures 50, 51:
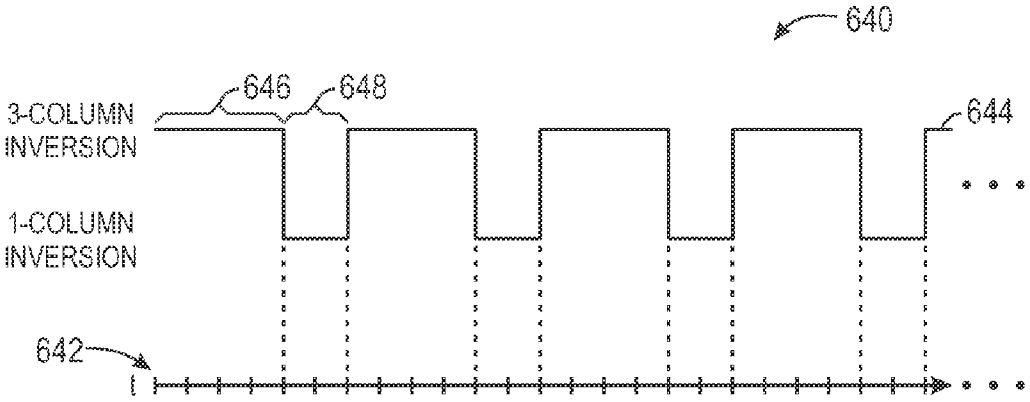
FIG. 50 is a chart illustrating column polarities over a series of frames of image data, in accordance with an embodiment.
FIG. 51 is a timing diagram showing a duty ratio of different column inversion schemes to adjust the white point of the display, in accordance with an embodiment.
Figure 52:
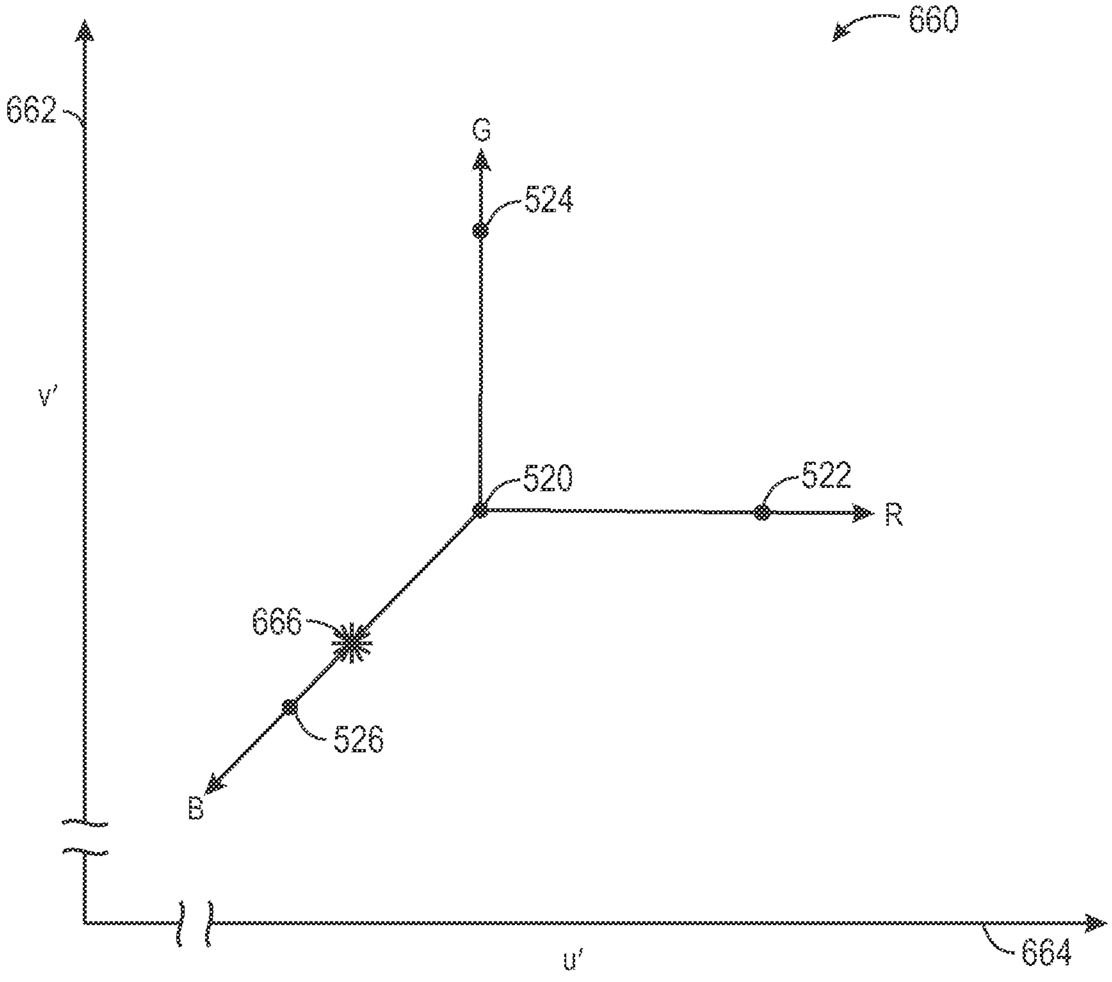
FIG. 52 is a color space diagram modeling the white point adjustment occurring when the duty ratio of FIG. 50 is applied, in accordance with an embodiment.

One example of a duty ratio of column inversion appears in FIGS. 50-52. In FIG. 50, a chart 630 includes columns that indicate the polarity of image data supplied to six pixels, shown as R1, B1, G1, R2, G2, and B2. Rows refer to the polarity of the image data for specific frames 1-10 over time. In the example of FIG. 50, a duty ratio of 2:1 (3-column inversion:1-column inversion) is applied. Over the ten frames illustrated, during frames 1-4 and 7-10, 3-column inversion (blue center pixel) is applied, while during frames 5 and 6, 1-column inversion is applied. Where a pixel is adjacent to two other pixels driven at the same polarity as itself during a particular frame in the chart 630, the polarity is circled. In frames 1-4 and 7-10, for example, the pixels B1 and B2 are surrounded by data of like polarities, and so are circled. During frames in which pixels are circled in FIG. 50, the transmittances of these pixels in relation to the other pixels may be slightly greater. Thus, during frames 1-4 and 7-10, the blue pixels B1 and B2 may have a greater transmittance than otherwise. During these frames, the increased blue transmittance may shift the starting white point in a blue direction. During frames 5 and 6, however, the starting white point of the display 18 may not be shifted.

The column inversion timing shown in the chart 630 may also be illustrated to be the 2:1 (3-column inversion:1-column inversion) duty ratio as seen in a timing diagram 640 of FIG. 51. In the timing diagram 640, a plot 644 shows that either 3-column inversion or 1-column inversion is applied during each frame, which occurs between tick marks on a time axis 642. During a first four frames (e.g., numeral 646), 3-column inversion is applied. During a subsequent two frames (e.g., numeral 648), 1-column inversion is applied.

In effect, the 2:1 (3-column inversion:1-column inversion) may cause the white point to vary every few frames. The differences over time may be relatively fleeting, however, such that the human eye may average the white points to see an interpolated or average white point. A plot 660 of FIG. 52 illustrates this effect. The plot 660 illustrates color illustrates several plots in a segment of the CIE 1976 color space in units of u" and v". Namely, an ordinate 662 illustrates the v" axis and an abscissa 664 illustrates the u" axis. Previously described color points 520, 522, 524, and 526 are also shown. As mentioned above, the color point 520 represents a starting white point that may occur when 1-column inversion is applied, the color point 522 represents a white point that may occur when 3-column inversion (red center pixel) is applied, the color point 524 represents a white point that may occur when 3-column inversion (green center pixel) is applied, and the color point 526 represents a white point that may occur when 3-column inversion (blue center pixel) is applied.

Accordingly, when the 2:1 (3-column inversion:1-column inversion) duty ratio illustrated in the example of FIGS. 50 and 51 is applied over six frames, the white point of the display 18 may be the color point 520 during two frames and may be the color point 526 during four frames. The human eye may interpolate between the rapidly switching color points 520 and 526, effectively causing the white point of the display 18 to be seen as a color point 666.

Figures 53, 54:
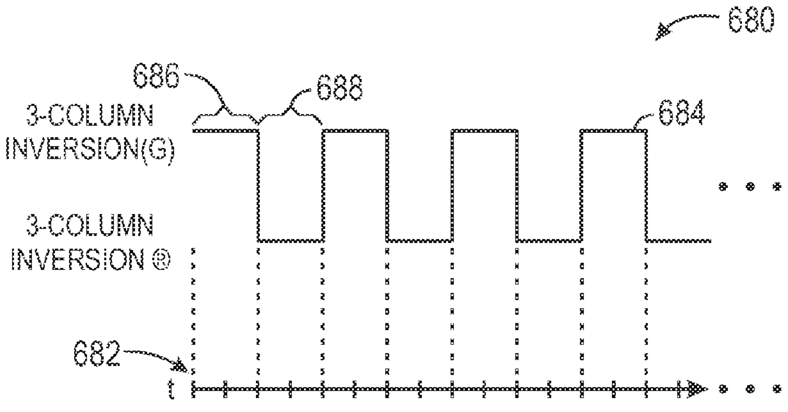
FIG. 53 is another chart illustrating column polarities over a series of frames of image data, in accordance with an embodiment.
FIG. 54 is another timing diagram showing a duty ratio of different column inversion schemes to adjust the white point of the display, in accordance with an embodiment.
Figure 55:
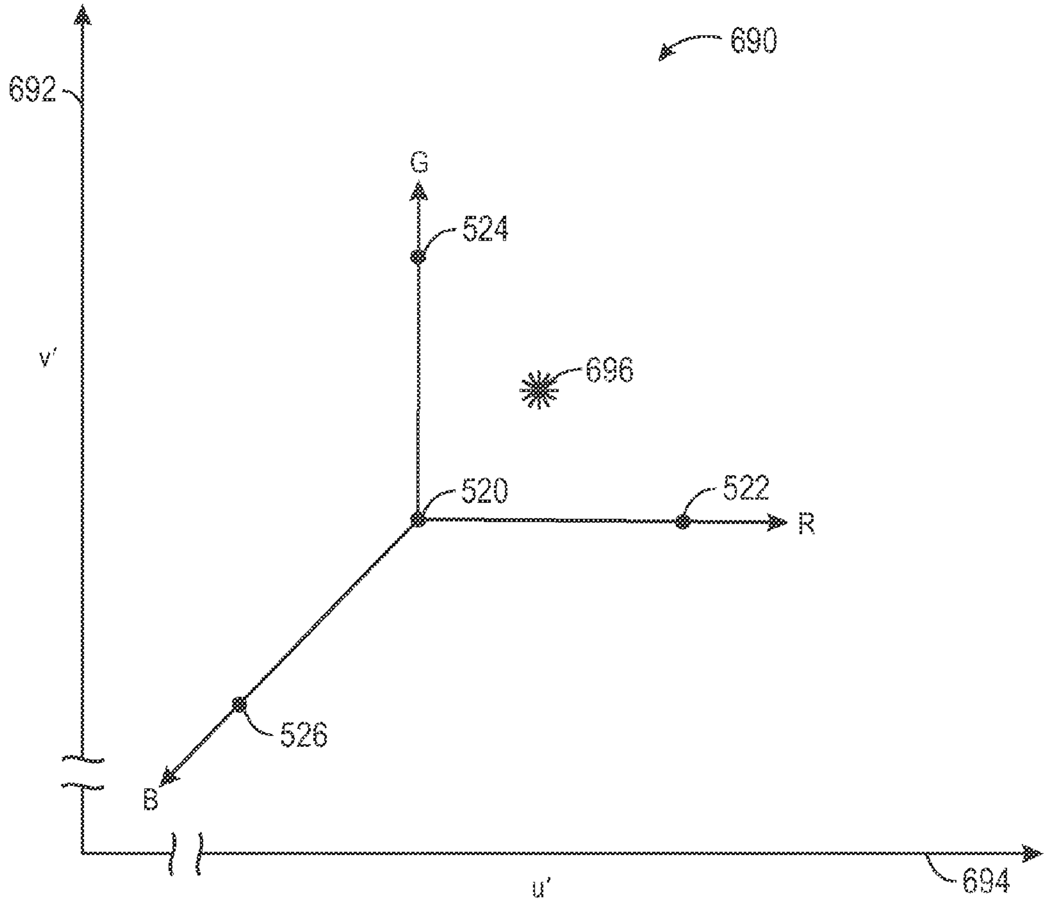
FIG. 55 is a color space diagram modeling the white point adjustment occurring when the duty ratio of FIG. 53 is applied, in accordance with an embodiment.

Other suitable duty ratios of column inversion schemes may be employed to achieve other effective white points. In general, any effective white points between the color points 522, 524, and 526 may be obtained by varying between the different 3-column inversion schemes used to achieve them. For example, FIGS. 53-55 provide an example involving a duty ratio between two 3-column inversion schemes. Still, it should be appreciated that any suitable number of different column inversion schemes may be employed in a duty ratio. That is, though the examples presented in this disclosure show a duty ratio of two column inversion schemes, other duty ratios may employ 3 or more.

In FIG. 53, a chart 670 includes columns that indicate the polarity of image data supplied to six pixels, shown as R1, B1, G1, R2, G2, and B2. Rows refer to the polarity of the image data for specific frames 1-10 over time. In the example of FIG. 53, a duty ratio of 1:1 (3-column inversion (green center pixel):3-column inversion (red center pixel)) is applied. Over the ten frames illustrated, during frames 1, 2, 5, 6, 9, and 10, 3-column inversion (green center pixel) is applied, while during frames 3, 4, 7, and 8, 3-column inversion (red center pixel) is applied. Where a pixel is adjacent to two other pixels driven at the same polarity as itself during a particular frame in the chart 670, the polarity is circled. Thus, in frames 1, 2, 5, 6, 9, and 10, the pixels G1 and G2 are surrounded by data of like polarities, and so are circled. Likewise, in frames 3, 4, 7, and 8, the pixels R1 and R2 are circled. During frames in which pixels are circled in FIG. 53, the transmittances of these pixels in relation to the other pixels may be slightly greater. Thus, during frames 1, 2, 5, 6, 9, and 10, the green pixels G1 and G2 may have a greater transmittance than otherwise, and during frames 3, 4, 7, and 8, the red pixels R1 and R2 may have a greater transmission than otherwise. The increased transmittance of these colored pixels may shift the starting white point in a green or red direction, on average, half of the time the display 18 is operating.

The column inversion timing shown in the chart 670 may also be illustrated to be the 1:1 (3-column inversion (green center pixel):3-column inversion (red center pixel)) duty ratio as seen in a timing diagram 680 of FIG. 54. In the timing diagram 680, over a time axis 682, a plot 684 shows that either 3-column inversion (green center pixel) or 3-column inversion (red center pixel) is applied during each frame. Each frame occurs between tick marks on the time axis 642. During a first two frames (e.g., numeral 686), 3-column inversion (green center pixel) is applied. During a subsequent two frames (e.g., numeral 688), 3-column inversion (red center pixel) is applied.

In effect, the (3-column inversion (green center pixel):3-column inversion (red center pixel)) duty ratio may cause the white point to vary every few frames. The differences over time may be relatively fleeting, however, such that the human eye may average the white points to see an interpolated or average white point. A plot 690 of FIG. 54 illustrates this effect. The plot 690 illustrates color illustrates several plots in a segment of the CIE 1976 color space in units of u" and v". Namely, an ordinate 692 illustrates the v" axis and an abscissa 694 illustrates the u" axis. Previously described color points 520, 522, 524, and 526 are also shown. As mentioned above, the color point 520 represents a starting white point that may occur when 1-column inversion is applied, the color point 522 represents a white point that may occur when 3-column inversion (red center pixel) is applied, the color point 524 represents a white point that may occur when 3-column inversion (green center pixel) is applied, and the color point 526 represents a white point that may occur when 3-column inversion (blue center pixel) is applied.

Accordingly, when the 1:1 (3-column inversion (green center pixel):3-column inversion (red center pixel)) duty ratio illustrated in the example of FIGS. 53 and 54 is applied over four frames, the white point of the display 18 may be the color point 524 during two frames and may be the color point 522 during two frames. The human eye may interpolate between the rapidly switching color points 522 and 524, effectively causing the white point of the display 18 to be seen as a color point 696.

Figure 56:
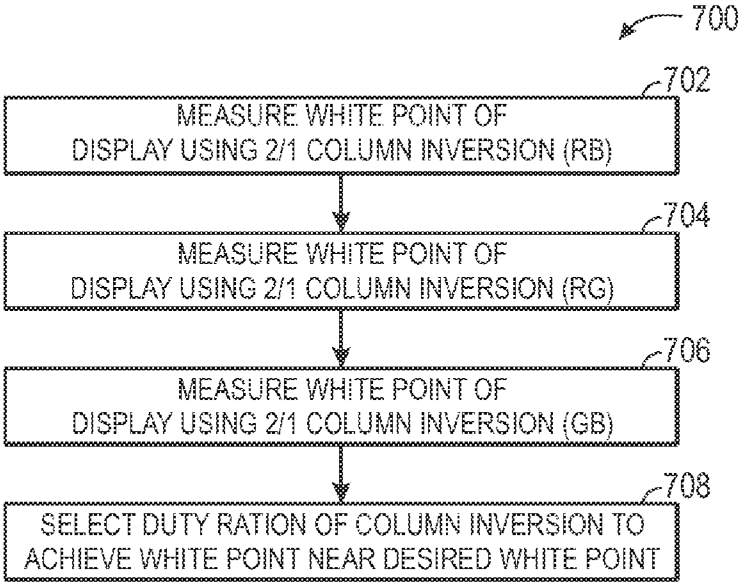
FIG. 56 is a flowchart of a method for adjusting the white point of a display using a duty ratio of 2/1-column inversion, in accordance with an embodiment.

Other column inversion schemes than 3-column inversion and 1-column inversion may be chosen in a duty ratio to dynamically adjust the white point of a display 18. For example, a duty ratio may, additionally or alternatively, employ 2/1-column inversion. One such example of dynamic column inversion using 2/1-column inversion appears in a flowchart 700 of FIG. 56. The flowchart 700 may begin when the white point of a display 18 may be measured using 2/1-column inversion (red, blue) (block 702), 2/1-column inversion (red, green) (block 704), and 2/1-column inversion (green, blue) (block 706). Measuring the white points of the display 18 when particular column inversion schemes are applied may indicate the extent to which the white point may be affected by particular column inversion schemes. By applying certain column inversion schemes according to a particular duty ratio, the white point may be altered from its starting white point by some specific amount. Thus, the display 18 may be programmed to perform a duty ratio of column inversion to more closely approach a desired white point (block 708). By way of example, the white point selection component 122 and/or column inversion selection component 124 may be programmed to cause the driving circuitry of the display 18 to perform the particular duty ratio of column inversion.

Figures 57, 58:
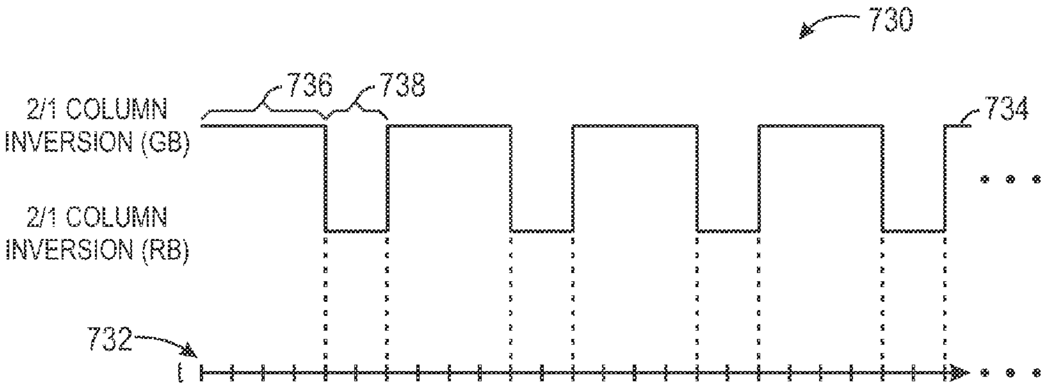
FIG. 57 is a chart illustrating column polarities over a series of frames of image data when various 2/1-column inversion schemes are applied over time, in accordance with an embodiment.
FIG. 58 is a timing diagram showing a duty ratio of different 2/1-column inversion schemes to adjust the white point of the display, in accordance with an embodiment.
Figure 59:
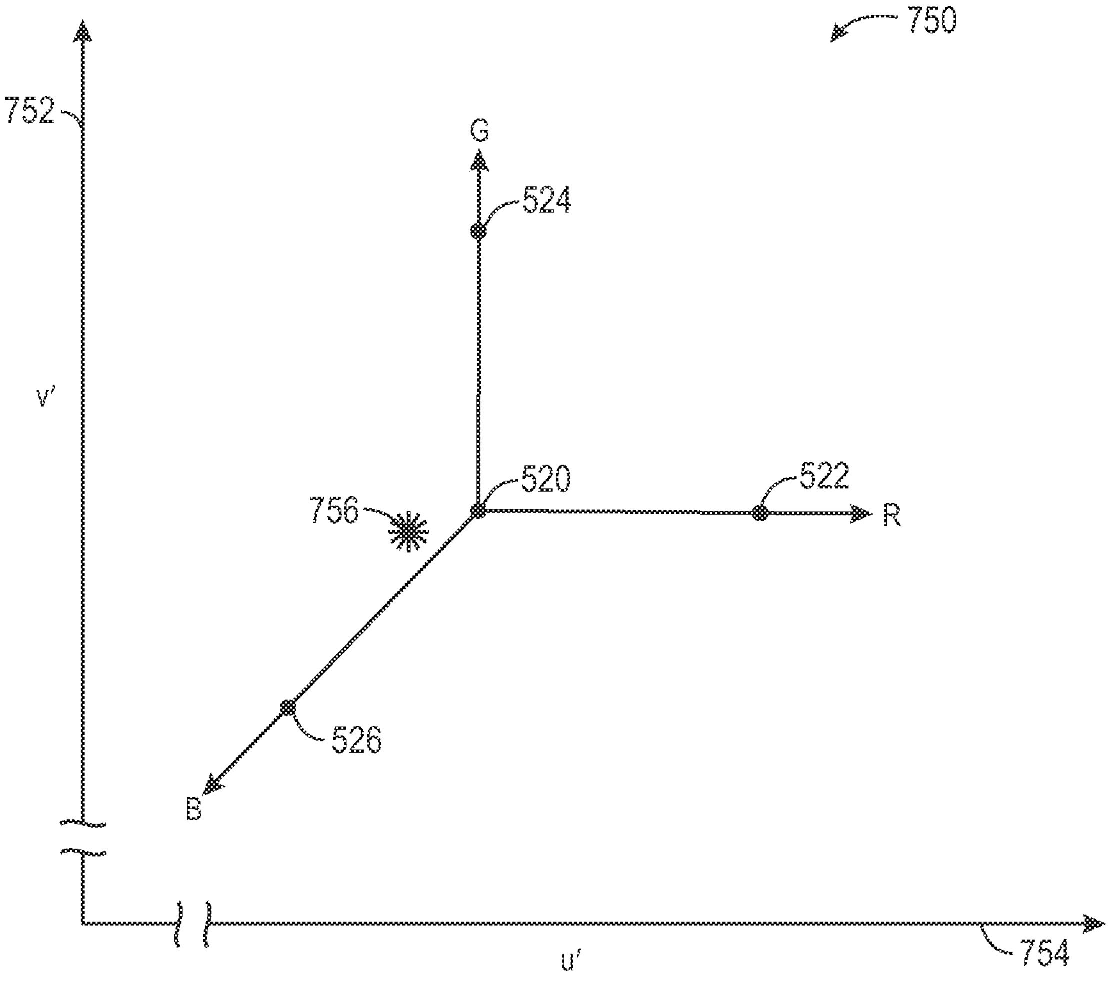
FIG. 59 is a color space diagram modeling the white point adjustment occurring when the duty ratio of FIG. 57 is applied, in accordance with an embodiment.

One example of a duty ratio of 2/1-column inversion appears in FIGS. 57-59. In FIG. 57, a chart 720 includes columns that indicate the polarity of image data supplied to six pixels, shown as R1, B1, G1, R2, G2, and B2. Rows refer to the polarity of the image data for specific frames 1-10 over time. In the example of FIG. 57, a duty ratio of 2:1 (2/1-column inversion (green, blue):2/1-column inversion (red, blue)) is applied. Over the ten frames illustrated, during frames 1-4 and 7-10, 2/1-column inversion (green, blue) is applied, while during frames 5 and 6, 2/1-column inversion (red, blue) is applied. Where a pixel is not surrounded on both sides by two other pixels driven at the opposite polarity as itself during a particular frame in the chart 720, the polarity is circled. In frames 1-4 and 7-10, for example, the pixels G1, B1, G2, and B2 are circled. In frames 5 and 6, the pixels R1, B1, R2, and B2 are circled. During frames in which pixels are circled in FIG. 57, the transmittances of these pixels in relation to the other, non-circled pixels may be slightly greater. Thus, during frames 1-4 and 7-10, the green and blue pixels may have a greater transmittance than the red pixels. During frames 5 and 6, the red and blue pixels may have a greater transmittance than the green pixels.

The column inversion timing shown in the chart 720 may also be illustrated to be the 2:1 (2/1-column inversion (green, blue):2/1-column inversion (red, blue)) duty ratio as seen in a timing diagram 730 of FIG. 58. The timing diagram 730 illustrates, over a time axis 732, that either 2/1-column inversion (green, blue) or 2/1-column inversion (green, blue) is applied during each frame. Each frame is shown to occur between tick marks on the time axis 732. During a first four frames (e.g., numeral 736), 2/1-column inversion (green, blue) is applied. During a subsequent two frames (e.g., numeral 738), 2/1-column inversion (red, blue) is applied.

In effect, the 2:1 (2/1-column inversion (green, blue):2/1-column inversion (red, blue)) duty ratio may cause the white point to vary every few frames. The differences over time may be relatively fleeting, however, such that the human eye may average the white points to see an interpolated or average white point. A plot 750 of FIG. 59 illustrates this effect. The plot 750 illustrates an area of the CIE 1976 color space in units of u" and v". Namely, an ordinate 752 illustrates the v" axis and an abscissa 754 illustrates the u" axis. Previously described color points 520, 522, 524, and 526 are also shown. As mentioned above, the color point 520 represents a starting white point that may occur when 1-column inversion is applied, the color point 522 represents a white point that may occur when 3-column inversion (red center pixel) is applied, the color point 524 represents a white point that may occur when 3-column inversion (green center pixel) is applied, and the color point 526 represents a white point that may occur when 3-column inversion (blue center pixel) is applied.

Although not expressly shown, it should be appreciated that different 2/1-column inversion schemes may likewise result in color points other than the starting white point 520. These other color points would be located off-axis from the red, green, and blue directions, however, since the 2/1-column inversion schemes generally reduce the transmittance of all colors of pixels, two colors of which are reduced less than the third color. Thus, for example, 2/1-column inversion (red, blue) would produce a white point generally between the red and green axes some distance from the starting white point 520. The magnitude of the distance between such a color point produced by 2/1-column inversion would be less than those of the color points 522 and 524.

Accordingly, when the 2:1 (2/1-column inversion (green, blue):2/1-column inversion (red, blue)) duty ratio illustrated in the example of FIGS. 57 and 58 is applied over six frames, the white point of the display 18 may be a color point between the green and blue axes during four frames and may be a color point between the blue and red during two frames. The human eye may interpolate between the rapidly switching color points, effectively causing the white point of the display 18 to be seen as a color point 756.

It should be further appreciated that the particular column inversion scheme that may be applied at a given time may be influenced by the processor(s) 12 or other data processing circuitry of the electronic device 10. For instance, software or firmware of the electronic device 10 may indicate a particular white point or may indicate that the white point of the display 18 to be shifted in a particular color direction. As a result, in some embodiments, the column inversion selection component 120 or the white point selection component 122 of the timing controller 110 may be programmed based on processor(s) 12 or other data processing circuitry of the electronic device 10. To provide one example, an increase in temperature may cause the white point of the display 18 to shift more toward blue. When the temperature-sensing circuitry 28 detects a particular temperature, the processor(s) 12 may cause the display 18 to use a column inversion scheme that counteracts the impact of the temperature-induced color shift toward blue. Additionally or alternatively, the display 18 may perform a first column inversion scheme or a first duty ratio of column inversion schemes when the temperature is less than a threshold. When the temperature crosses the threshold, the display 18 may perform a second column inversion scheme or a second duty ratio of column inversion schemes that shifts the color of the display away from blue to counteract the impact of the temperature-induced color shift toward blue.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:

measuring white points of an electronic display that occur when the display employs different column inversion schemes, wherein the white points are the color emitted by the display when the display is programmed to display the color white; and programming the display to perform one of the different column inversion schemes that produces a white point closest to a desired white point, wherein the desired white point comprises a desired color to be emitted by the display when the display is programmed to display the color white;

wherein the white points of the display are measured when the display employs different 3-column inversion schemes; and wherein the different 3-column inversion schemes comprise a first 3-column inversion scheme that enhances blue pixel transmittance in relation to red and green pixels, a second 3-column inversion scheme that enhances red pixel transmittance in relation to green and blue pixels, and a third 3-column inversion scheme that enhances green pixel transmittance in relation to red and blue pixels.

2. The method of claim 1, wherein the white points of the display are measured when the display employs different 2/1-column inversion schemes.

3. The method of claim 2, wherein the different 2/1-column inversion schemes comprise a first 2/1-column inversion scheme that enhances red and blue pixel transmittance in relation to green pixels, a second 2/1-column inversion scheme that enhances blue and green pixel transmittance in relation to red pixels, and a third 2/1-column inversion scheme that enhances red and green pixel transmittance in relation to blue pixels.

4. The method of claim 1, wherein the white points of the display are measured when the display employs a 1-column inversion scheme that does not enhance a transmittance of any pixel color in relation to another pixel color.

5. A method of manufacturing an electronic display comprising:

measuring a color of light emitted by a backlight assembly; and combining the backlight assembly with a display panel configured to perform one of a plurality of column inversion schemes, wherein the one of the plurality of column inversion schemes represents the one of the plurality of column inversion schemes that is expected to cause a white point (the color emitted by the display when the display is programmed to display the color white) of the combination of the backlight assembly and the display panel to most closely approach a desired white point (a color desired to be emitted by the display when the display is programmed to display the color white);

wherein the plurality of column inversion schemes comprises a plurality of 3-column inversion schemes and wherein, when the color of the light emitted by the backlight assembly suggests that a resulting white point using a display panel without column inversion or with 1-column inversion would be deficient in blue, the backlight assembly is combined with the display panel, wherein the display panel is configured to perform a 3-column inversion scheme in which blue pixels are surrounded by pixels driven at the same polarity as the blue pixels.

6. A method of manufacturing an electronic display comprising:

measuring a color of light emitted by a backlight assembly; and combining the backlight assembly with a display panel configured to perform one of a plurality of column inversion schemes, wherein the one of the plurality of column inversion schemes represents the one of the plurality of column inversion schemes that is expected to cause a white point (the color emitted by the display when the display is programmed to display the color white) of the combination of the backlight assembly and the display panel to most closely approach a desired white point (a color desired to be emitted by the display when the display is programmed to display the color white);

wherein the plurality of column inversion schemes comprises a plurality of 3-column inversion schemes and wherein, when the color of the light emitted by the backlight assembly suggests that a resulting white point using a display panel without column inversion or with 1-column inversion would be deficient in red, the backlight assembly is combined with the display panel, wherein the display panel is configured to perform a 3-column inversion scheme in which red pixels are surrounded by pixels driven at the same polarity as the red pixels.

7. A method of manufacturing an electronic display comprising:

measuring a color of light emitted by a backlight assembly; and combining the backlight assembly with a display panel configured to perform one of a plurality of column inversion schemes, wherein the one of the plurality of column inversion schemes represents the one of the plurality of column inversion schemes that is expected to cause a white point (the color emitted by the display when the display is programmed to display the color white) of the combination of the backlight assembly and the display panel to most closely approach a desired white point (a color desired to be emitted by the display when the display is programmed to display the color white);

wherein the plurality of column inversion schemes comprises a plurality of 3-column inversion schemes and wherein, when the color of the light emitted by the backlight assembly suggests that a resulting white point using a display panel without column inversion or with 1-column inversion would be deficient in green, the backlight assembly is combined with the display panel, wherein the display panel is configured to perform a 3-column inversion scheme in which green pixels are surrounded by pixels driven at the same polarity as the green pixels.

8. An electronic display comprising:

a display panel comprising columns of pixels; and driving circuitry configured to drive the pixels according to a duty ratio of a plurality of column inversion schemes;

wherein the driving circuitry is configured to drive the pixels according to a first duty ratio when the electronic display is less than a threshold temperature and according to a second duty ratio when the electronic display is greater than a threshold temperature;

wherein the first duty ratio is configured to shift a white point of the electronic display more toward blue than the second duty ratio.

9. The electronic display of claim 8, wherein the driving circuitry is configured to drive the pixels in a repeating pattern according to a first column inversion scheme over a first plurality of frames and a second column inversion scheme over a subsequent second plurality of frames.

10. The electronic display of claim 8, wherein the first duty ratio is configured to shift a white point of the electronic display more toward blue than the second duty ratio.

* * * * *